US010360705B2

(12) United States Patent
Cervelli et al.

(10) Patent No.: US 10,360,705 B2
(45) Date of Patent: *Jul. 23, 2019

(54) INTERACTIVE DATA OBJECT MAP

(71) Applicant: Palantir Technologies Inc., Palo Alto, CA (US)

(72) Inventors: Dan Cervelli, Mountain View, CA (US); Cai GoGwilt, Palo Alto, CA (US); Bobby Prochnow, East Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 874 days.

This patent is subject to a terminal disclaimer.

(21) Appl. No.: 14/323,878

(22) Filed: Jul. 3, 2014

(65) Prior Publication Data

US 2014/0333651 A1 Nov. 13, 2014

Related U.S. Application Data

(63) Continuation of application No. 13/917,571, filed on Jun. 13, 2013, now Pat. No. 8,799,799.

(Continued)

(51) Int. Cl.
*G06F 3/0481* (2013.01)
*G06T 11/60* (2006.01)
(Continued)

(52) U.S. Cl.
CPC ............ *G06T 11/60* (2013.01); *G06F 3/0481* (2013.01); *G06F 3/04842* (2013.01);
(Continued)

(58) Field of Classification Search
CPC .................................................. G06F 3/0481
(Continued)

(56) References Cited

U.S. PATENT DOCUMENTS

| 4,899,161 A | 2/1990 | Morin et al. |
| 4,958,305 A | 9/1990 | Piazza |

(Continued)

FOREIGN PATENT DOCUMENTS

| AU | 2012216622 | 5/2015 |
| AU | 2013251186 | 11/2015 |

(Continued)

OTHER PUBLICATIONS

H. Chen and S. T. Dumais. "Bringing order to the web: Automatically categorizing search results". In Proc. of CHI'00, pp. 145-152, Aug. 2000.*

(Continued)

*Primary Examiner* — Reza Nabi
(74) *Attorney, Agent, or Firm* — Knobbe, Martens, Olson & Bear, LLP

(57) ABSTRACT

An interactive data object map system is disclosed in which large amounts of geographical, geospatial, and other types of data, geodata, objects, features, and/or metadata are efficiently presented to a user on a map interface. The interactive data object map system allows for rapid and deep analysis of various objects, features, and/or metadata by the user. A layer ontology may be displayed to the user. In various embodiments, when the user rolls a selection cursor over an object/feature an outline of the object/feature is displayed. Selection of an object/feature may cause display of metadata associated with that object/feature. The interactive data object map system may automatically generate feature/object lists and/or histograms based on selections made by the user. The user may perform geosearches, generate heatmaps, and/or perform keyword searches, among other actions.

20 Claims, 35 Drawing Sheets

Related U.S. Application Data

(60) Provisional application No. 61/820,608, filed on May 7, 2013.

(51) Int. Cl.

| | | |
|---|---|---|
| *G06F 16/29* | (2019.01) | |
| *G06T 11/00* | (2006.01) | |
| *G06F 3/0484* | (2013.01) | |
| *G09B 29/10* | (2006.01) | |

(52) U.S. Cl.
CPC ............ *G06F 16/29* (2019.01); *G06T 11/001* (2013.01); *G09B 29/106* (2013.01)

(58) Field of Classification Search
USPC ........................................................ 715/765
See application file for complete search history.

(56) References Cited

U.S. PATENT DOCUMENTS

| | | | |
|---|---|---|---|
| 5,109,399 | A | 4/1992 | Thompson |
| 5,241,625 | A | 8/1993 | Epard et al. |
| 5,329,108 | A * | 7/1994 | Lamoure .......... G06K 19/06037 235/454 |
| 5,623,590 | A | 4/1997 | Becker et al. |
| 5,632,009 | A | 5/1997 | Rao et al. |
| 5,632,987 | A | 5/1997 | Rao et al. |
| 5,670,987 | A | 9/1997 | Doi et al. |
| 5,754,182 | A | 5/1998 | Kobayashi |
| 5,781,195 | A | 7/1998 | Marvin |
| 5,781,704 | A | 7/1998 | Rossmo |
| 5,798,769 | A | 8/1998 | Chiu et al. |
| 5,845,300 | A | 12/1998 | Comer |
| 5,999,911 | A | 12/1999 | Berg et al. |
| 6,055,569 | A | 4/2000 | O'Brien et al. |
| 6,057,757 | A | 5/2000 | Arrowsmith et al. |
| 6,065,026 | A | 5/2000 | Cornelia et al. |
| 6,091,956 | A | 7/2000 | Hollenberg |
| 6,157,747 | A | 12/2000 | Szeliski et al. |
| 6,161,098 | A | 12/2000 | Wallman |
| 6,169,552 | B1 | 1/2001 | Endo et al. |
| 6,173,067 | B1 | 1/2001 | Payton et al. |
| 6,178,432 | B1 | 1/2001 | Cook et al. |
| 6,219,053 | B1 | 4/2001 | Tachibana et al. |
| 6,232,971 | B1 | 5/2001 | Haynes |
| 6,237,138 | B1 | 5/2001 | Hameluck et al. |
| 6,243,706 | B1 | 6/2001 | Moreau et al. |
| 6,247,019 | B1 * | 6/2001 | Davies .................. G01C 21/32 701/448 |
| 6,279,018 | B1 | 8/2001 | Kudrolli et al. |
| 6,338,066 | B1 | 1/2002 | Martin et al. |
| 6,341,310 | B1 | 1/2002 | Leshem et al. |
| 6,366,933 | B1 | 4/2002 | Ball et al. |
| 6,369,835 | B1 | 4/2002 | Lin |
| 6,370,538 | B1 | 4/2002 | Lamping et al. |
| 6,389,289 | B1 | 5/2002 | Voce et al. |
| 6,414,683 | B1 | 7/2002 | Gueziec |
| 6,430,305 | B1 | 8/2002 | Decker |
| 6,456,997 | B1 | 9/2002 | Shukla |
| 6,483,509 | B1 | 11/2002 | Rabenhorst |
| 6,523,019 | B1 | 2/2003 | Borthwick |
| 6,529,900 | B1 | 3/2003 | Patterson et al. |
| 6,549,944 | B1 | 4/2003 | Weinberg et al. |
| 6,560,620 | B1 | 5/2003 | Ching |
| 6,581,068 | B1 | 6/2003 | Bensoussan et al. |
| 6,584,498 | B2 | 6/2003 | Nguyen |
| 6,594,672 | B1 | 7/2003 | Lampson et al. |
| 6,631,496 | B1 * | 10/2003 | Li ...................... G06F 16/9562 715/200 |
| 6,642,945 | B1 | 11/2003 | Sharpe |
| 6,662,103 | B1 | 12/2003 | Skolnick et al. |
| 6,665,683 | B1 | 12/2003 | Meltzer |
| 6,674,434 | B1 | 1/2004 | Chojnacki et al. |
| 6,714,936 | B1 | 3/2004 | Nevin, III |
| 6,742,033 | B1 | 5/2004 | Smith et al. |
| 6,757,445 | B1 | 6/2004 | Knopp |
| 6,775,675 | B1 | 8/2004 | Nwabueze et al. |
| 6,820,135 | B1 | 11/2004 | Dingman |
| 6,828,920 | B2 | 12/2004 | Owen et al. |
| 6,839,745 | B1 | 1/2005 | Dingari et al. |
| 6,850,317 | B2 | 2/2005 | Mullins et al. |
| 6,877,137 | B1 | 4/2005 | Rivette et al. |
| 6,944,821 | B1 | 9/2005 | Bates et al. |
| 6,967,589 | B1 | 11/2005 | Peters |
| 6,976,210 | B1 | 12/2005 | Silva et al. |
| 6,978,419 | B1 | 12/2005 | Kantrowitz |
| 6,980,984 | B1 | 12/2005 | Huffman et al. |
| 6,983,203 | B1 | 1/2006 | Wako |
| 6,985,950 | B1 * | 1/2006 | Hanson ................ G06F 16/957 709/226 |
| 7,003,566 | B2 | 2/2006 | Codella et al. |
| 7,036,085 | B2 * | 4/2006 | Barros ............... G06Q 30/0641 715/764 |
| 7,043,702 | B2 | 5/2006 | Chi et al. |
| 7,055,110 | B2 | 5/2006 | Kupka et al. |
| 7,086,028 | B1 | 8/2006 | Davis et al. |
| 7,103,852 | B2 | 9/2006 | Kairis, Jr. |
| 7,139,800 | B2 | 11/2006 | Bellotti et al. |
| 7,149,366 | B1 | 12/2006 | Sun |
| 7,158,878 | B2 * | 1/2007 | Rasmussen ............ G01C 21/32 701/431 |
| 7,162,475 | B2 | 1/2007 | Ackerman |
| 7,168,039 | B2 | 1/2007 | Bertram |
| 7,171,427 | B2 | 1/2007 | Witowski et al. |
| 7,174,377 | B2 | 2/2007 | Bernard et al. |
| 7,194,680 | B1 | 3/2007 | Roy et al. |
| 7,213,030 | B1 | 5/2007 | Jenkins |
| 7,269,786 | B1 | 9/2007 | Malloy et al. |
| 7,278,105 | B1 | 10/2007 | Kitts |
| 7,290,698 | B2 | 11/2007 | Poslinski et al. |
| 7,333,998 | B2 | 2/2008 | Heckerman et al. |
| 7,370,047 | B2 | 5/2008 | Gorman |
| 7,375,732 | B2 | 5/2008 | Arcas |
| 7,379,811 | B2 * | 5/2008 | Rasmussen ............ G01C 21/32 701/532 |
| 7,379,903 | B2 | 5/2008 | Joseph |
| 7,392,254 | B1 | 6/2008 | Jenkins |
| 7,426,654 | B2 | 9/2008 | Adams et al. |
| 7,441,182 | B2 | 10/2008 | Beilinson et al. |
| 7,441,219 | B2 | 10/2008 | Perry et al. |
| 7,454,466 | B2 | 11/2008 | Bellotti et al. |
| 7,457,706 | B2 | 11/2008 | Malero et al. |
| 7,467,375 | B2 | 12/2008 | Tondreau et al. |
| 7,487,139 | B2 | 2/2009 | Fraleigh et al. |
| 7,502,786 | B2 * | 3/2009 | Liu ...................... G06F 16/951 |
| 7,519,470 | B2 | 4/2009 | Brasche et al. |
| 7,525,422 | B2 | 4/2009 | Bishop et al. |
| 7,529,195 | B2 | 5/2009 | Gorman |
| 7,529,727 | B2 | 5/2009 | Arning et al. |
| 7,529,734 | B2 | 5/2009 | Dirisala |
| 7,539,666 | B2 | 5/2009 | Ashworth et al. |
| 7,558,677 | B2 * | 7/2009 | Jones ..................... G01C 15/00 342/357.41 |
| 7,558,822 | B2 | 7/2009 | Fredricksen et al. |
| 7,574,409 | B2 | 8/2009 | Patinkin |
| 7,574,428 | B2 * | 8/2009 | Leiserowitz ........ G01C 21/3682 707/999.003 |
| 7,579,965 | B2 | 8/2009 | Bucholz |
| 7,596,285 | B2 | 9/2009 | Brown et al. |
| 7,614,006 | B2 | 11/2009 | Molander |
| 7,617,232 | B2 | 11/2009 | Gabbert et al. |
| 7,617,314 | B1 | 11/2009 | Bansod et al. |
| 7,620,628 | B2 * | 11/2009 | Kapur ................ G06F 16/3326 |
| 7,627,812 | B2 | 12/2009 | Chamberlain et al. |
| 7,634,717 | B2 | 12/2009 | Chamberlain et al. |
| 7,653,883 | B2 | 1/2010 | Hotelling et al. |
| 7,663,621 | B1 | 2/2010 | Allen et al. |
| 7,693,816 | B2 | 4/2010 | Nemoto et al. |
| 7,703,021 | B1 | 4/2010 | Flam |
| 7,706,817 | B2 | 4/2010 | Bamrah et al. |
| 7,712,049 | B2 | 5/2010 | Williams et al. |
| 7,716,077 | B1 | 5/2010 | Mikurak |
| 7,725,530 | B2 | 5/2010 | Sah et al. |
| 7,725,547 | B2 | 5/2010 | Albertson et al. |

(56) References Cited

U.S. PATENT DOCUMENTS

| | | | |
|---|---|---|---|
| 7,730,082 B2 | 6/2010 | Sah et al. | |
| 7,730,109 B2 | 6/2010 | Rohrs et al. | |
| 7,747,749 B1 | 6/2010 | Erikson et al. | |
| 7,756,843 B1 | 7/2010 | Palmer | |
| 7,765,489 B1 | 7/2010 | Shah | |
| 7,770,100 B2 | 8/2010 | Chamberlain et al. | |
| 7,791,616 B2 | 9/2010 | Ioup et al. | |
| 7,805,457 B1 | 9/2010 | Viola et al. | |
| 7,809,703 B2 * | 10/2010 | Balabhadrapatruni | G06F 16/907 707/705 |
| 7,818,658 B2 | 10/2010 | Chen | |
| 7,870,493 B2 | 1/2011 | Pall et al. | |
| 7,872,647 B2 | 1/2011 | Mayer et al. | |
| 7,877,421 B2 | 1/2011 | Berger et al. | |
| 7,880,921 B2 | 2/2011 | Dattilo et al. | |
| 7,890,850 B1 | 2/2011 | Bryar et al. | |
| 7,894,984 B2 * | 2/2011 | Rasmussen | G01C 21/32 701/452 |
| 7,899,611 B2 | 3/2011 | Downs et al. | |
| 7,899,796 B1 | 3/2011 | Borthwick et al. | |
| 7,917,376 B2 | 3/2011 | Bellin et al. | |
| 7,920,963 B2 * | 4/2011 | Jouline | G01C 21/36 701/420 |
| 7,933,862 B2 | 4/2011 | Chamberlain et al. | |
| 8,085,268 B2 | 4/2011 | Carrino et al. | |
| 7,941,321 B2 | 5/2011 | Greenstein et al. | |
| 7,941,336 B1 | 5/2011 | Robin-Jan | |
| 7,945,852 B1 | 5/2011 | Pilskains | |
| 7,949,960 B2 | 5/2011 | Roessler et al. | |
| 7,958,147 B1 | 6/2011 | Turner et al. | |
| 7,962,281 B2 * | 6/2011 | Rasmussen | G01C 21/32 701/429 |
| 7,962,495 B2 | 6/2011 | Jain et al. | |
| 7,962,848 B2 | 6/2011 | Bertram | |
| 7,966,199 B1 | 6/2011 | Frasher | |
| 7,970,240 B1 | 6/2011 | Chao et al. | |
| 7,971,150 B2 | 6/2011 | Raskutti et al. | |
| 7,984,374 B2 | 7/2011 | Caro et al. | |
| 8,001,465 B2 | 8/2011 | Kudrolli et al. | |
| 8,001,482 B2 | 8/2011 | Bhattiprolu et al. | |
| 8,010,507 B2 | 8/2011 | Poston et al. | |
| 8,010,545 B2 * | 8/2011 | Stefik | G06F 16/355 707/758 |
| 8,015,487 B2 | 9/2011 | Roy et al. | |
| 8,024,778 B2 | 9/2011 | Cash et al. | |
| 8,036,632 B1 | 10/2011 | Cona et al. | |
| 8,036,971 B2 | 10/2011 | Aymeloglu et al. | |
| 8,046,283 B2 | 10/2011 | Burns | |
| 8,054,756 B2 | 11/2011 | Chand et al. | |
| 8,065,080 B2 | 11/2011 | Koch | |
| 8,073,857 B2 | 12/2011 | Sreekanth | |
| 8,095,434 B1 | 1/2012 | Puttick et al. | |
| 8,103,543 B1 | 1/2012 | Zwicky | |
| 8,134,457 B2 | 3/2012 | Velipasalar et al. | |
| 8,145,703 B2 * | 3/2012 | Frishert | G06F 16/9537 709/203 |
| 8,185,819 B2 | 5/2012 | Sah et al. | |
| 8,191,005 B2 | 5/2012 | Baier et al. | |
| 8,200,676 B2 | 6/2012 | Frank | |
| 8,214,361 B1 * | 7/2012 | Sandler | G06F 16/951 707/732 |
| 8,214,490 B1 | 7/2012 | Vos et al. | |
| 8,214,764 B2 * | 7/2012 | Gemmell | G06F 16/9038 715/833 |
| 8,225,201 B2 | 7/2012 | Michael | |
| 8,229,902 B2 | 7/2012 | Vishniac et al. | |
| 8,229,947 B2 * | 7/2012 | Fujinaga | G06F 16/338 707/765 |
| 8,230,333 B2 | 7/2012 | Decherd et al. | |
| 8,271,461 B2 | 9/2012 | Pike et al. | |
| 8,280,880 B1 * | 10/2012 | Aymeloglu | G06F 16/248 707/726 |
| 8,290,838 B1 | 10/2012 | Thakur et al. | |
| 8,290,926 B2 | 10/2012 | Ozzie et al. | |
| 8,290,942 B2 * | 10/2012 | Jones | G06Q 30/0205 707/723 |
| 8,290,943 B2 | 10/2012 | Carbone et al. | |
| 8,301,464 B1 | 10/2012 | Cave et al. | |
| 8,301,904 B1 | 10/2012 | Gryaznov | |
| 8,302,855 B2 | 11/2012 | Ma et al. | |
| 8,312,367 B2 | 11/2012 | Foster | |
| 8,312,546 B2 | 11/2012 | Alme | |
| 8,325,178 B1 | 12/2012 | Doyle, Jr. | |
| 8,352,881 B2 | 1/2013 | Champion et al. | |
| 8,368,695 B2 * | 2/2013 | Howell | G06K 9/0063 345/427 |
| 8,386,377 B1 | 2/2013 | Xiong et al. | |
| 8,396,740 B1 | 3/2013 | Watson | |
| 8,397,171 B2 * | 3/2013 | Klassen | G01C 21/3682 345/157 |
| 8,400,448 B1 | 3/2013 | Doyle, Jr. | |
| 8,407,180 B1 | 3/2013 | Ramesh et al. | |
| 8,412,234 B1 | 4/2013 | Gatmir-Motahair et al. | |
| 8,412,707 B1 * | 4/2013 | Mianji | G06F 16/38 707/736 |
| 8,422,825 B1 | 4/2013 | Neophytou et al. | |
| 8,447,722 B1 | 5/2013 | Ahuja et al. | |
| 8,452,790 B1 * | 5/2013 | Mianji | G06F 16/38 707/758 |
| 8,463,036 B1 * | 6/2013 | Ramesh | G06K 9/4642 382/170 |
| 8,473,454 B2 | 6/2013 | Evanitsky et al. | |
| 8,484,115 B2 | 7/2013 | Aymeloglu et al. | |
| 8,489,331 B2 * | 7/2013 | Kopf | G01C 21/3614 701/426 |
| 8,489,641 B1 * | 7/2013 | Seefeld | G06F 16/444 707/792 |
| 8,494,984 B2 | 7/2013 | Hwang et al. | |
| 8,498,984 B1 * | 7/2013 | Hwang | G06F 16/951 707/731 |
| 8,508,533 B2 | 8/2013 | Cervelli et al. | |
| 8,510,743 B2 | 8/2013 | Hackborn et al. | |
| 8,514,082 B2 | 8/2013 | Cova et al. | |
| 8,514,229 B2 | 8/2013 | Cervelli et al. | |
| 8,515,207 B2 * | 8/2013 | Chau | G06F 16/58 382/294 |
| 8,527,949 B1 | 9/2013 | Pleis et al. | |
| 8,554,579 B2 | 10/2013 | Tribble et al. | |
| 8,554,653 B2 | 10/2013 | Falkenborg et al. | |
| 8,554,709 B2 | 10/2013 | Goodson et al. | |
| 8,560,413 B1 | 10/2013 | Ouarterman | |
| 8,564,596 B2 | 10/2013 | Carrino et al. | |
| 8,577,911 B1 | 11/2013 | Stepinski et al. | |
| 8,589,273 B2 | 11/2013 | Creeden et al. | |
| 8,595,234 B2 | 11/2013 | Siripuapu et al. | |
| 8,599,203 B2 | 12/2013 | Horowitz et al. | |
| 8,620,641 B2 | 12/2013 | Farnsworth et al. | |
| 8,646,080 B2 | 2/2014 | Williamson et al. | |
| 8,639,757 B1 | 3/2014 | Adams et al. | |
| 8,676,857 B1 | 3/2014 | Adams et al. | |
| 8,682,696 B1 | 3/2014 | Shanmugam | |
| 8,688,573 B1 | 4/2014 | Ruknoic et al. | |
| 8,689,108 B1 | 4/2014 | Duffield et al. | |
| 8,713,467 B1 | 4/2014 | Goldenberg et al. | |
| 8,726,379 B1 | 5/2014 | Stiansen et al. | |
| 8,732,574 B2 | 5/2014 | Burr et al. | |
| 8,739,278 B2 | 5/2014 | Varghese | |
| 8,742,934 B1 | 6/2014 | Sarpy et al. | |
| 8,744,890 B1 | 6/2014 | Bernier | |
| 8,745,516 B2 | 6/2014 | Mason et al. | |
| 8,781,169 B2 | 7/2014 | Jackson et al. | |
| 8,787,939 B2 | 7/2014 | Papakipos et al. | |
| 8,788,407 B1 | 7/2014 | Singh et al. | |
| 8,799,313 B2 | 8/2014 | Satlow | |
| 8,799,799 B1 * | 8/2014 | Cervelli | G06F 3/0481 715/765 |
| 8,807,948 B2 | 8/2014 | Luo et al. | |
| 8,812,960 B1 | 8/2014 | Sun et al. | |
| 8,830,322 B2 | 9/2014 | Nerayoff et al. | |
| 8,832,594 B1 | 9/2014 | Thompson et al. | |
| 8,868,537 B1 | 10/2014 | Colgrove et al. | |

(56) References Cited

U.S. PATENT DOCUMENTS

| | | |
|---|---|---|
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,983,494 B1 | 3/2015 | Onnen et al. |
| 8,984,390 B2 | 3/2015 | Aymeloglu et al. |
| 9,009,171 B1 | 4/2015 | Grossman et al. |
| 9,009,177 B2 | 4/2015 | Zheng et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,100,428 B1 | 8/2015 | Visbal |
| 9,104,293 B1 | 8/2015 | Kornfeld et al. |
| 9,104,695 B1 | 8/2015 | Cervelli et al. |
| 9,111,380 B2 | 8/2015 | Piemonte et al. |
| 9,116,975 B2 | 8/2015 | Shankar et al. |
| 9,129,219 B1 | 9/2015 | Robertson et al. |
| 9,146,125 B2 | 9/2015 | Vulcano et al. |
| 9,165,100 B2 | 10/2015 | Begur et al. |
| 9,280,618 B1 | 3/2016 | Bruce et al. |
| 9,600,146 B2 | 3/2017 | Cervelli et al. |
| 2001/0021936 A1 | 9/2001 | Bertram |
| 2002/0003539 A1 | 1/2002 | Abe |
| 2002/0032677 A1 | 3/2002 | Morgenthaler et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1* | 8/2002 | Ruiz .............. G09B 29/006 701/431 |
| 2002/0130867 A1 | 9/2002 | Yang et al. |
| 2002/0130906 A1 | 9/2002 | Miyaki |
| 2002/0130907 A1 | 9/2002 | Chi et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2002/0196229 A1 | 12/2002 | Chen et al. |
| 2003/0028560 A1 | 2/2003 | Kudrolli et al. |
| 2003/0036848 A1 | 2/2003 | Sheha et al. |
| 2003/0036927 A1 | 2/2003 | Bowen |
| 2003/0039948 A1 | 2/2003 | Donahue |
| 2003/0052896 A1 | 3/2003 | Higgins et al. |
| 2003/0093755 A1 | 5/2003 | O'Carroll |
| 2003/0103049 A1 | 6/2003 | Kindratenko et al. |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1* | 12/2003 | Iwayama .............. G06F 16/355 |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0034570 A1 | 2/2004 | Davis |
| 2004/0039498 A1 | 2/2004 | Ollis et al. |
| 2004/0044648 A1 | 3/2004 | Anfindsen et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0111410 A1 | 6/2004 | Burgoon et al. |
| 2004/0111480 A1 | 6/2004 | Yue |
| 2004/0123135 A1 | 6/2004 | Goddard |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0175036 A1 | 9/2004 | Graham |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0217884 A1 | 11/2004 | Samadani et al. |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0028191 A1 | 2/2005 | Sullivan et al. |
| 2005/0031197 A1 | 2/2005 | Knopp |
| 2005/0034062 A1 | 2/2005 | Bufkin et al. |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1* | 4/2005 | Gemmell ............ G06F 16/9038 |
| 2005/0086207 A1 | 4/2005 | Heuer et al. |
| 2005/0091186 A1 | 4/2005 | Elish |
| 2005/0125715 A1 | 6/2005 | Franco et al. |
| 2005/0143602 A1 | 6/2005 | Yada et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182502 A1 | 8/2005 | Iyengar |
| 2005/0182793 A1* | 8/2005 | Keenan ................ G09B 29/004 |
| 2005/0183005 A1 | 8/2005 | Denoue et al. |
| 2005/0210409 A1 | 9/2005 | Jou |
| 2005/0223044 A1 | 10/2005 | Ashworth et al. |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |
| 2006/0026170 A1* | 2/2006 | Kreitler ............. G06F 16/9537 |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0047804 A1 | 3/2006 | Fredricksen et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0129191 A1 | 6/2006 | Sullivan et al. |
| 2006/0129746 A1 | 6/2006 | Porter |
| 2006/0136513 A1 | 6/2006 | Ngo et al. |
| 2006/0139375 A1* | 6/2006 | Rasmussen ............ G01C 21/32 345/641 |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0200384 A1 | 9/2006 | Arutunian et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0251307 A1 | 11/2006 | Florin et al. |
| 2006/0259527 A1 | 11/2006 | Devarakonda et al. |
| 2006/0265417 A1 | 11/2006 | Amato et al. |

(56) References Cited

U.S. PATENT DOCUMENTS

| | | |
|---|---|---|
| 2006/0271277 A1* | 11/2006 | Hu .................. G01C 21/343 |
| | | 701/533 |
| 2006/0277460 A1 | 12/2006 | Forstall et al. |
| 2006/0279630 A1 | 12/2006 | Aggarwal et al. |
| 2006/0294223 A1 | 12/2006 | Glasgow et al. |
| 2007/0000999 A1 | 1/2007 | Kubo et al. |
| 2007/0011150 A1* | 1/2007 | Frank .................. G06F 16/9537 |
| 2007/0011304 A1 | 1/2007 | Error |
| 2007/0016363 A1* | 1/2007 | Huang .................. G08G 1/202 |
| | | 701/533 |
| 2007/0016435 A1 | 1/2007 | Bevington |
| 2007/0024620 A1 | 2/2007 | Muller-Fischer et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1* | 4/2007 | Ott, IV .............. G06F 16/9535 |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0115373 A1 | 5/2007 | Gallagher et al. |
| 2007/0136095 A1 | 6/2007 | Weinstein |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0185867 A1 | 8/2007 | Maga |
| 2007/0185894 A1 | 8/2007 | Swain et al. |
| 2007/0188516 A1 | 8/2007 | Loup et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0258642 A1 | 11/2007 | Thota |
| 2007/0266336 A1 | 11/2007 | Nojima et al. |
| 2007/0284433 A1 | 12/2007 | Domenica et al. |
| 2007/0294643 A1* | 12/2007 | Kyle .................. G08G 1/096811 |
| | | 715/855 |
| 2007/0299697 A1 | 12/2007 | Friedlander et al. |
| 2008/0010605 A1 | 1/2008 | Frank |
| 2008/0016155 A1 | 1/2008 | Khalatian |
| 2008/0016216 A1 | 1/2008 | Worley et al. |
| 2008/0040275 A1 | 2/2008 | Paulsen et al. |
| 2008/0040684 A1* | 2/2008 | Crump .................. G06F 3/0482 |
| | | 715/808 |
| 2008/0051989 A1 | 2/2008 | Welsh |
| 2008/0052142 A1 | 2/2008 | Bailey et al. |
| 2008/0066052 A1 | 3/2008 | Wolfram |
| 2008/0069081 A1 | 3/2008 | Chand et al. |
| 2008/0077597 A1 | 3/2008 | Butler |
| 2008/0077642 A1* | 3/2008 | Carbone ............ G06F 16/9537 |
| | | 709/203 |
| 2008/0082486 A1 | 4/2008 | Lermant et al. |
| 2008/0082578 A1 | 4/2008 | Hogue et al. |
| 2008/0091693 A1 | 4/2008 | Murthy |
| 2008/0098085 A1 | 4/2008 | Krane et al. |
| 2008/0103996 A1 | 5/2008 | Forman et al. |
| 2008/0104019 A1* | 5/2008 | Nath .................. G06F 16/9537 |
| 2008/0109714 A1 | 5/2008 | Kumar et al. |
| 2008/0126951 A1 | 5/2008 | Sood et al. |
| 2008/0133579 A1 | 6/2008 | Lim |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0163073 A1 | 7/2008 | Becker et al. |
| 2008/0172607 A1 | 7/2008 | Baer |
| 2008/0177782 A1 | 7/2008 | Poston et al. |
| 2008/0192053 A1 | 8/2008 | Howell et al. |
| 2008/0195417 A1 | 8/2008 | Surpin et al. |
| 2008/0195474 A1 | 8/2008 | Lau et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0223834 A1 | 9/2008 | Griffiths et al. |
| 2008/0229056 A1 | 9/2008 | Agarwal et al. |
| 2008/0243711 A1 | 10/2008 | Aymeloglu et al. |
| 2008/0249820 A1 | 10/2008 | Pathria |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1* | 11/2008 | Grange .................. G01C 21/36 |
| | | 340/539.2 |
| 2008/0288306 A1 | 11/2008 | MacIntyre et al. |
| 2008/0294678 A1 | 11/2008 | Gorman et al. |
| 2008/0301643 A1* | 12/2008 | Appleton .............. G06Q 30/02 |
| | | 717/124 |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0026170 A1 | 1/2009 | Tanaka et al. |
| 2009/0027418 A1* | 1/2009 | Maru .................. G06Q 30/02 |
| | | 345/629 |
| 2009/0030915 A1 | 1/2009 | Winter et al. |
| 2009/0031401 A1 | 1/2009 | Cudich et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094187 A1 | 4/2009 | Miyaki |
| 2009/0094270 A1 | 4/2009 | Alirez et al. |
| 2009/0100018 A1 | 4/2009 | Roberts |
| 2009/0106178 A1 | 4/2009 | Chu |
| 2009/0112678 A1 | 4/2009 | Luzardo |
| 2009/0112745 A1 | 4/2009 | Stefanescu |
| 2009/0115786 A1 | 5/2009 | Shmiasaki et al. |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1* | 5/2009 | Reed, Jr. .............. G06F 3/0481 |
| | | 715/781 |
| 2009/0143052 A1 | 6/2009 | Bates et al. |
| 2009/0144262 A1* | 6/2009 | White .................. G06F 16/242 |
| 2009/0144274 A1 | 6/2009 | Fraleigh et al. |
| 2009/0150868 A1 | 6/2009 | Chakra et al. |
| 2009/0157732 A1 | 6/2009 | Hao et al. |
| 2009/0158185 A1 | 6/2009 | Lacevic et al. |
| 2009/0164934 A1 | 6/2009 | Bhattiprolu et al. |
| 2009/0171939 A1* | 7/2009 | Athsani .................. G06F 16/29 |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187447 A1 | 7/2009 | Cheng et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0199106 A1 | 8/2009 | Jonsson et al. |
| 2009/0222400 A1* | 9/2009 | Kupershmidt ......... G06N 20/00 |
| | | 706/52 |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248593 A1 | 10/2009 | Putzolu et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |

(56) References Cited

U.S. PATENT DOCUMENTS

| | | |
|---|---|---|
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1* | 11/2009 | Oxford .................. G06Q 30/06 705/26.1 |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0016910 A1 | 1/2010 | Sullivan et al. |
| 2010/0030722 A1 | 2/2010 | Goodson et al. |
| 2010/0031141 A1 | 2/2010 | Summers et al. |
| 2010/0031183 A1 | 2/2010 | Kang |
| 2010/0042922 A1 | 2/2010 | Bradateanu et al. |
| 2010/0049872 A1 | 2/2010 | Roskind |
| 2010/0057622 A1 | 3/2010 | Faith et al. |
| 2010/0057716 A1* | 3/2010 | Stefik .................. G06F 16/355 707/E17.108 |
| 2010/0063961 A1 | 3/2010 | Guiheneuf et al. |
| 2010/0070523 A1* | 3/2010 | Delgo .................. G11B 27/28 707/769 |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076968 A1 | 3/2010 | Boyns et al. |
| 2010/0088304 A1 | 4/2010 | Jackson |
| 2010/0088398 A1 | 4/2010 | Plamondon |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0185692 A1 | 7/2010 | Zhang et al. |
| 2010/0191563 A1 | 7/2010 | Schlaifer et al. |
| 2010/0198684 A1* | 8/2010 | Eraker .................. G06Q 30/02 705/14.49 |
| 2010/0199225 A1* | 8/2010 | Coleman .................. G06F 3/038 715/858 |
| 2010/0223260 A1 | 9/2010 | Wu |
| 2010/0228812 A1 | 9/2010 | Uomini |
| 2010/0235915 A1 | 9/2010 | Memon et al. |
| 2010/0238174 A1 | 9/2010 | Haub et al. |
| 2010/0250412 A1 | 9/2010 | Wagner |
| 2010/0262688 A1 | 10/2010 | Hussain et al. |
| 2010/0262901 A1 | 10/2010 | DiSalvo |
| 2010/0277611 A1 | 11/2010 | Holt et al. |
| 2010/0280851 A1 | 11/2010 | Merkin |
| 2010/0280857 A1 | 11/2010 | Liu et al. |
| 2010/0293174 A1* | 11/2010 | Bennett .................. G06F 16/353 707/759 |
| 2010/0306713 A1 | 12/2010 | Geisner et al. |
| 2010/0306722 A1 | 12/2010 | LeHoty et al. |
| 2010/0312837 A1 | 12/2010 | Bodapati et al. |
| 2010/0312858 A1 | 12/2010 | Mickens et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1* | 12/2010 | Ellren .................. G06F 16/29 345/587 |
| 2010/0321871 A1 | 12/2010 | Diebel et al. |
| 2010/0325526 A1 | 12/2010 | Ellis et al. |
| 2010/0325581 A1 | 12/2010 | Finkelstein et al. |
| 2010/0328112 A1 | 12/2010 | Liu |
| 2010/0330801 A1 | 12/2010 | Rouh |
| 2010/0332324 A1 | 12/2010 | Khosravy et al. |
| 2011/0004498 A1 | 1/2011 | Readshaw |
| 2011/0022312 A1 | 1/2011 | McDonough et al. |
| 2011/0029526 A1 | 2/2011 | Knight et al. |
| 2011/0029641 A1 | 2/2011 | Fainberg et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0090085 A1 | 4/2011 | Belz et al. |
| 2011/0090254 A1 | 4/2011 | Carrino et al. |
| 2011/0093327 A1 | 4/2011 | Fordyce, III et al. |
| 2011/0099046 A1 | 4/2011 | Weiss et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0125372 A1 | 5/2011 | Ito |
| 2011/0137766 A1 | 6/2011 | Rasmussen et al. |
| 2011/0153368 A1 | 6/2011 | Pierre et al. |
| 2011/0153384 A1 | 6/2011 | Horne et al. |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0167710 A1 | 7/2011 | Ramakrishnan et al. |
| 2011/0170799 A1* | 7/2011 | Carrino .................. G06T 17/05 382/285 |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0185316 A1 | 7/2011 | Reid et al. |
| 2011/0208565 A1 | 8/2011 | Ross et al. |
| 2011/0208724 A1* | 8/2011 | Jones .................. G06Q 30/0205 707/723 |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0238690 A1 | 9/2011 | Arrasvuori et al. |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004894 A1 | 1/2012 | Butler |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1* | 3/2012 | Appleton .................. G06Q 30/02 709/203 |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0084287 A1 | 4/2012 | Lakshminarayan et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |

(56) References Cited

U.S. PATENT DOCUMENTS

| | | |
|---|---|---|
| 2012/0137235 A1 | 5/2012 | Ts et al. |
| 2012/0144325 A1 | 6/2012 | Mital et al. |
| 2012/0144335 A1 | 6/2012 | Abeln et al. |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0188252 A1 | 7/2012 | Law |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0206469 A1 | 8/2012 | Hulubei et al. |
| 2012/0208636 A1* | 8/2012 | Feige ............ A63F 13/352 463/31 |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1* | 12/2012 | Osann, Jr. ............ G06F 16/9535 707/722 |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0021445 A1 | 1/2013 | Cossette-Pacheco et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0076732 A1 | 3/2013 | Cervelli et al. |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0100134 A1 | 4/2013 | Cervelli et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0132398 A1 | 5/2013 | Pfiefle |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1* | 7/2013 | Mitchell ............ G01C 21/3682 345/522 |
| 2013/0179420 A1* | 7/2013 | Park ............ G06F 16/9535 707/706 |
| 2013/0185245 A1 | 7/2013 | Anderson |
| 2013/0185307 A1 | 7/2013 | El-Yaniv et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0254900 A1 | 9/2013 | Sathish et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1* | 10/2013 | Fisher ............ G06F 16/248 707/723 |
| 2013/0279757 A1 | 10/2013 | Kephart |
| 2013/0282696 A1 | 10/2013 | John et al. |
| 2013/0282723 A1 | 10/2013 | Petersen et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0339891 A1 | 12/2013 | Blumenberg et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0033120 A1 | 1/2014 | Bental et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0218400 A1 | 8/2014 | O'Toole et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0333651 A1 | 11/2014 | Cervelli et al. |

(56) References Cited

U.S. PATENT DOCUMENTS

| | | | |
|---|---|---|---|
| 2014/0337772 A1* | 11/2014 | Cervelli | G06F 3/0481 715/766 |
| 2014/0344230 A1 | 11/2014 | Krause et al. | |
| 2014/0351070 A1 | 11/2014 | Christner et al. | |
| 2014/0358829 A1 | 12/2014 | Hurwitz | |
| 2014/0361899 A1 | 12/2014 | Layson | |
| 2014/0365965 A1 | 12/2014 | Bray et al. | |
| 2014/0366132 A1 | 12/2014 | Stiansen et al. | |
| 2015/0019394 A1 | 1/2015 | Unser et al. | |
| 2015/0026622 A1 | 1/2015 | Roaldson et al. | |
| 2015/0029176 A1 | 1/2015 | Baxter et al. | |
| 2015/0046870 A1* | 2/2015 | Goldenberg | G06F 3/0481 715/786 |
| 2015/0073929 A1 | 3/2015 | Psota et al. | |
| 2015/0073954 A1 | 3/2015 | Braff | |
| 2015/0089353 A1 | 3/2015 | Folkening | |
| 2015/0089424 A1 | 3/2015 | Duffield et al. | |
| 2015/0095773 A1 | 4/2015 | Gonsalves et al. | |
| 2015/0100897 A1* | 4/2015 | Sun | H04L 61/6077 715/753 |
| 2015/0100907 A1* | 4/2015 | Erenrich | G06F 3/0484 715/765 |
| 2015/0106170 A1 | 4/2015 | Bonica | |
| 2015/0106379 A1 | 4/2015 | Elliot et al. | |
| 2015/0134666 A1 | 5/2015 | Gattiker et al. | |
| 2015/0135256 A1 | 5/2015 | Hoy et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178825 A1 | 6/2015 | Huerta | |
| 2015/0178877 A1 | 6/2015 | Bogomolov et al. | |
| 2015/0186483 A1 | 7/2015 | Tappan et al. | |
| 2015/0186821 A1 | 7/2015 | Wang et al. | |
| 2015/0187036 A1 | 7/2015 | Wang et al. | |
| 2015/0187100 A1 | 7/2015 | Berry et al. | |
| 2015/0188872 A1 | 7/2015 | White | |
| 2015/0212663 A1 | 7/2015 | Papale et al. | |
| 2015/0227295 A1 | 8/2015 | Meiklejohn et al. | |
| 2015/0254220 A1 | 9/2015 | Burr et al. | |
| 2015/0309719 A1 | 10/2015 | Ma et al. | |
| 2015/0312323 A1 | 10/2015 | Peterson | |
| 2015/0317342 A1 | 11/2015 | Grossman et al. | |
| 2015/0324868 A1 | 11/2015 | Kaftan et al. | |
| 2015/0338233 A1 | 11/2015 | Cervelli et al. | |
| 2015/0379413 A1 | 12/2015 | Robertson et al. | |
| 2016/0004764 A1 | 1/2016 | Chakerian et al. | |
| 2016/0026923 A1 | 1/2016 | Erenrich et al. | |
| 2016/0055501 A1 | 2/2016 | Mukherjee et al. | |
| 2016/0062555 A1 | 3/2016 | Ward et al. | |
| 2017/0052654 A1 | 2/2017 | Cervelli et al. | |
| 2017/0052655 A1 | 2/2017 | Cervelli et al. | |
| 2017/0052747 A1 | 2/2017 | Cervelli et al. | |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102013222023 | 1/2015 |
| DE | 102014215621 | 2/2015 |
| EP | 0 763 201 | 3/1997 |
| EP | 1 672 527 | 6/2006 |
| EP | 2487610 | 8/2012 |
| EP | 2551799 | 1/2013 |
| EP | 2560134 | 2/2013 |
| EP | 2 575 107 | 4/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963595 | 1/2016 |
| EP | 2988258 | 2/2016 |
| EP | 2993595 | 3/2016 |
| EP | 3070622 | 9/2016 |
| EP | 3133510 | 2/2017 |
| EP | 3139333 | 3/2017 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 95/032424 | 11/1995 |
| WO | WO 00/009529 | 2/2000 |
| WO | WO 01/025906 | 4/2001 |
| WO | WO 2001/088750 | 11/2001 |
| WO | WO 2001/098925 | 12/2001 |
| WO | WO 2002/065353 | 8/2002 |
| WO | WO 2004/057268 | 7/2004 |
| WO | WO 2005/013200 | 2/2005 |
| WO | WO 2005/104736 | 11/2005 |
| WO | WO 2005/116851 | 12/2005 |
| WO | WO 2007/133206 | 11/2007 |
| WO | WO 2008/064207 | 5/2008 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2010/030914 | 3/2010 |
| WO | WO 2011/058507 | 5/2011 |
| WO | WO 2012/119008 | 9/2012 |
| WO | WO 2013/010157 | 1/2013 |
| WO | WO 2013/102892 | 7/2013 |

OTHER PUBLICATIONS

Bluttman et al., "Excel Formulas and Functions for Dummies," 2005, Wiley Publishing, Inc., pp. 280, 284-286.
Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.
Keylines.com, "KeyLines Datasheet," Mar. 2014, http://keylines.com/wp-content/uploads/2014/03/KeyLines-datasheet.pdf downloaded May 12, 2014 in 2 pages.
Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.
Manno et al., "Introducing Collaboration in Single-user Applications through the Centralized Control Architecture," 2010, pp. 10.
Rouse, Margaret, "OLAP Cube," http://searchdatamanagement.techtarget.com/definition/OLAP-cube, Apr. 28, 2012, pp. 16.
Official Communication in Great Britian Application No. 1319225.7 dated May 2, 2014.
Official Communication in New Zealand Application No. 624557 dated May 14, 2014.
"A First Look: Predicting Market Demand for Food Retail using a Huff Analysis," TRF Policy Solutions, Jul. 2012, pp. 30.
Acklen, Laura, "Absolute Beginner's Guide to Microsoft Word 2003," Dec. 24, 2003, pp. 15-18, 34-41, 308-316.

(56) References Cited

OTHER PUBLICATIONS

Ananiev et al., "The New Modality API," http://web.archive.org/web/20061211011958/http://java.sun.com/developer/technicalArticles/J2SE/Desktop/javase6/modality/ Jan. 21, 2006, pp. 8.
"Andy Turner's GISRUK 2012 Notes" https://docs.google.com/document/d/1cTmxg7mVx5gd89lqblCYvCEnHA4QAivH4I4WpyPsqE4/edit?pli=1 printed Sep. 16, 2013 in 15 pages.
Barnes et al., "Viewshed Analysis", GIS-ARC/INFO 2001, www.evsc.virginia.edu/~jhp7e/evsc466/student_pres/Rounds.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Ghosh, P., "A Solution of Polygon Containment, Spatial Planning, and Other Related Problems Using Minkowski Operations," Computer Vision, Graphics, and Image Processing, 1990, vol. 49, pp. 1-35.
GIS-NET 3 Public—Department of Regional Planning. Planning & Zoning Information for Unincorporated LA County. Retrieved Oct. 2, 2013 from http://gis.planning.lacounty.gov/GIS-NET3 Public/Viewer.html.
Griffith, Daniel A., "A Generalized Huff Model," Geographical Analysis, Apr. 1982, vol. 14, No. 2, pp. 135-144.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Mandagere, Nagapramod, "Buffer Operations in GIS," http://www-users.cs.umn.edu/~npramod/enc_pdf.pdf retrieved Jan. 28, 2010, pp. 7.
Manske, "File Saving Dialogs," http://www.mozilla.org/editor/ui_specs/FileSaveDialogs.html, Jan. 20, 1999, pp. 7.
Map Builder, "Rapid Mashup Development Tool for Google and Yahoo Maps!" http://web.archive.org/web/20090626224734/http://www.mapbuilder.net/ printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Murray, C., Oracle Spatial Developer's Guide-6 Coordinate Systems (Spatial Reference Systems), http://docs.oracle.com/cd/B28359_01/appdev.111/b28400.pdf, Jun. 2009.
Open Street Map, "Amm's Diary:Unconnected ways and other data quality issues," http://www.openstreetmap.org/user/amm/diary printed Jul. 23, 2012 in 3 pages.
POI Editor, "How to: Create Your Own Points of Interest," http://www.poieditor.com/articles/how_to_create_your_own_points_of_interest/ printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", http://web.archive.org/web/20091202221925/http://www.utsa.edu/lrsg/Teaching/EES6513/08-3D.pdf printed Sep. 16, 2013 in 26 pages.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. http://pdf.aminer.org/000/648/038/under_the_hood_of_geovrml.pdf.
Reibel et al., "Areal Interpolation of Population Counts Using Pre-classified Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," http://web.archive.org/web/20061001053327/http://sonris-www.dnr.state.la.us/gis/instruct_files/tutslide12 printed Jan. 3, 2013 in 1 page.
Tangelder et al., "Freeform Shape Matching Using Minkowski Operations," The Netherlands, Jun. 1996, pp. 12.
VB Forums, "Buffer A Polygon," Internet Citation, http://www.vbforums.com/showthread.php?198436-Buffer-a-Polygon, Specifically Thread #1, #5 & #11 retrieved on May 2, 2013, pp. 8.
Vivid Solutions, "JTS Topology Suite: Technical Specifications," http://www.vividsolutions.com/jts/bin/JTS%20Technical%20Specs.pdf Version 1.4, 2003, pp. 36.
Wikipedia, "Douglas-Peucker-Algorithms," http://de.wikipedia.org/w/index.php?title=Douglas-Peucker-Algorithmus&oldid=91846042 printed Jul. 2011, pp. 2.
Wikipedia, "Ramer-Douglas-Peucker Algorithm," http://en.wikipedia.org/wiki/Ramer%E2%80%93Douglas%E2%80%93Peucker_algorithm printed Jul. 2011, pp. 3.
Woodbridge, Stephen, "[geos-devel] Polygon simplification," http://lists.osgeo.org/pipermail/geos-devel/2011-May/005210,html dated May 8, 2011, pp. 3.
International Search Report and Written Opinion in Application No. PCT/US2009/056703, dated Mar. 15, 2010.
Official Communication in Australian Application No. AU2010257305, dated Apr. 12, 2011.
Official Communication in Australian Application No. AU2010257305, dated Sep. 22, 2011.
European Search Report in European Application No. EP10195798.3, dated May 17, 2011.
Official Communication in Australian Application No. AU2010227081, dated Mar. 18, 2011.

(56) References Cited

OTHER PUBLICATIONS

European Search Report in European Application No. EP12186236.1, dated May 17, 2013.
Official Communication in New Zealand Application No. 616167 dated Oct. 10, 2013.
"A Quick Guide to UniProtKB Swiss-Prot & TrEMBL," Sep. 2011, pp. 2.
Boyce, Jim, "Microsoft Outlook 2010 Inside Out," Aug. 1, 2010, retrieved from the internet https://capdtron.files.wordpress.com/2013/01/outlook-2010-inside_out.pdf.
Canese et al., "Chapter 2: PubMed: The Bibliographic Database," The NCBI Handbook, Oct. 2002, pp. 1-10.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," May 1, 2008, pp. 15.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Gorr et al., "Crime Hot Spot Forecasting: Modeling and Comparative Evaluation," Grant 98-IJ-CX-K005, May 6, 2002, 37 pages.
Goswami, Gautam, "Quite Writely Said!," One Brick at a Time, Aug. 21, 2005, pp. 7.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Kahan et al., "Annotea: an open RDF infrastructure for shared WEB annotations", Computer Networks 39, pp. 589-608, 2002.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Madden, Tom, "Chapter 16: The BLAST Sequence Analysis Tool," The NCBI Handbook, Oct. 2002, pp. 1-15.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents," 2002, 6 pages.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Umagandhi et al., "Search Query Recommendations Using Hybrid User Profile with Query Logs," International Journal of Computer Applications, vol. 80, No. 10, Oct. 1, 2013, pp. 7-18.
Valentini et al., "Ensembles of Learning Machines," M. Marinaro and R. Tagliaferri (Eds.): Wirn Vietri 2002, LNCS 2486, pp. 3-20.
Wikipedia, "Federated Database System," Sep. 7, 2013, retrieved from the internet on Jan. 27, 2015 http://en.wikpedia.org/w/index.php?title=Federated_database_system&oldid=571954221.
Wongsuphasawat et al., "Visual Analytics for Transportation Incident Data Sets," Transportation Research Record 2138, 2009, pp. 135-145.
Yang et al., "HTML Page Analysis Based on Visual Cues," 2001, pp. 859-864.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Notice of Allowance for U.S. Appl. No. 14/616,080 dated Apr. 2, 2015.
Notice of Allowance for U.S. Appl. No. 14/486,991 dated May 1, 2015.
Notice of Allowance for U.S. Appl. No. 14/225,084 dated May 4, 2015.
Notice of Allowance for U.S. Appl. No. 14/504,103 dated May 18, 2015.
Notice of Allowance for U.S. Appl. No. 13/948,859 dated Dec. 10, 2014.
Notice of Acceptance for Australian Patent Application No. 201221622 dated Jan. 6, 2015.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for New Zealand Patent Application No. 628840 dated Aug. 28, 2014.
Official Communication in New Zealand Patent Application No. 628495 dated Aug. 19, 2014.
Official Communication for Great Britain Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for European Patent Application No. 14180281.9 dated Jan. 26, 2015.
Official Communication for European Patent Application No. 14187996.5 dated Feb. 12, 2015.
Official Communication for European Patent Application No. 14180142.3 dated Feb. 6, 2015.

(56) References Cited

OTHER PUBLICATIONS

Official Communication for European Patent Application No. 14186225.0 dated Feb. 13, 2015.
Official Communication for European Patent Application No. 14189344.6 dated Feb. 20, 2015.
Official Communication for Australian Patent Application No. 2014201511 dated Feb. 27, 2015.
Official Communication for European Patent Application No. 14189347.9 dated Mar. 4, 2015.
Official Communication for European Patent Application No. 14199182.8 dated Mar. 13, 2015.
Official Communication for Australian Patent Application No. 2014202442 dated Mar. 19, 2015.
Official Communication for European Patent Application No. 14180321.3 dated Apr. 17, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14189802.3 dated May 11, 2015.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.
Official Communication for U.S. Appl. No. 14/504,103 dated Feb. 5, 2015.
Official Communication for U.S. Appl. No. 14/289,596 dated Jan. 26, 2015.
Official Communication for U.S. Appl. No. 14/319,765 dated Feb. 4, 2015.
Official Communication for U.S. Appl. No. 14/225,160 dated Feb. 11, 2015.
Official Communication for U.S. Appl. No. 14/306,138 dated Feb. 18, 2015.
Official Communication for U.S. Appl. No. 14/306,147 dated Feb. 19, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/473,552 dated Feb. 24, 2015.
Official Communication for U.S. Appl. No. 14/486,991 dated Mar. 10, 2015.
Official Communication for U.S. Appl. No. 14/306,154 dated Mar. 11, 2015.
Official Communication for U.S. Appl. No. 13/831,791 dated Mar. 4, 2015.
Official Communication for U.S. Appl. No. 14/504,103 dated Mar. 31, 2015.
Official Communication for U.S. Appl. No. 14/323,935 dated Mar. 31, 2015.
Official Communication for U.S. Appl. No. 14/326,738 dated Mar. 31, 2015.
Official Communication for U.S. Appl. No. 13/247,987 dated Apr. 2, 2015.
Official Communication for U.S. Appl. No. 14/148,568 dated Mar. 26, 2015.
Official Communication for U.S. Appl. No. 12/840,673 dated Sep. 17, 2014.
Official Communication for U.S. Appl. No. 12/840,673 dated Jan. 2, 2015.
Official Communication for U.S. Appl. No. 14/319,161 dated Jan. 23, 2015.
Official Communication for U.S. Appl. No. 13/728,879 dated Jan. 27, 2015.
Official Communication for U.S. Appl. No. 13/728,879 dated Mar. 17, 2015.
"A Word About Banks and the Laundering of Drug Money," Aug. 18, 2012, http://www.golemxiv.co.uk/2012/08/a-word-about-banks-and-the-laundering-of-drug-money/.
Abbey, Kristen, "Review of Google Docs," May 1, 2007, pp. 2.
About 80 Minutes, "Palantir in a Number of Parts—Part 6—Graph," Mar. 21, 2013, pp. 1-6.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Distimo—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Galliford, Miles, "SnagIt Versus Free Screen Capture Software: Critical Tools for Website Owners," <http://www.subhub.com/articles/free-screen-capture-software>, Mar. 27, 2008, pp. 11.
Gesher, Ari, "Palantir Screenshots in the Wild: Swing Sightings," The Palantir Blog, Sep. 11, 2007, pp. 1-12.

(56) References Cited

OTHER PUBLICATIONS

Google Analytics Official Website—Web Analytics & Reporting, <http://www.google.com/analytics.index.html> Printed Jul. 18, 2013 in 22 pages.
Gu et al., "Record Linkage: Current Practice and Future Directions," Jan. 15, 2004, pp. 32.
"GrabUp—What a Timesaver!" <http://atlchris.com/191/grabup/>, Aug. 11, 2008, pp. 3.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
JetScreenshot.com, "Share Screenshots via Internet in Seconds," <http://web.archive.org/web/20130807164204/http://www.jetscreenshot.com/>, Aug. 7, 2013, pp. 1.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Localytics—Mobile App Marketing & Analytics, <http://www.localytics.com/> Printed Jul. 18, 2013 in 12 pages.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mixpanel—Mobile Analytics, <https://mixpanel.com/> Printed Jul. 18, 2013 in 13 pages.
"Money Laundering Risks and E-Gaming: A European Overview and Assessment," 2009, http://www.cf.ac.uk/socsi/resources/Levi_Final_Money_Laundering_Risks_egaming.pdf.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, http://oreilly.com/digitalmedia/2006/01/01/mac-os-x-screenshot-secrets.html published Jan. 1, 2006 in 10 pages.
Palantir Technologies, "Palantir Labs _ Timeline," Oct. 1, 2010, retrieved from the internet https://www.youtube.com/watch?v=JCgDW5bru9M.
Perdisci et al., "Behavioral Clustering of HTTP-Based Malware and Signature Generation Using Malicious Network Traces," USENIX, Mar. 18, 2010, pp. 1-14.
Piwik—Free Web Analytics Software. <http://piwik.org/> Printed Jul. 19, 2013 in18 pages.
"Potential Money Laundering Warning Signs," snapshot taken 2003, https://web.archive.org/web/20030816090055/http:/finsolinc.com/ANTI-MONEY%20LAUNDERING%20TRAINING%GUIDES.pdf.
Quest, "Toad for ORACLE 11.6—Guide to Using Toad," Sep. 24, 2012, pp. 1-162.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Schroder, Stan, "15 Ways to Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "Snag It Online Help Guide," <http://download.techsmith.com/snagit/docs/onlinehelp/enu/snagit_help.pdf>, TechSmith Corp., Version 8.1, printed Feb. 7, 2007, pp. 284.
StatCounter—Free Invisible Web Tracker, Hit Counter and Web Stats, <http://statcounter.com/> Printed Jul. 19, 2013 in 17 pages.
Symantec Corporation, "E-Security Begins with Sound Security Policies," Announcement Symantec, Jun. 14, 2001.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
trak.io, <http://trak.io/> printed Jul. 18, 2013 in 3 pages.
UserMetrix, <http://usermetrix.com/android-analytics> printed Jul. 18, 2013 in 3 pages.
"Using Whois Based Geolocation and Google Maps API for Support Cybercrime Investigations," http://wseas.us/e-library/conferences/2013/Dubrovnik/TELECIRC/TELECIRC-32.pdf.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Multimap," Jan. 1, 2013, https://en.wikipedia.org/w/index.php?title=Multimap&oldid=530800748.
Wright et al., "Palantir Technologies VAST 2010 Challenge Text Records _ Investigations into Arms Dealing," Oct. 29, 2010, pp. 1-10.
Notice of Acceptance for Australian Patent Application No. 2013251186 dated Nov. 6, 2015.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 12/840,673 dated Apr. 6, 2015.
Notice of Allowance for U.S. Appl. No. 13/728,879 dated Jun. 21, 2016.
Notice of Allowance for U.S. Appl. No. 14/148,568 dated Aug. 26, 2015.
Notice of Allowance for U.S. Appl. No. 14/265,637 dated Feb. 13, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/479,863 dated Mar. 31, 2015.
Notice of Allowance for U.S. Appl. No. 14/552,336 dated Nov. 3, 2015.
Notice of Allowance for U.S. Appl. No. 14/730,123 dated Apr. 12, 2016.
Notice of Allowance for U.S. Appl. No. 14/746,671 dated Jan. 21, 2016.
Notice of Allowance for U.S. Appl. No. 14/934,004 dated Nov. 4, 2016.
Official Communication for Australian Patent Application No. 2013251186 dated Mar. 12, 2015.

(56) References Cited

OTHER PUBLICATIONS

Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 12181585.6 dated Sep. 4, 2015.
Official Communication for European Patent Application No. 14180432.8 dated Jun. 23, 2015.
Official Communication for European Patent Application No. 14187739.9 dated Jul. 6, 2015.
Official Communication for European Patent Application No. 14191540.5 dated May 27, 2015.
Official Communication for European Patent Application No. 14197938.5 dated Apr. 28, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for European Patent Application No. 15188106.7 dated Feb. 3, 2016.
Official Communication for European Patent Application No. 15190307.7 dated Feb. 19, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Netherlands Patent Application No. 2011632 dated Feb. 8, 2016.
Official Communication for Netherlands Patent Application No. 2011729 dated Aug. 13, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2012778 dated Sep. 22, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for U.S. Appl. No. 12/556,318 dated Jul. 2, 2015.
Official Communication for U.S. Appl. No. 12/556,321 dated Feb. 25, 2016.
Official Communication for U.S. Appl. No. 12/556,321 dated Jun. 6, 2012.
Official Communication for U.S. Appl. No. 12/556,321 dated Dec. 7, 2011.
Official Communication for U.S. Appl. No. 12/556,321 dated Jul. 7, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/728,879 dated Aug. 12, 2015.
Official Communication for U.S. Appl. No. 13/728,879 dated Nov. 20, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/141,252 dated Oct. 8, 2015.
Official Communication for U.S. Appl. No. 14/196,814 dated May 5, 2015.
Official Communication for U.S. Appl. No. 14/222,364 dated Dec. 9, 2015.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,084 dated Sep. 11, 2015.
Official Communication for U.S. Appl. No. 14/225,084 dated Jan. 4, 2016.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/265,637 dated Sep. 26, 2014.
Official Communication for U.S. Appl. No. 14/289,596 dated Apr. 30, 2015.
Official Communication for U.S. Appl. No. 14/289,596 dated May 9, 2016.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/306,138 dated Sep. 14, 2015.

(56) References Cited

OTHER PUBLICATIONS

Official Communication for U.S. Appl. No. 14/306,138 dated Mar. 17, 2016.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/306,147 dated Mar. 4, 2016.
Official Communication for U.S. Appl. No. 14/306,147 dated Aug. 7, 2015.
Official Communication for U.S. Appl. No. 14/306,154 dated Feb. 1, 2016.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/323,881 dated Apr. 18, 2017.
Official Communication for U.S. Appl. No. 14/323,935 dated Jun. 22, 2015.
Official Communication for U.S. Appl. No. 14/326,738 dated Jul. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated May 12, 2016.
Official Communication for U.S. Appl. No. 14/463,615 dated Nov. 13, 2014.
Official Communication for U.S. Appl. No. 14/463,615 dated Mar. 21, 2016.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Oct. 28, 2015.
Official Communication for U.S. Appl. No. 14/483,527 dated Jan. 28, 2015.
Official Communication for U.S. Appl. No. 14/490,612 dated Aug. 18, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/715,834 dated Feb. 29, 2016.
Official Communication for U.S. Appl. No. 14/726,353 dated Sep. 10, 2015.
Official Communication for U.S. Appl. No. 14/730,123 dated Sep. 21, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/813,749 dated Sep. 28, 2015.
Official Communication for U.S. Appl. No. 14/841,338 dated Feb. 18, 2016.
Official Communication for U.S. Appl. No. 14/842,734 dated Jun. 1, 2017.
Official Communication for U.S. Appl. No. 14/842,734 dated Nov. 19, 2015.
Official Communication for U.S. Appl. No. 14/871,465 dated Feb. 9, 2016.
Official Communication for U.S. Appl. No. 14/883,498 dated Mar. 17, 2016.
Official Communication for U.S. Appl. No. 14/883,498 dated Dec. 24, 2015.
Official Communication for U.S. Appl. No. 14/929,584 dated May 25, 2016.
Official Communication for U.S. Appl. No. 14/929,584 dated Feb. 4, 2016.
Official Communication for U.S. Appl. No. 14/934,004 dated Feb. 16, 2016.
Official Communication for U.S. Appl. No. 14/934,004 dated Jul. 29, 2016.
Official Communication for U.S. Appl. No. 15/072,133 dated Nov. 10, 2016.
Official Communication for U.S. Appl. No. 15/072,133 dated Mar. 17, 2017.
Restriction Requirement for U.S. Appl. No. 13/839,026 dated Apr. 2, 2015.
Ask Drexel University Knowledge Base, "How to: Auto Save a Document Before Printing in Word 2007," published Nov. 13, 2007.
Harville et al., "Mediabeads: An Architecture for Path-Enhanced Media Applications," 2004 IEEE International Conference on Multimedia and Expo, Jun. 27-30, 2004, Taipei, Taiwan, vol. 1, pp. 455-458.
MacWright, Tom, "Announcing MapBOx.JS 1.0 with Leaflet," Mapbox.com blog, Apr. 18, 2013, retrieved from https://www.mapbox.com/blog/mapbox-js-with-leaflet/.

(56) References Cited

OTHER PUBLICATIONS

Palantir, "Basic Map Searches," YouTube, Sep. 12, 2013, retrieved from https://www.youtube.com/watch?v=UC-1x44xFR0.

Palantir, "Intelligence Integration in Palantir: An Open-Source View of the Afghan Conflict," YouTube, Jul. 5, 2012, retrieved from https://www.youtube.com/watch?v=FXTxs2YqHY4.

"What Was It Again? Ways to Make Feature Tile Layers Interactive," WordPress.com, published Jun. 12, 2011, retrieved from https://whatwasitagain.wordpress.com/2011/06/12/interactive-feature-tile-layers/.

Notice of Allowance for U.S. Appl. No. 14/319,765 dated Nov. 25, 2016.

Notice of Allowance for U.S. Appl. No. 14/323,881 dated Jun. 30, 2017.

Notice of Allowance for U.S. Appl. No. 15/072,133 dated Jun. 23, 2017.

Official Communication for Australian Patent Application No. 2012216622 dated Jan. 6, 2015.

Official Communication for European Patent Application No. 16160781.7 dated May 27, 2016.

Official Communication for European Patent Application No. 16184373.5 dated Jan. 17, 2017.

Official Communication for European Patent Application No. 16186622.3 dated Jan. 18, 2017.

Official Communication for Great Britain Patent Application No. 1620827.4 dated Jan. 12, 2017.

Official Communication for Great Britain Patent Application No. 1620827.4 dated Jun. 28, 2017.

Official Communication for U.S. Appl. No. 12/840,673 dated Jul. 25, 2012.

Official Communication for U.S. Appl. No. 12/840,673 dated Jan. 4, 2013.

Official Communication for U.S. Appl. No. 14/289,596 dated Aug. 5, 2015.

Official Communication for U.S. Appl. No. 14/490,612 dated Jan. 27, 2015.

Official Communication for U.S. Appl. No. 14/490,612 dated Mar. 31, 2015.

Official Communication for U.S. Appl. No. 14/571,098 dated Feb. 23, 2016.

Official Communication for U.S. Appl. No. 14/715,834 dated Feb. 19, 2016.

Official Communication for U.S. Appl. No. 14/746,671 dated Sep. 28, 2015.

Notice of Allowance for U.S. Appl. No. 15/072,133 dated Sep. 25, 2017.

Official Communication for U.S. Appl. No. 14/323,881 dated Nov. 1, 2017.

Official Communication for U.S. Appl. No. 14/842,734 dated Dec. 7, 2017.

Official Communication for Great Britain Patent Application No. 1620827.4 dated Nov. 13, 2017.

Official Communication for Great Britain Patent Application No. 1620827.4 dated Sep. 21, 2017.

\* cited by examiner ures or objects to an item having the smallest number of related objects or features.

INTERACTIVE DATA OBJECT MAP

CROSS-REFERENCE TO RELATED APPLICATIONS

This application is a continuation of U.S. patent application Ser. No. 13/917,571, filed on Jun. 13, 2013, and titled "INTERACTIVE GEOSPATIAL MAP," which application claims a priority benefit under 35 U.S.C. § 119 to U.S. Provisional Patent Application No. 61/820,608, filed on May 7, 2013, and titled "INTERACTIVE DATA OBJECT MAP." All of the above-identified applications are hereby incorporated by reference herein in their entireties.

TECHNICAL FIELD

The present disclosure relates to systems and techniques for geographical data integration, analysis, and visualization. More specifically, the present disclosure relates to interactive maps including data objects.

BACKGROUND

Interactive geographical maps, such as web-based mapping service applications and Geographical Information Systems (GIS), are available from a number of providers. Such maps generally comprise satellite images or generic base layers overlaid by roads. Users of such systems may generally search for and view locations of a small number of landmarks, and determine directions from one location to another. In some interactive graphical maps, 3D terrain and/or 3D buildings may be visible in the interface.

SUMMARY

The systems, methods, and devices described herein each have several aspects, no single one of which is solely responsible for its desirable attributes. Without limiting the scope of this disclosure, several non-limiting features will now be discussed briefly.

The systems, methods, and devices of the present disclosure may provide, among other features, high-performance, interactive geospatial and/or data object map capabilities in which large amounts of geographical, geospatial, and other types of data, geodata, objects, features, and/or metadata are efficiently presented to a user on a map interface. In various embodiments, an interactive geospatial map system (also referred to as an interactive data object map system) may enable rapid and deep analysis of various objects, features, and/or metadata by the user. In some embodiments, a layer ontology may be displayed to the user. In various embodiments, when the user rolls a selection cursor over an object/feature an outline of the object/feature is displayed. Selection of an object/feature may cause display of metadata associated with that object/feature. In various embodiments, the interactive data object map system may automatically generate feature/object lists and/or histograms based on selections made by the user. Various aspects of the present disclosure may enable the user to perform geosearches, generate heatmaps, and/or perform keyword searches, among other actions.

In an embodiment, a computer system is disclosed comprising an electronic data structure configured to store a plurality of features or objects, wherein each of the features or objects is associated with metadata; a computer readable medium storing software modules including computer executable instructions; one or more hardware processors in communication with the electronic data structure and the computer readable medium, and configured to execute a user interface module of the software modules in order to: display an interactive map on an electronic display of the computer system; include on the interactive map one or more features or objects, wherein the features or objects are selectable by a user of the computer system, and wherein the features or objects are accessed from the electronic data structure; receive a first input from the user selecting one or more of the included features or objects; and in response to the first input, access, from the electronic data structure, the metadata associated with each of the selected features or objects; determine one or more metadata categories based on the accessed metadata; organize the selected features or objects into one or more histograms based on the determined metadata categories and the accessed metadata; and display the one or more histograms on the electronic display.

According to an aspect, the features or objects may comprise vector data.

According to another aspect, the features or objects may comprise at least one of roads, terrain, lakes, rivers, vegetation, utilities, street lights, railroads, hotels or motels, schools, hospitals, buildings or structures, regions, transportation objects, entities, events, or documents.

According to yet another aspect, the metadata associated with the features or objects may comprise at least one of a location, a city, a county, a state, a country, an address, a district, a grade level, a phone number, a speed, a width, or other related attributes.

According to another aspect, the features or objects may be selectable by a user using a mouse and/or a touch interface.

According to yet another aspect, each histogram of the one or more histograms may be specific to a particular metadata category.

According to another aspect, each histogram of the one or more histograms may comprise a list of items of metadata specific to the particular metadata category of the histogram, wherein the list of items is organized in descending order from an item having the largest number of related objects or features to an item having the smallest number of related objects or features.

According to yet another aspect, the one or more histograms displayed on the electronic display may be displayed so as to partially overlay the displayed interactive map.

According to another aspect, the one or more hardware processors may be further configured to execute the user interface module in order to: receive a second input from the user selecting a second one or more features or objects from the one or more histograms; and in response to the second input, update the interactive map to display the second one or more features or objects on the display; and highlight the second one or more features or objects on the interactive map.

According to yet another aspect, updating the interactive map may comprise panning and/or zooming.

According to another aspect, highlighting the second one or more features may comprise at least one of outlining, changing color, bolding, or changing contrast.

According to yet another aspect, the one or more hardware processors may be further configured to execute the user interface module in order to: receive a third input from the user selecting a drill-down group of features or objects from the one or more histograms; and in response to the third input, drill-down on the selected drill-down group of features or objects by: accessing the metadata associated with each of the features or objects of the selected drill-down group; determining one or more drill-down metadata categories based on the accessed metadata associated with each of the features or objects of the selected drill-down group; organizing the features or objects of the selected drill-down group into one or more drill-down histograms based on the determined drill-down metadata categories and the accessed metadata associated with each of the features or objects of the selected drill-down group; and displaying on the interactive map the one or more drill-down histograms.

According to another aspect, the one or more hardware processors may be further configured to execute the user interface module in order to enable the user to further drill down into the one or more drill-down histograms.

According to yet another aspect, the one or more hardware processors may be further configured to execute the user interface module in order to: receive a feature or object hover over input from the user; and in response to receiving the hover over input, highlight, on the electronic display, metadata associated with the particular hovered over feature or object to the user.

According to another aspect, one or more hardware processors may be further configured to execute the user interface module in order to: receive a feature or object selection input from the user; and in response to receiving the selection input, display, on the electronic display, metadata associated with the particular selected feature or object to the user.

In another embodiment, a computer system is disclosed comprising: an electronic data structure configured to store a plurality of features or objects, wherein each of the features or objects is associated with metadata; a computer readable medium storing software modules including computer executable instructions; one or more hardware processors in communication with the electronic data structure and the computer readable medium, and configured to execute a user interface module of the software modules in order to: display an interactive map on a display of the computer system, the interactive map comprising a plurality of map tiles accessed from the electronic data structure, the map tiles each comprising an image composed of one or more vector layers; include on the interactive map a plurality of features or objects accessed from the electronic data structure, the features or objects being selectable by a user, each of the features or objects including associated metadata; receive an input from a user including at least one of a zoom action, a pan action, a feature or object selection, a layer selection, a geosearch, a heatmap, and a keyword search; and in response to the input from the user: request, from a server, updated map tiles, the updated map tiles being updated according to the input from the user; receive the updated map tiles from the server; and update the interactive map with the updated map tiles.

According to an aspect, the one or more vector layers may comprise at least one of a regions layer, a buildings/structures layer, a terrain layer, a transportation layer, or a utilities/infrastructure layer.

According to an aspect, each of the one or more vector layers may be comprised of one or more sub-vector layers.

In yet another embodiment, a computer system is disclosed comprising: one or more hardware processors in communication with the computer readable medium, and configured to execute a user interface module of the software modules in order to: display an interactive map on a display of the computer system, the interactive map comprising a plurality of map layers; determine a list of available map layers; organizing the list of available map layers according to a hierarchical layer ontology, wherein like map layers are grouped together; and display on the interactive map the hierarchical layer ontology, wherein the user may select one or more of the displayed layers, and wherein each of the available map layers is associated with one or more feature or object types.

According to an aspect, the map layers may comprise at least one of vector layers and base layers.

BRIEF DESCRIPTION OF THE DRAWINGS

The following aspects of the disclosure will become more readily appreciated as the same become better understood by reference to the following detailed description, when taken in conjunction with the accompanying drawings.

DETAILED DESCRIPTION OF SPECIFIC EMBODIMENTS

Overview

Figure 1:
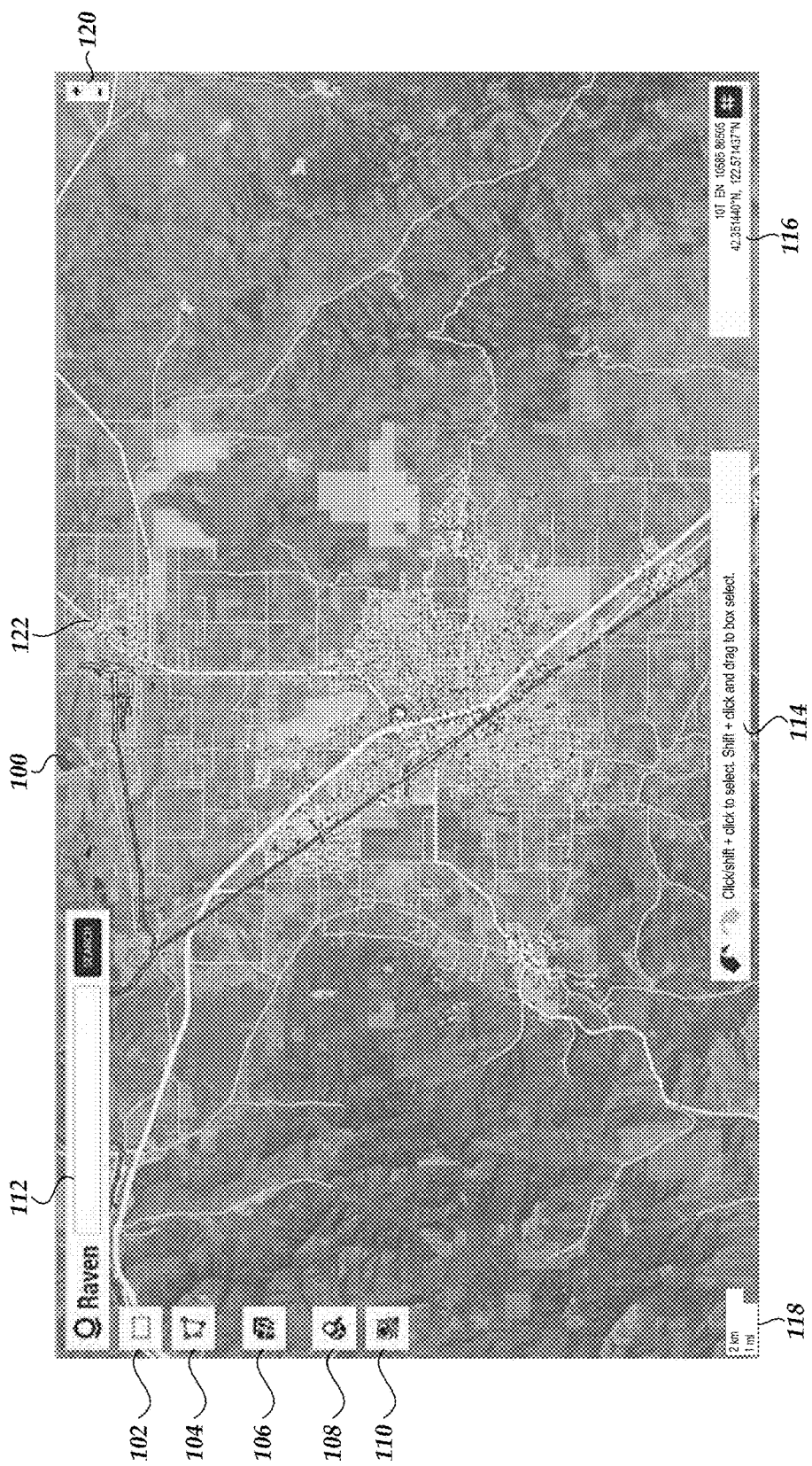
FIG. 1 illustrates a sample user interface of the interactive data object map system, according to an embodiment of the present disclosure.

In general, a high-performance, interactive data object map system (or "map system") is disclosed in which large amounts of geographical, geospatial, and other types of data, geodata, objects, features, and/or metadata are efficiently presented to a user on a map interface. The interactive data object map system allows for rapid and deep analysis of various objects, features, and/or metadata by the user. For example, millions of data objects and/or features may be simultaneously viewed and selected by the user on the map interface. A layer ontology may be displayed to the user that allows the user to select and view particular layers. In various embodiments, when the user rolls a selection cursor over an object/feature (and/or otherwise selects the object/feature) an outline of the object/feature is displayed. Selection of an object/feature may cause display of metadata associated with that object/feature.

In an embodiment, the user may rapidly zoom in and out and/or move and pan around the map interface to variously see more or less detail, and more or fewer objects. In various embodiments, the interactive data object map system may automatically generate feature/object lists and/or histograms based on selections made by the user. In various embodiments, the user may perform geosearches (based on any selections and/or drawn shapes), generate heatmaps, and/or perform keyword searches, among other actions as described below.

In an embodiment, the interactive data object map system includes server-side computer components and/or client-side computer components. The client-side components may implement, for example, displaying map tiles, showing object outlines, allowing the user to draw shapes, and/or allowing the user to select objects/features, among other actions. The server-side components may implement, for example, composition of layers into map tiles, caching of composed map tiles and/or layers, and/or providing object/feature metadata, among other actions. Such functions may be distribution in any other manner. In an embodiment, object/feature outlines and/or highlighting are accomplished on the client-side through the use of a UTF grid.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: A hierarchical arrangement and/or grouping of data according to similarities and differences. The present disclosure describes two ontologies. The first relates to the arrangement of vector layers consisting of map and object data as used by the interactive data object map system (as described below with reference to FIGS. 2A-2B). The second relates to the storage and arrangement of data objects in one or more databases (as described below with reference to FIGS. 8A-8C). For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object, Object, or Feature: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties. For the purposes of the present disclosure, the terms "feature," "data object," and "object" may be used interchangeably to refer to items displayed on the map interface of the interactive data object map system, and/or otherwise accessible to the user through the interactive data object map system. Features/objects may generally include, but are not limited to, roads, terrain (such as hills, mountains, rivers, and vegetation, among others), street lights (which may be represented by a streetlight icon), railroads, hotels/motels (which may be represented by a bed icon), schools (which may be represented by a parent-child icon), hospitals, other types of buildings or structures, regions, transportation objects, and other types of entities, events, and documents, among others. Objects displayed on the map interface generally comprise vector data, although other types of data may also be displayed. Objects generally have associated metadata and/or properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Also referred to as "metadata," includes attributes of a data object/feature. At a minimum, each property/metadata of a data object has a type (such as a property type) and a value or values. Properties/metadata associated with features/objects may include any information relevant to that feature/object. For example, metadata associated with a school object may include an address (for example, 123 S. Orange Street), a district (for example, 509c), a grade level (for example, K-6), and/or a phone number (for example, 800-0000), among other items of metadata. In another example, metadata associated with a road object may include a speed (for example, 25 mph), a width (for example, 2 lanes), and/or a county (for example, Arlington), among other items of metadata.

Property Type: The data type of a property, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

DESCRIPTION OF THE FIGURES

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1 illustrates a sample user interface of the interactive data object map system, according to an embodiment of the present disclosure. The user interface includes a map interface 100, a selection button/icon 102, a shape button/icon 104, a layers button/icon 106, a geosearch button/icon 108, a heat map button/icon 110, a search box 112, a feature information box 114, a coordinates information box 116, map scale information 118, zoom selectors 120, and highlighted features 122. The functionality of the interactive data object map system may be implemented in one or more computer modules and/or processors, as is described below with reference to FIG. 8D.

The map interface 100 of FIG. 1 is composed of multiple map tiles. The map tiles are generally composed of multiple layers of geographical, vector, and/or other types of data. Vector data layers (also referred to as vector layers) may include associated and/or linked data objects/features. In an embodiment, vector layers are composed of data objects/features. The various data objects and/or features associated with a particular vector layer may be displayed to the user when that particular vector layer is activated. For example, a transportation vector layer may include road, railroad, and bike path objects and/or features that may be displayed to the user when the transportation layer is selected. The layers used to compose the map tiles and the map interface 100 may vary based on, for example, whether a user has selected features displayed in the map interface 100, and/or the particular layers a user has selected for display. In an embodiment, composition of map tiles is accomplished by server-side components of the interactive data object map system. In an embodiment, composed map tiles may be cached by the server-side components to speed up map tile delivery to client-side components. The map tiles may then be transmitted to the client-side components of the interactive data object map system where they are composed into the map interface 100.

In general, the user interface of FIG. 1 is displayed on an electronic display viewable by a user of the interactive data object map system. The user of the interactive data object map system may interact with the user interface of FIG. 1 by, for example, touching the display when the display is touch-enabled and/or using a mouse pointer to click on the various elements of the user interface.

The map interface 100 includes various highlighted features 122 and feature icons. For example, the map interface 100 includes roads, buildings and structures, utilities, lakes, rivers, vegetation, and railroads, among other features. The user may interact with the map interface 100 by, for example, rolling over and/or clicking on various features. In one embodiment, rolling over and/or placing the mouse pointer over a feature causes the feature to be outlined and/or otherwise highlighted. Additionally, the name of the feature and/or other information about the feature may be shown in the feature information box 114.

The user of the map system may interact with the user interface of FIG. 1 by scrolling or panning up, down, and/or side to side; zooming in or out; selecting features; drawing shapes; selecting layers; performing a geosearch; generating a heat map; and/or performing a keyword search; among other actions as are described below. Various user actions may reveal more or less map detail, and/or more or fewer features/objects.

Figure 2A:
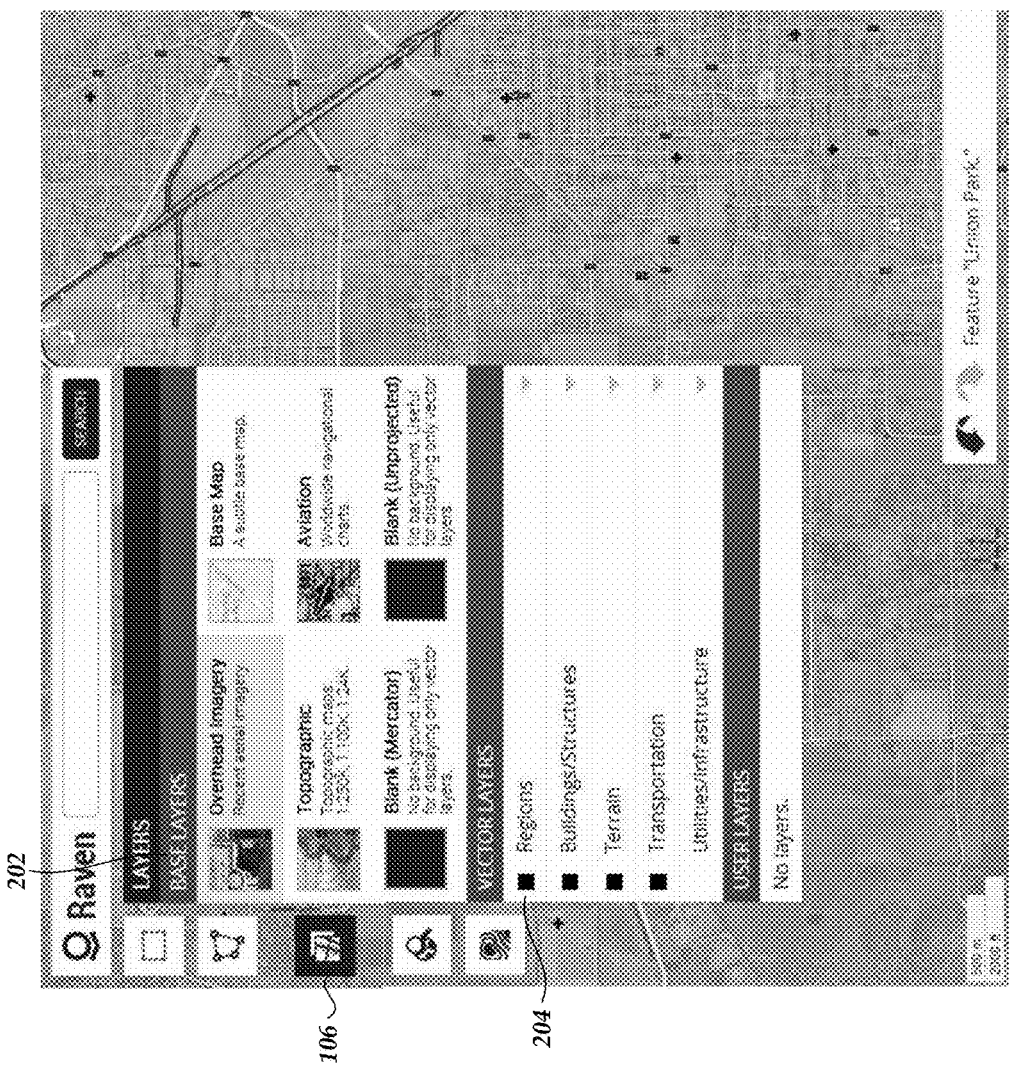
FIG. 2A illustrates a sample user interface of the interactive data object map system in which map layers are displayed to a user, according to an embodiment of the present disclosure.

FIG. 2A illustrates a sample user interface of the map system in which map layers are displayed to a user, according to an embodiment of the present disclosure. In the user interface of FIG. 2A, the user has selected the layers button 106, revealing the layers window 202. The layers window 202 includes a list of base layers, vector layers, and user layers. The base layers include, for example, overhead imagery, topographic, blank (Mercator), base map, aviation, and blank (unprojected). The vector layers include general categories such as, for example, regions, buildings/structures, terrain, transportation, and utilities/infrastructure. While no user layers are included in the user interface of FIG. 2A, user layers may be added by the user of the map system, as is described below.

In an embodiment, the user may select one or more of the base layers which may be used during composition of the map tiles. For example, selection of the overhead imagery base layer will produce map tiles in which the underlying map tile imagery is made up of recent aerial imagery. Similarly, selection of the topographic base layer will produce map tiles in which the underlying map tile imagery includes topographic map imagery.

Further, in an embodiment, the user may select one or more of the vector layers which may be used during composition of the map tiles. For example, selecting the transportation layer results in transportation-related objects and/or features being displayed on the map tiles. Transportation-related features may include, for example, roads, railroads, street signs, and/or street lights, among others. Examples of transportation-related features may be seen in the user interface of FIG. 2A where various roads, railroads, and street light icons are displayed.

In an embodiment, the user of the map system may create and save map layers. These saved map layers may be listed as user layers in the layers window 202.

Figure 2B:
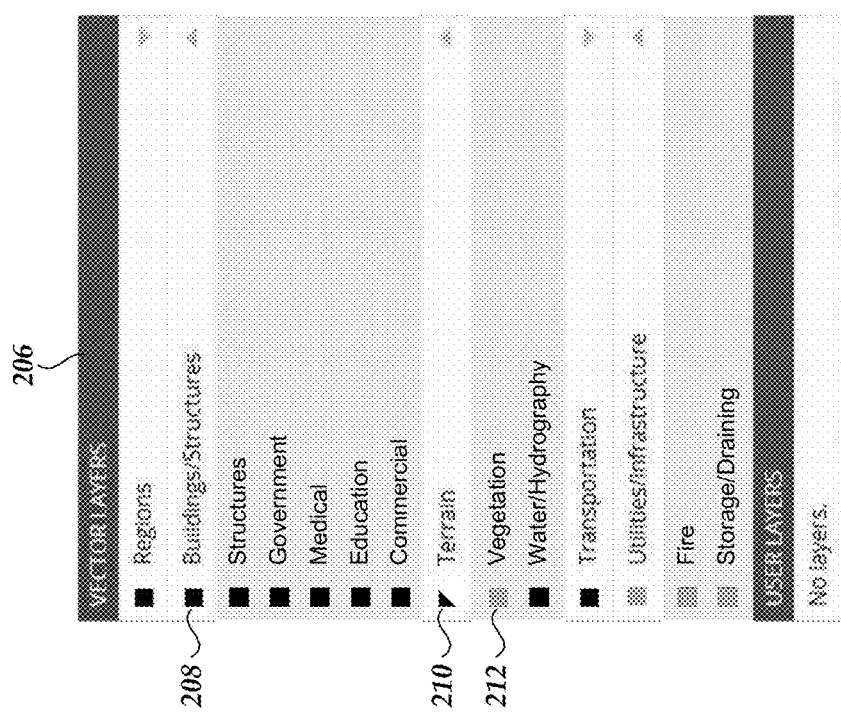
FIG. 2B illustrates an example map layer ontology, according to an embodiment of the present disclosure.

FIG. 2B illustrates an example map layer ontology, according to an embodiment of the present disclosure. As mentioned above with reference to FIG. 2A, the list of vector layers in the layers window 202 may include general categories/layers such as regions, buildings/structures, terrain, transportation, and utilities/infrastructure. The vector layers available in the map system may be further organized into an ontology, or hierarchical arrangement. For example, as shown in the vector layers window 206, the buildings/structures category 208 may be further subdivided into layers including structures, government, medical, education, and commercial. The terrain category 210 may include vegetation and/or water/hydrography layers. The utilities/infrastructure category may include fire and/or storage/draining.

In an embodiment, the user of the map system may select one or more of the layers and/or sub-layers of the layer ontology. As shown in FIG. 2B, the user has deselected the vegetation sub-layer, and all of the utilities/infrastructure layers. Selecting and deselecting vector layers, or toggling vectors layers on and off, may cause the vector objects and/or features associated with those layers to be displayed or not displayed in the map interface. For example, when the user selects the transportation category/layer, road objects associated with the transportation layer may be displayed on the map interface. Likewise, when a user deselects the transportation category/layer, road objects associated with the transportation layer may be removed from the map interface.

In an embodiment, additional hierarchical levels of layers may be displayed to the user. For example, the vector layers window 206 may include sub-sub-layers (for example, the education sub-layer may be divided into elementary schools, secondary schools, and post-secondary schools). Alternatively, fewer hierarchical levels may be displayed to the user.

In an embodiment, each of the vector layers shown in the vector layers window 206 may be made up of many layers of map vector data. In this embodiment, the map system may advantageously generate a simplified layer ontology, such as the one shown in 206. The simplified layer ontology allows the user to easily select layers of interest from a reduced number of layers, rather than a large number of discrete layers. As described above, vector layers may contain data regarding associated features and/or objects. Thus, features visible in the map interface correspond to the currently active/selected layers. In an embodiment, the layer ontology may have an arbitrary depth.

Figure 2C:
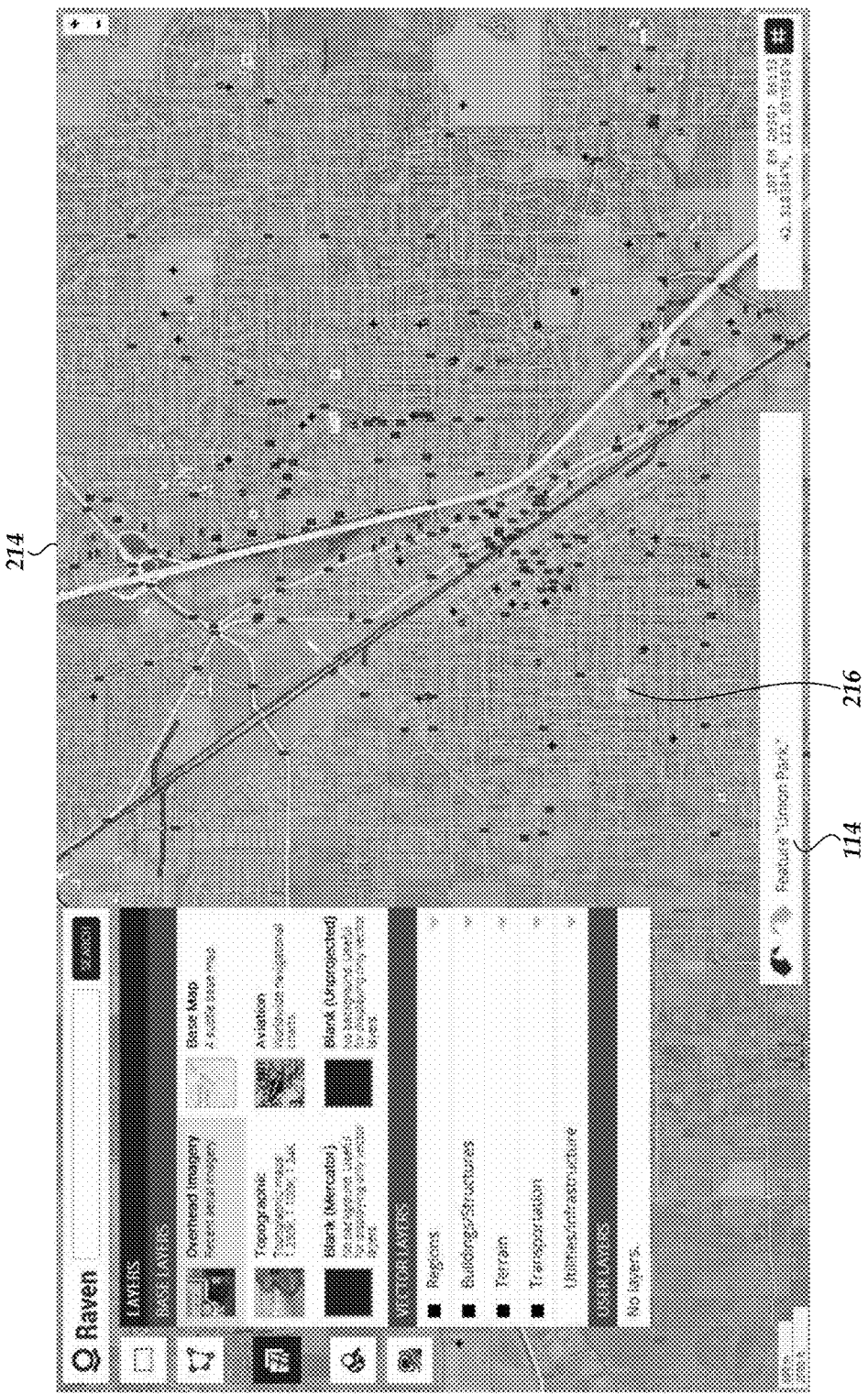
FIG. 2C illustrates a sample user interface of the interactive data object map system in which various objects are displayed, according to an embodiment of the present disclosure.

FIG. 2C illustrates a sample user interface of the map system in which various objects are displayed, according to an embodiment of the present disclosure. The user interface of FIG. 2C includes a map interface 214, an outlined feature 216, and feature information box 114 indicating that the outlined feature 216 is called "Union Park." Various features/objects may be seen in the map interface 214 including, for example, roads, buildings, terrain, street lights (represented by a streetlight icon), railroads, hotels/motels (represented by a bed icon), and schools (represented by a parent-child icon), among other features.

Figure 3A:
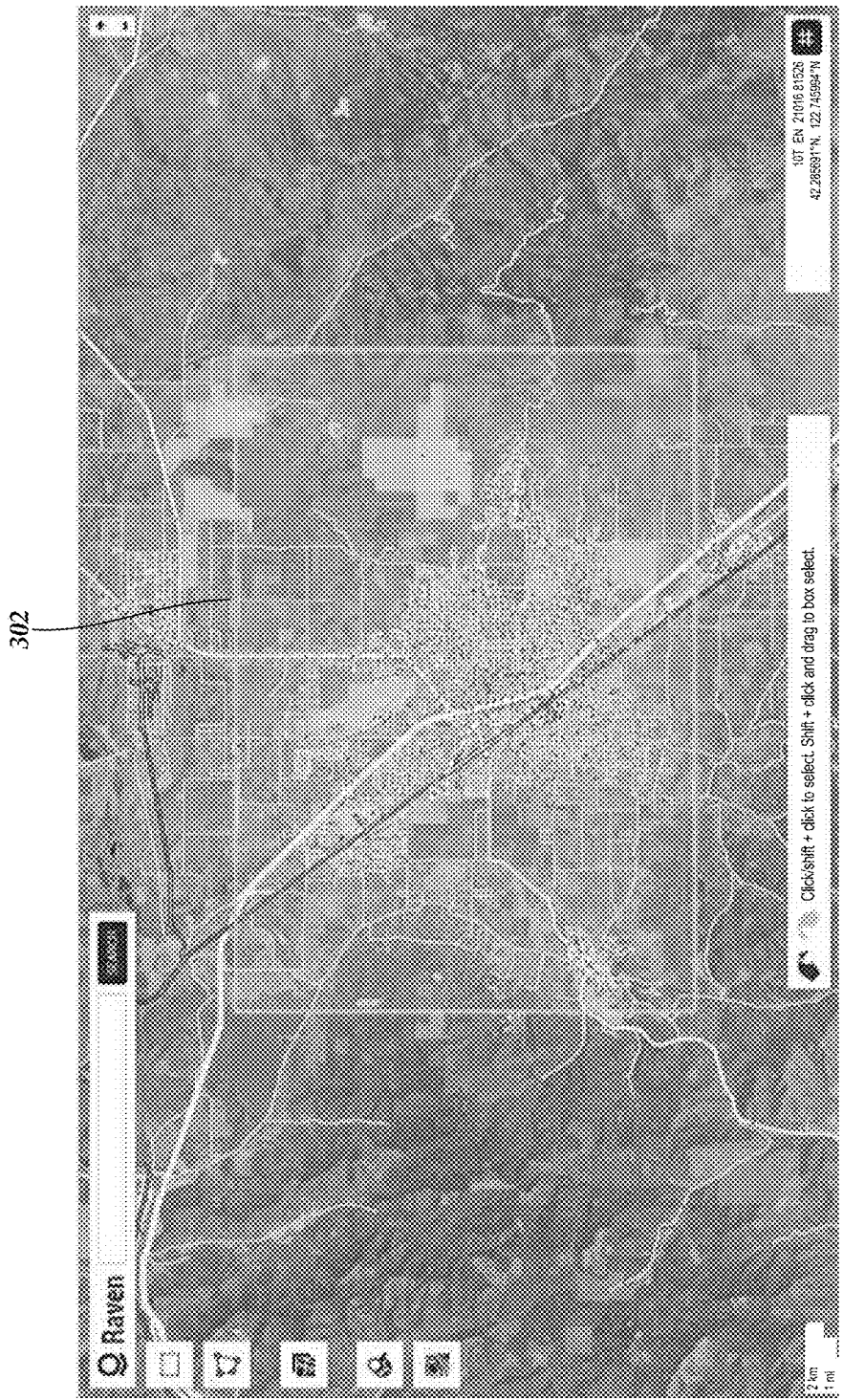
FIG. 3A illustrates a sample user interface of the interactive data object map system in which objects are selected, according to an embodiment of the present disclosure.

FIG. 3A illustrates a sample user interface of the map system in which objects are selected, according to an embodiment of the present disclosure. The user interface of FIG. 3A includes a highlighted user selection rectangle 302. The highlighted user selection rectangle 302 illustrates the user actively selecting a particular region of the map interface so as to select the features/objects that fall within the bounds of that rectangle. In an embodiment, visible features may be selected by the user, while features that are not currently visible are not selectable. For example, features related to layers that are not currently active are not selected when the user performs a selection. In another embodiment, even features that are not visible in a selected area may be selected.

Figure 3B:
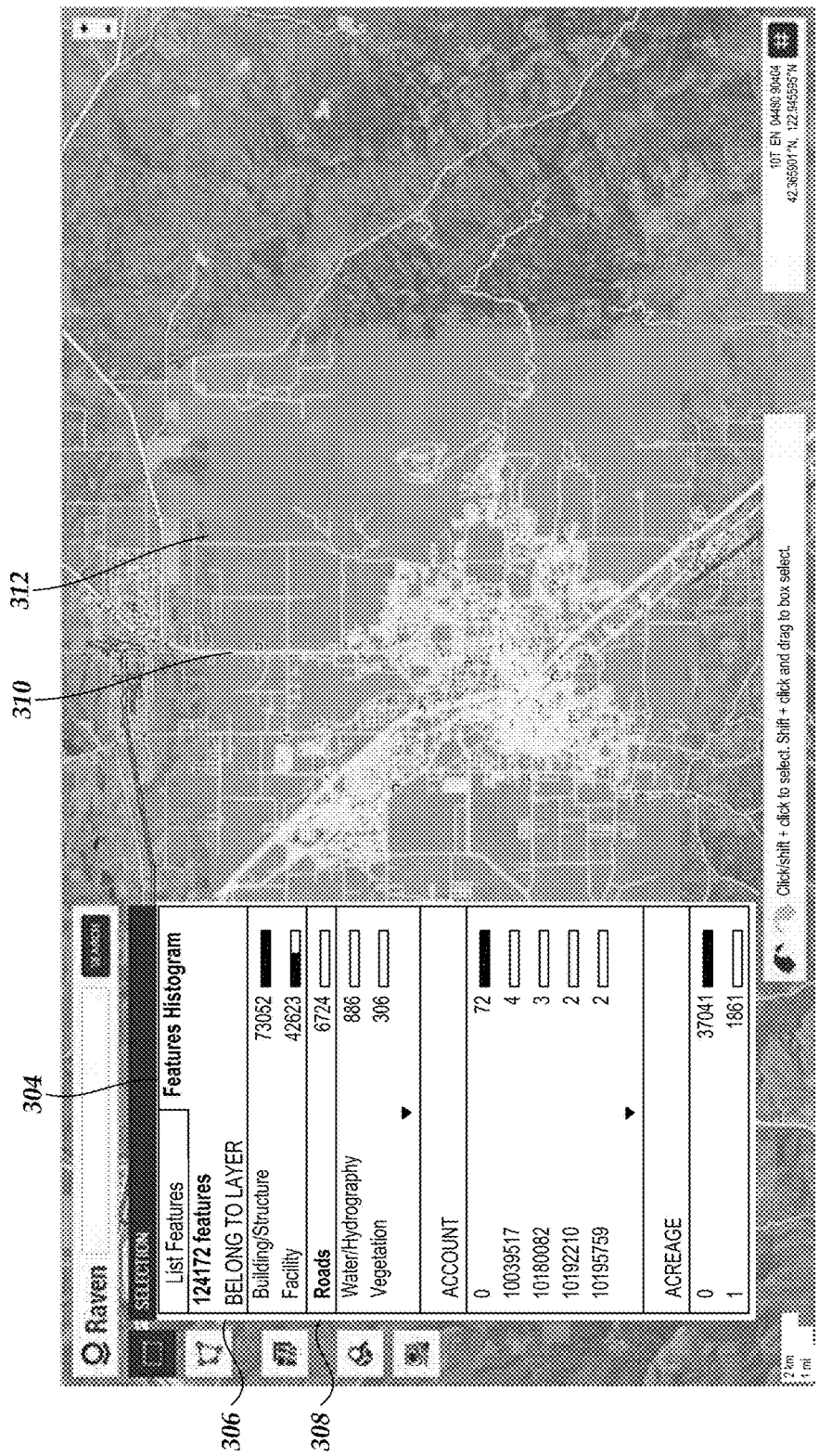
FIGS. 3B-3G illustrate sample user interfaces of the interactive data object map system in which objects are selected and a histogram is displayed, according to embodiments of the present disclosure.
Figure 3C:
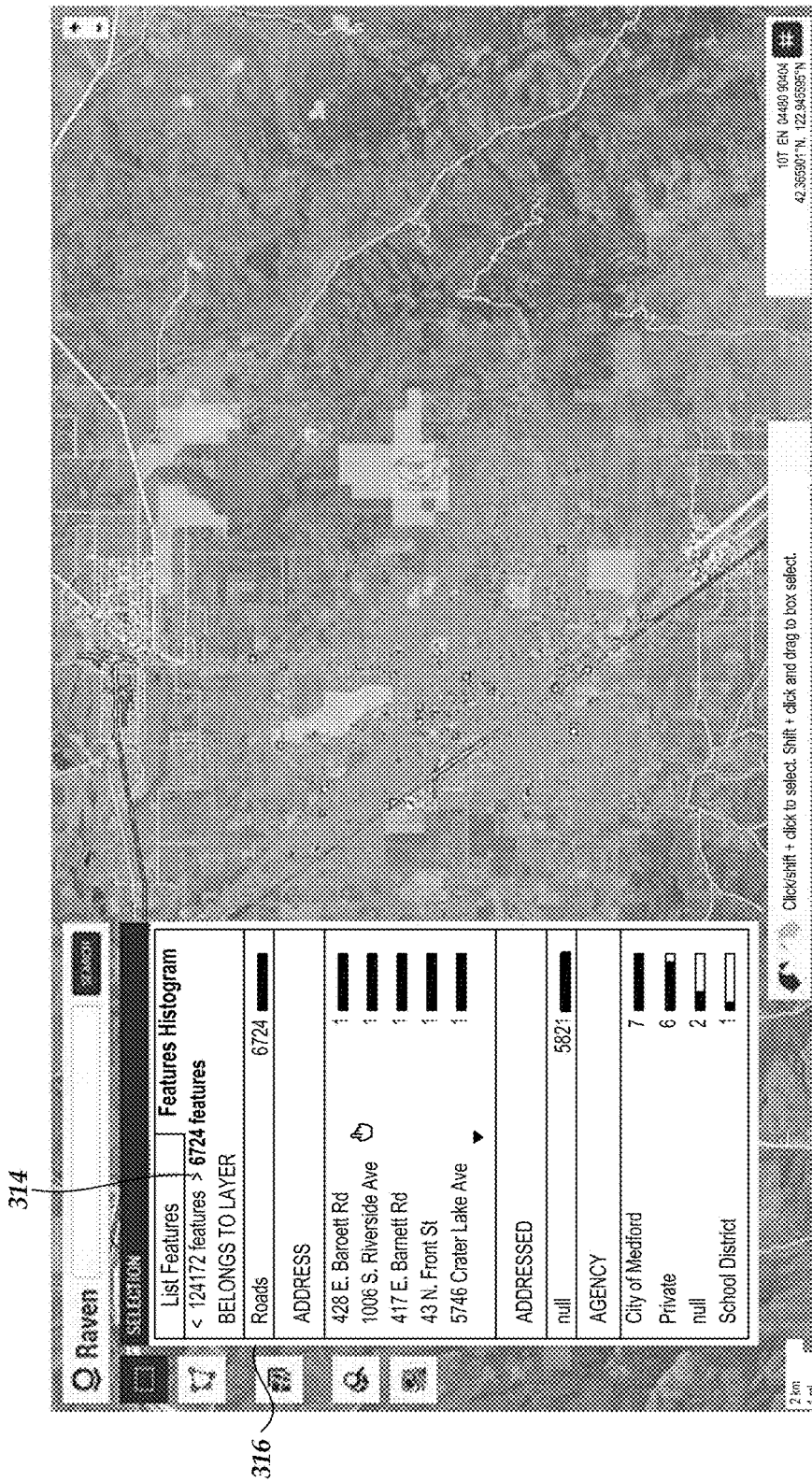

FIGS. 3B-3C illustrate sample user interfaces of the map system in which objects are selected and a feature histogram 304 is displayed in a selection window, according to embodiments of the present disclosure. The selected objects/features of FIG. 3B (including roads 310 and other features 312) may have been selected via the highlighted user selection rectangle 302 of FIG. 3A. Selected features are indicated by highlighting and/or altered colors on the map tiles making up the map interface.

Feature histogram 304 is shown in a selection window included in the user interface of FIG. 3B. The histogram 304 shows a categorized histogram of all objects/features selected by the user in the map interface. The histogram divides the features into common buckets and/or categories based on related metadata (also referred to as metadata categories). For example, at 306, "Belongs to Layer" indicates that the following histogram includes all selected features organized by layer category. In this example there are over 70,000 selected buildings/structures features, over 40,000 selected facility features, and over 6,000 selected road features, among others. Further, the feature histogram 304 includes histograms of the selected objects organized by account and acreage. In various embodiments, the map system may select histogram categories and/or metadata categories based on, for example, the features selected and/or types of features selected, among others. Any other categorization of selected features may be displayed in the histograms of the feature histogram 304.

In an embodiment, the user of the map system may select a subset of the selected features for further analysis and/or histogram generation. For example, the user may select a subset comprising selected objects belonging to the road category by, for example, clicking on the roads item 308. This selection may result in "drilling down" to histograms of that subset of features, as shown in FIG. 3C. Thus, a drill-down group of features/objects (for example, the subset of features/objects) may be used by the map system to determine new drill-down metadata categories, or buckets of related metadata. At 314 in FIG. 3C, the arrow icon indicates that of the originally selected 124,172 features, the feature histogram now shows an analysis of the 6,724 features belonging to the road category (see item 316). The feature histogram window of FIG. 3C thus shows a new set of histograms organized by layer, address, addressed, and agency, among others. The user may thus "drill down" and "drill up" through the selected features via the displayed histograms.

In an embodiment, items selected in the feature histogram are correspondingly highlighted in the map interface of the map system. For example, in the map interface of FIG. 3B, the user has selected the roads in the histogram at 308. Corresponding features (in this example, roads) are thus highlighted in the map interface (as shown at 310).

Figure 3D:
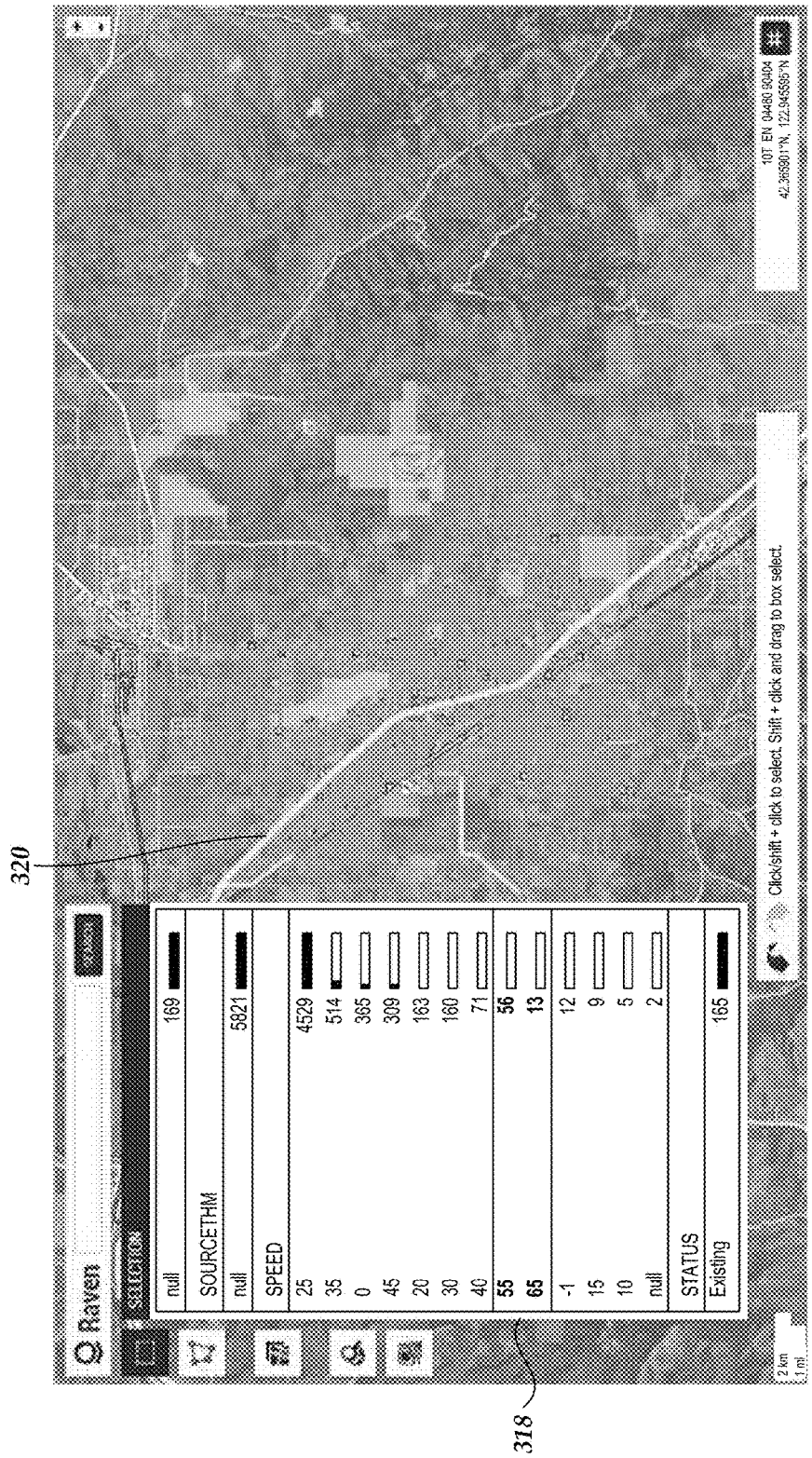
Figure 3E:
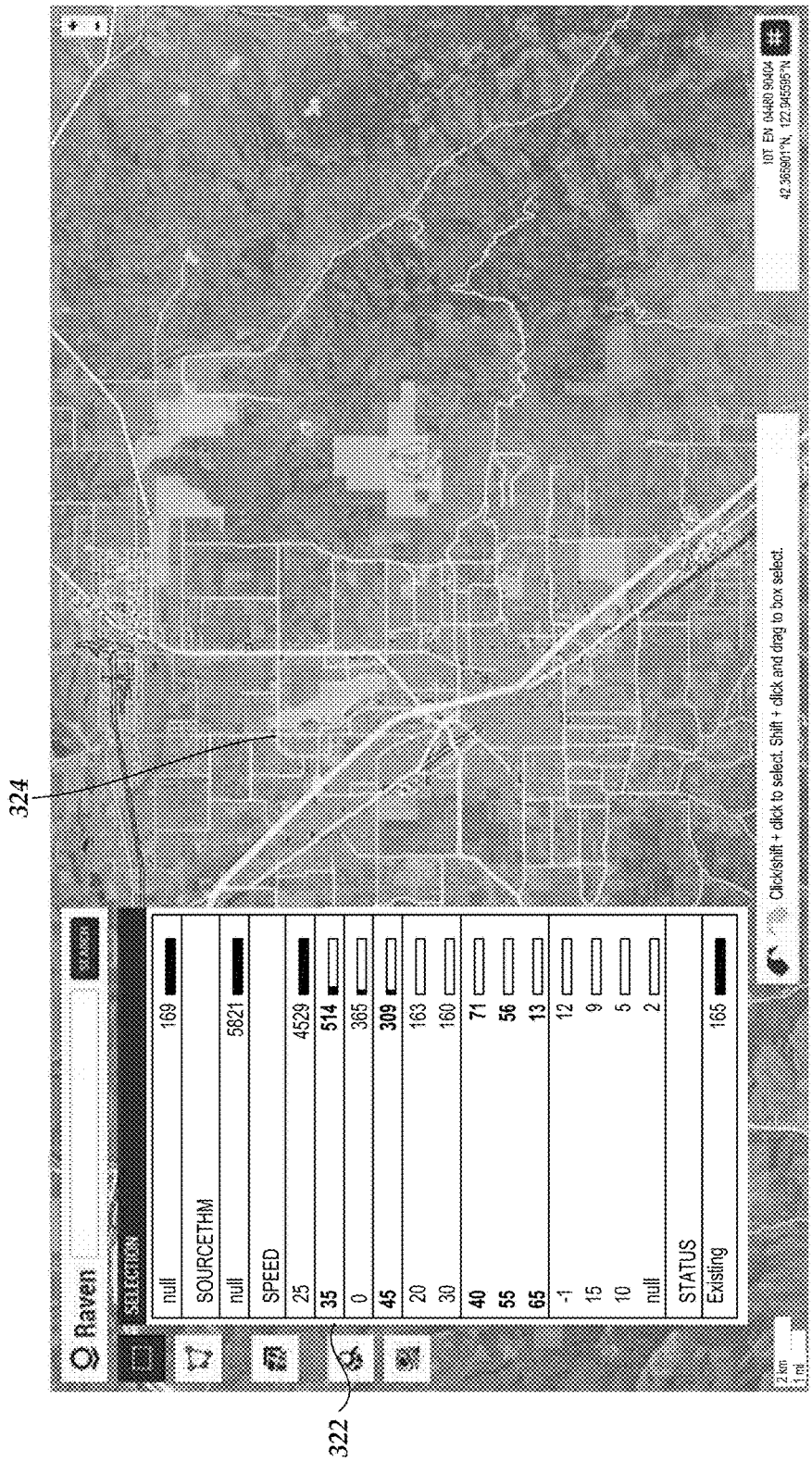
Figure 3F:
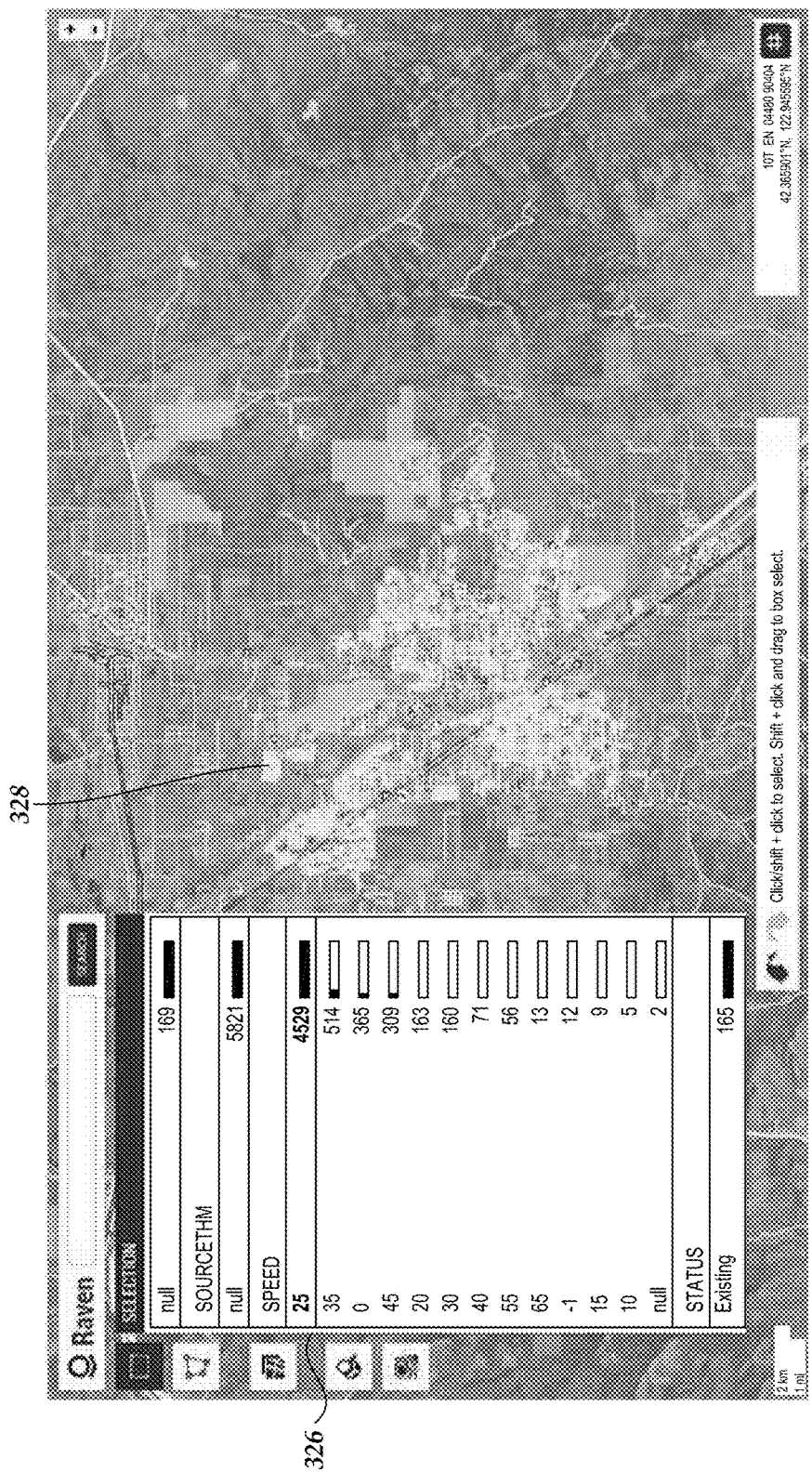
Figure 3G:
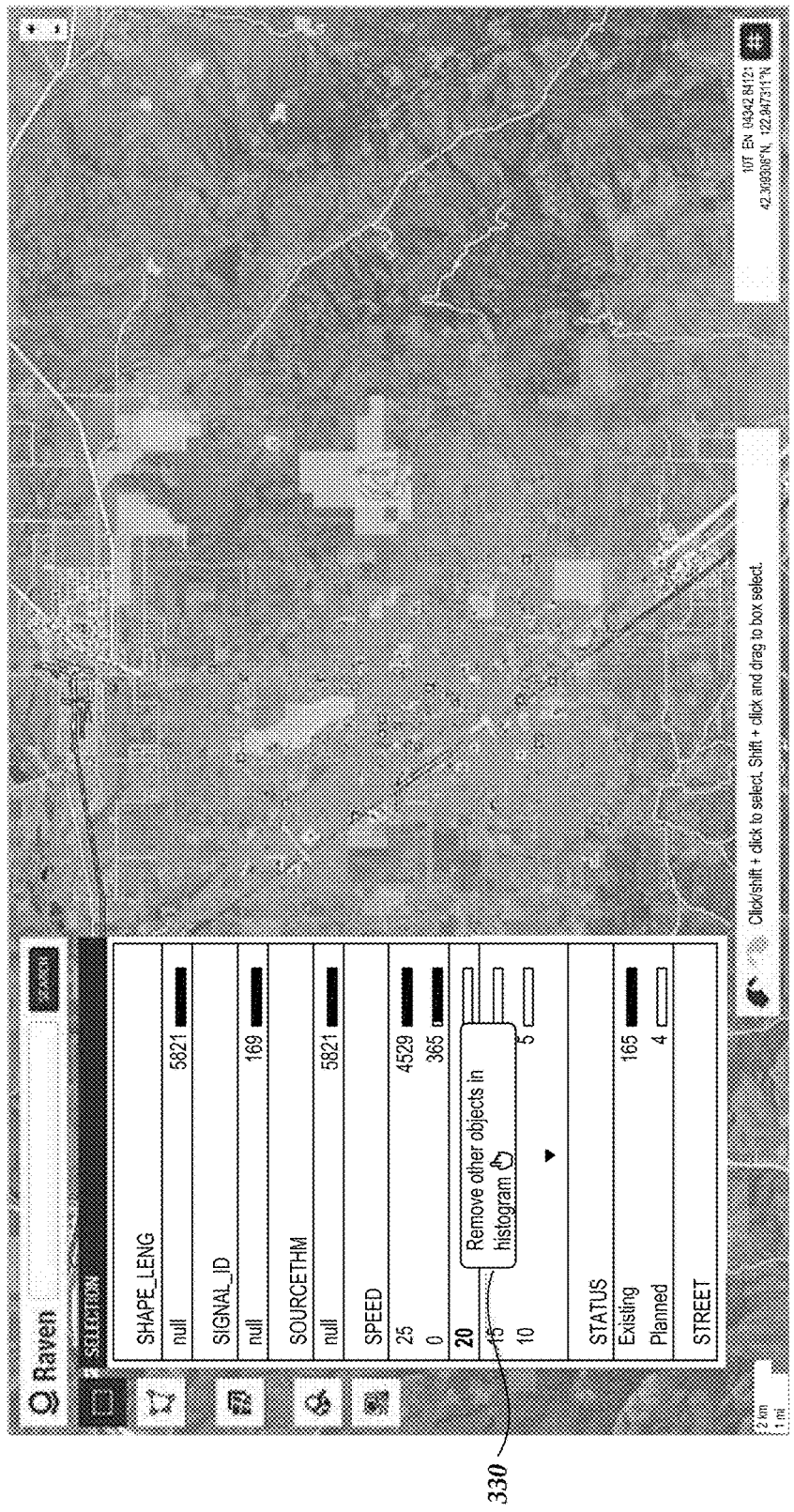

FIGS. 3D-3G illustrate additional example user interfaces of the map system in which objects are selected from a histogram and correspondingly highlighted in the map interface, according to embodiments of the present disclosure. In FIGS. 3D-3F, in the selection window, the user is viewing a histogram of all selected roads organized in a histogram according to the road speed limit. In FIG. 3D, the user has selected (at 318) roads with speed limits of 55 and 65. The corresponding road features are highlighted in the map interface at, for example 320. In FIG. 3E, the user has selected (at 322) roads with speed limits of 35, 45, 40, 55, and 65. The corresponding road features are highlighted in the map interface at, for example 324. In FIG. 3F, the user has selected (at 326) roads with speed limits of 25. The corresponding road features are highlighted in the map interface at, for example 328. In FIG. 3G, the user may "drill down" into the histogram by, for example, right clicking on an item and selecting "Remove other objects in histogram" (330).

Figure 3H:
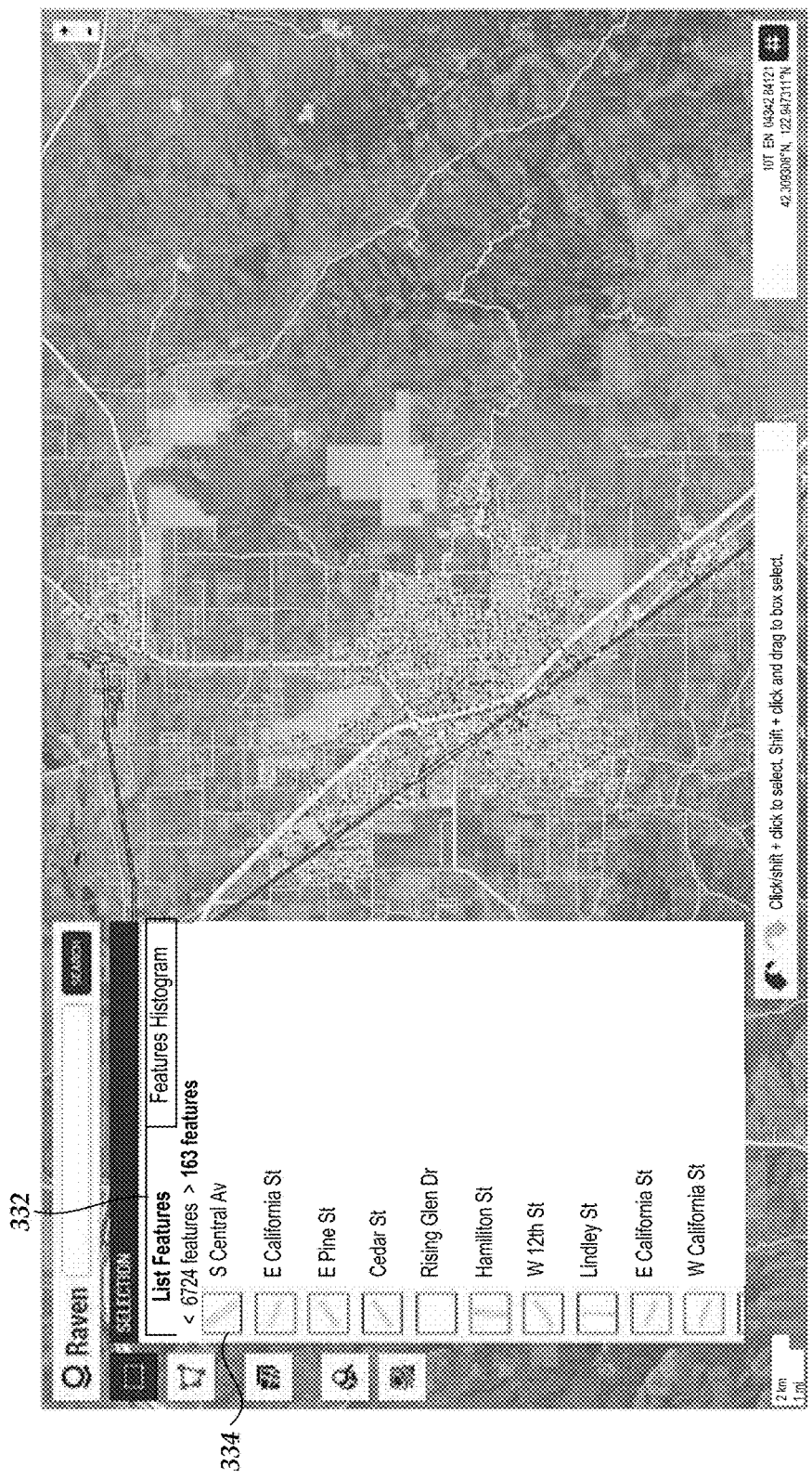
FIGS. 3H-3I illustrate sample user interfaces of the interactive data object map system in which objects are selected and a list of objects is displayed, according to embodiments of the present disclosure.
Figure 3I:
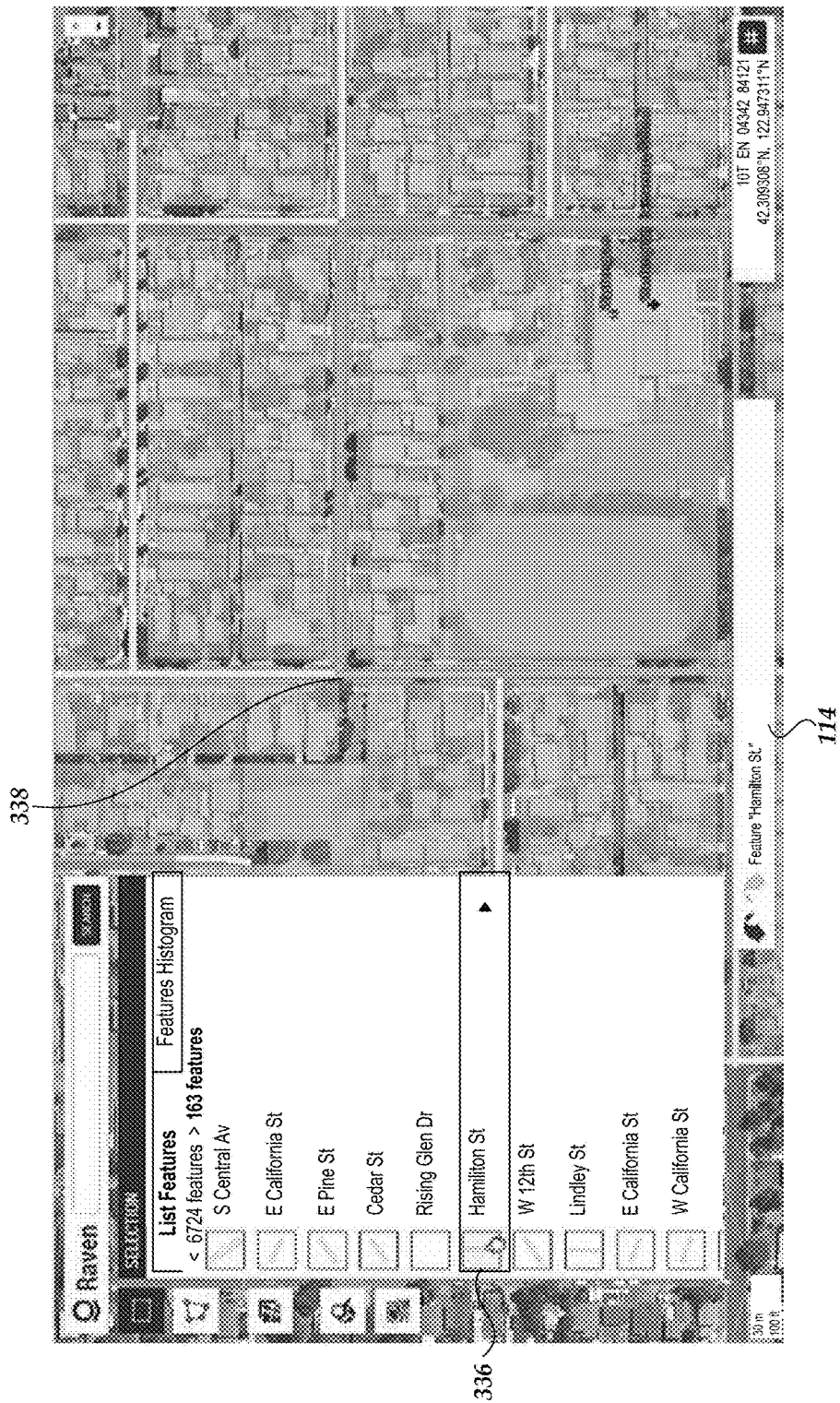

FIGS. 3H and 3I illustrate sample user interfaces of the map system in which objects are selected and a list of selected objects 332 is displayed in the selection window, according to embodiments of the present disclosure. With reference to FIG. 3H, the list of features 332 indicates that the user has drilled down further into the selected features of FIG. 3G by selecting a subset of selected features consisting of only roads with speed limits of 20. Thus, the subset of the example of FIG. 3H includes the 163 features that are roads with speed limits of 20. The user has additionally selected to view the list of features 332 in the selection window (rather than the feature histogram). The list of features 332 lists each individual feature that is included in the currently selected subset. For example, the list includes S Central Av 334, among others.

In FIG. 3I, the user has selected feature Hamilton St at 336. In an embodiment, when a feature is selected from the list of features, the map interface automatically zooms to the location of that feature. The user may select the feature from the list of features by clicking on the name of the feature and/or the displayed thumbnail. In an embodiment, the map interface only zooms to the feature when the user clicks on, and/or selects, the thumbnail associated with the feature. In the example of FIG. 3I, the map interface is automatically zoomed to the location of the selected Hamilton St, and the selected feature is highlighted (338). Additionally, the name of the selected feature is shown in the feature information box 114. In an embodiment, the name of the selected feature is shown in the feature information box 114 when the user hovers the cursor over the thumbnail associated with the feature in the list of features. In an embodiment, the selected feature may be any other type of object, and may be outlined or otherwise highlighted when selected.

In various embodiments, the user of the map system may select either the list of features, or the feature histogram, of the selection window to view information about the selected features.

Figure 3J:
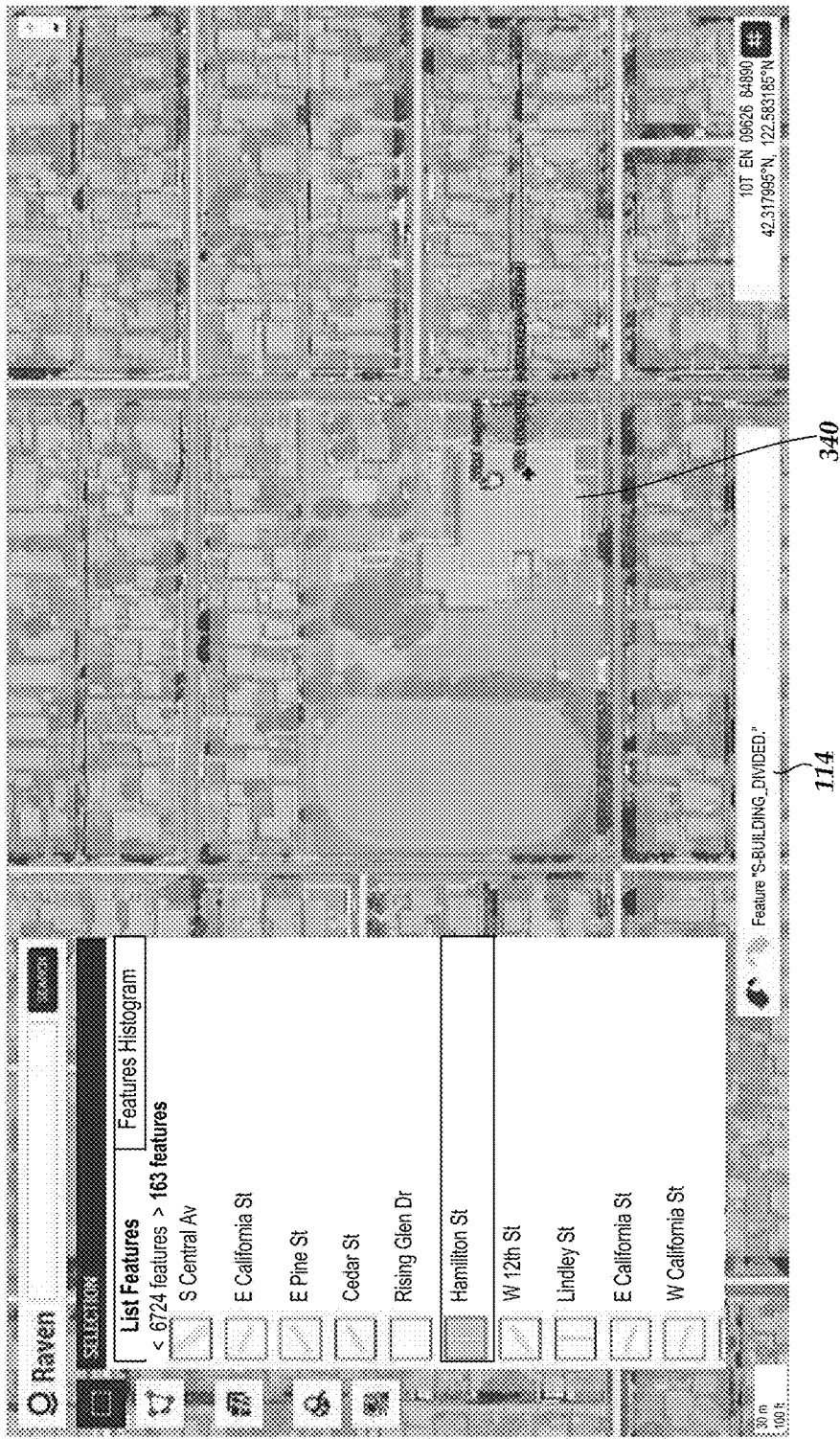
FIGS. 3J-3K illustrate sample user interfaces of the interactive data object map system in which objects are outlined when hovered over, according to embodiments of the present disclosure.
Figure 3K:
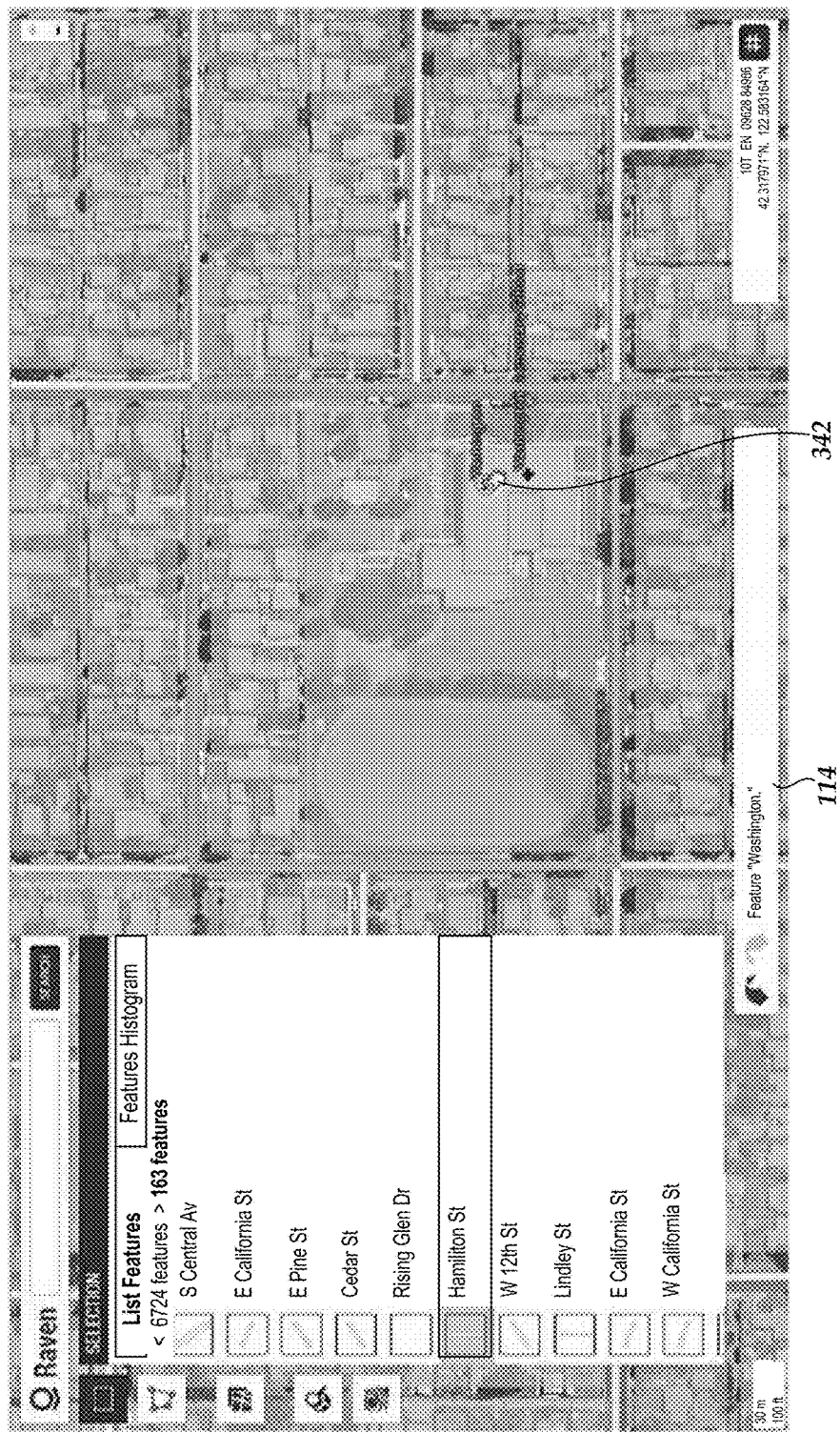

FIGS. 3J-3K illustrate sample user interfaces of the map system in which objects are outlined when hovered over, according to embodiments of the present disclosure. In FIG. 3J, the user is hovering over a building feature with the mouse cursor. The feature being hovered over is automatically outlined (340). Additionally, the name of the feature is displayed in the feature information box 114. In FIG. 3K, the user is hovering over a shelter feature with the mouse cursor. The feature being hovered over is automatically outlined (342), and the name of the feature is displayed in the feature information box 114. The user of the map system may, at any time, highlight and/or outline any feature/object by rolling over, hovering over, selecting, and/or touching that feature/object in the map interface.

In various embodiments, the user may select a feature in order to view a feature information window. The feature information window may include, for example, metadata associated with the selected feature. For example, the user may select a building feature, resulting in a display of information associated with that building feature such as the building size, the building name, and/or the building address or location, among others. Metadata associated with features/objects may include any information relevant to that feature/object. For example, metadata associated with a school may include an address (for example, 123 S. Orange Street), a district (for example, 509c), a grade level (for example, K-6), and/or a phone number (for example, 800-0000), among other items of metadata. In an embodiment, a history of the object, changes made to the object, and/or user notes related to the object, among other items, may be displayed. In an embodiment, a user may edit metadata associated with a selected feature.

Figure 4A:
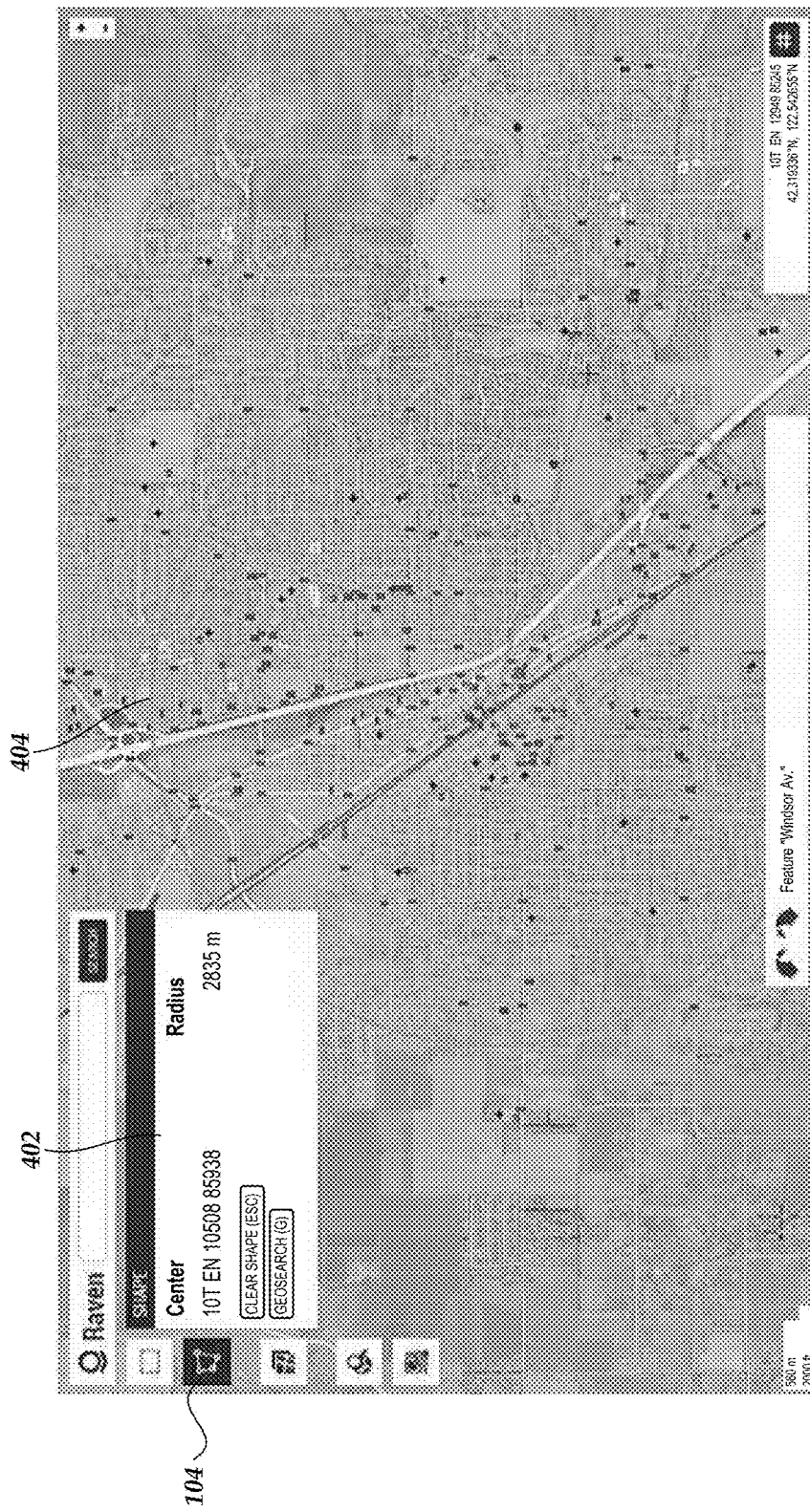
FIGS. 4A-4D illustrate sample user interfaces of the interactive data object map system in which a radius geosearch is displayed, according to embodiments of the present disclosure.

FIGS. 4A-4D illustrate sample user interfaces of the map system in which a radius geosearch is displayed, according to embodiments of the present disclosure. In FIG. 4A, the user has selected the shape button 104 and is drawing a circle selection 404 on the map interface by first selecting a center and then a radius. Shape window 402 indicates the coordinates of the center of the circle selection, as well as the radius of the circle selection. In various embodiments, any type of polygon or other shape may be drawn on the map interface to select features.

Figure 4B:
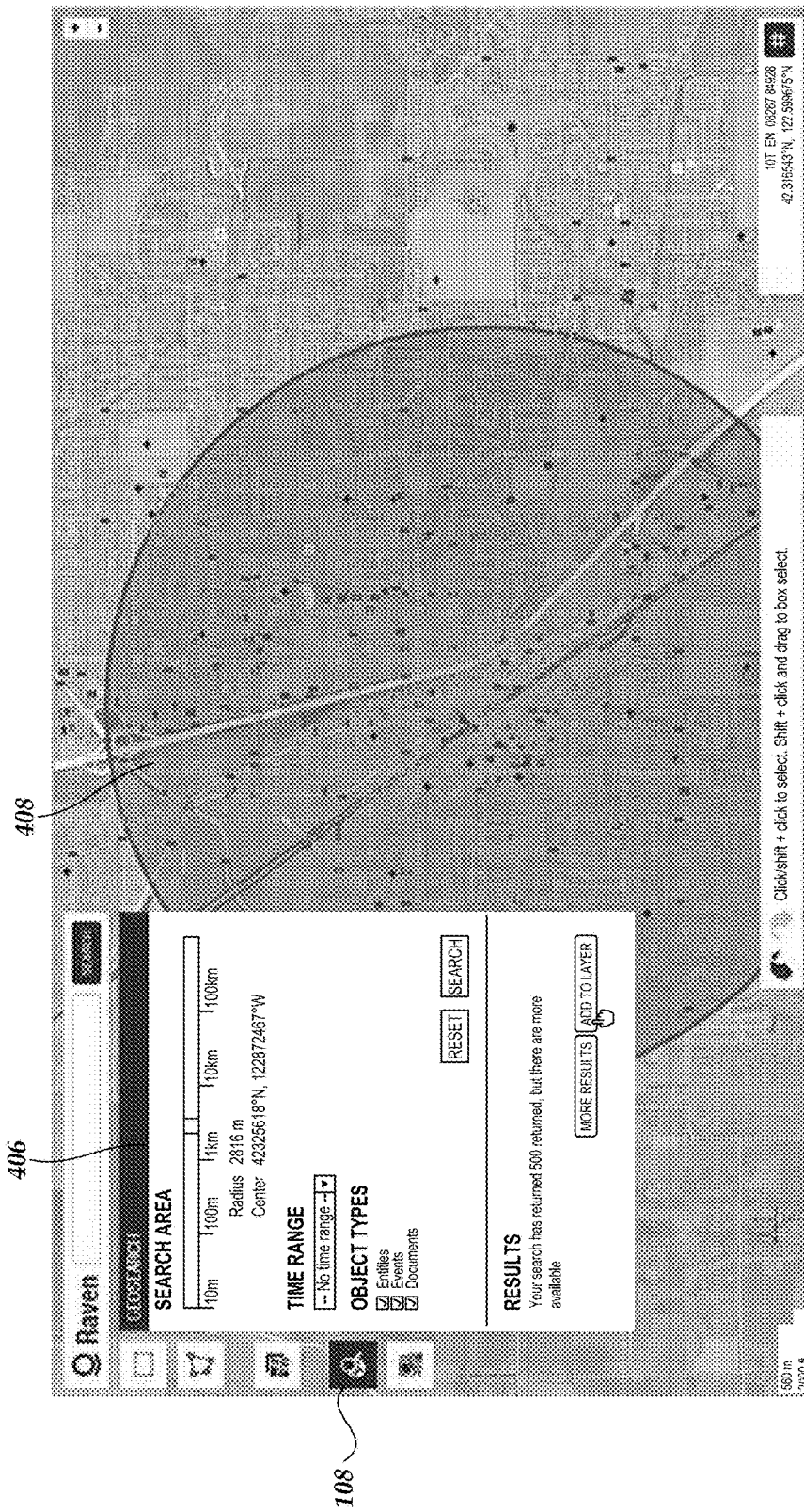

In FIG. 4B, the user has selected the geosearch button 108 so as to perform a geosearch within the selection circle 408. In an embodiment, a geosearch comprises a search through one or more databases of data objects, and metadata associated with those data objects, for any objects that meet the criteria of the geosearch. For example, a geosearch may search for any objects with geographic metadata and/or properties that indicate the object may be geographically within, for example, selection circle 408. A geosearch within a selected circle may be referred to as a radius search. Geosearch window 406 indicates various items of information related to the radius search, and includes various parameters that may be adjusted by the user. For example, the geosearch window 406 includes a search area slider that the user may slide to increase or decrease the radius of the selection circle 408. The user may also indicate a time range for the geosearch. In an embodiment, objects/features shown and/or searchable in the map system may include a time component and/or time metadata. Thus, for example, the user of the map system may specify a date or time period, resulting in the display of any objects/features with associated time metadata, for example, falling within the specified time period. In various embodiments, associated time metadata may indicate, for example, a time the feature was created, a time the feature was added to a database of features, a time the feature was previously added to a vector layer, a time the feature was last accessed by the map system and/or a user, a time the feature was built, and/or any combination of the foregoing. Alternatively, the user may select and/or search for objects/features within particular time periods, as shown in FIG. 4B. The geosearch window 406 also allows the user to specify the types of objects to be searched, for example, entities, events, and/or documents, among others.

In an embodiment, the user of the map system may perform a search by clicking and/or touching a search button. The map system may then perform a search of an object database for any objects matching the criteria specified in the geosearch. For example, in the example of FIG. 4B the map system will search for any objects with associated location information that falls within the selection circle 408. Objects searched by the map system may include objects other than those shown on the map interface. For example, in an embodiment the map system may access one or more databases of objects (and object metadata) that may be unrelated to the features currently shown in the map interface, or features related to the currently selected vector layers. The databases accessed may include databases external to any database storing data associated with the map system. Any objects found in the geosearch may then be made available to the user (as shown in FIG. 4B), and the user may be given the option of adding the objects to a new layer in the map interface (as shown in the geosearch information window 406).

Figure 4C:
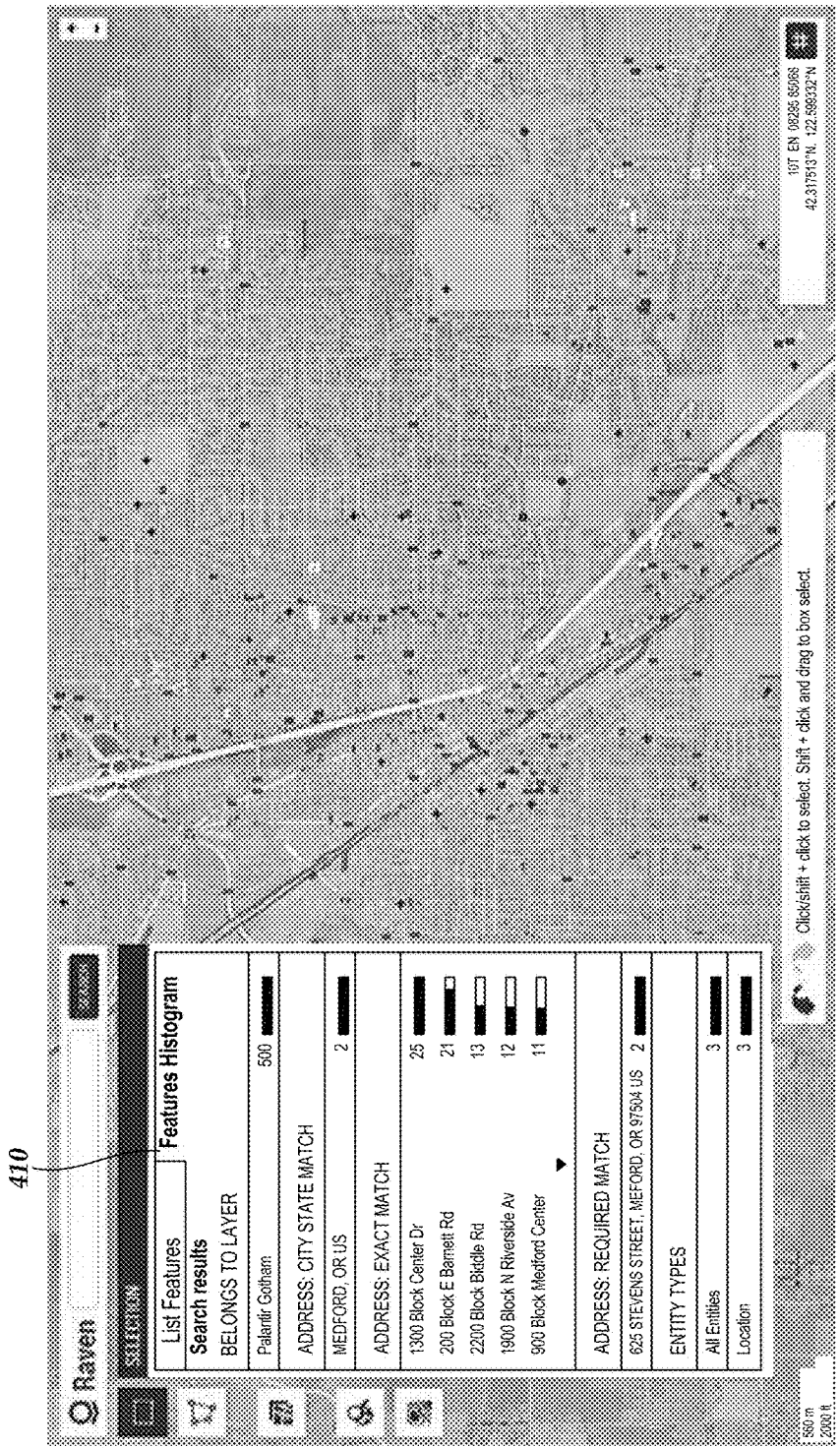
Figure 4D:
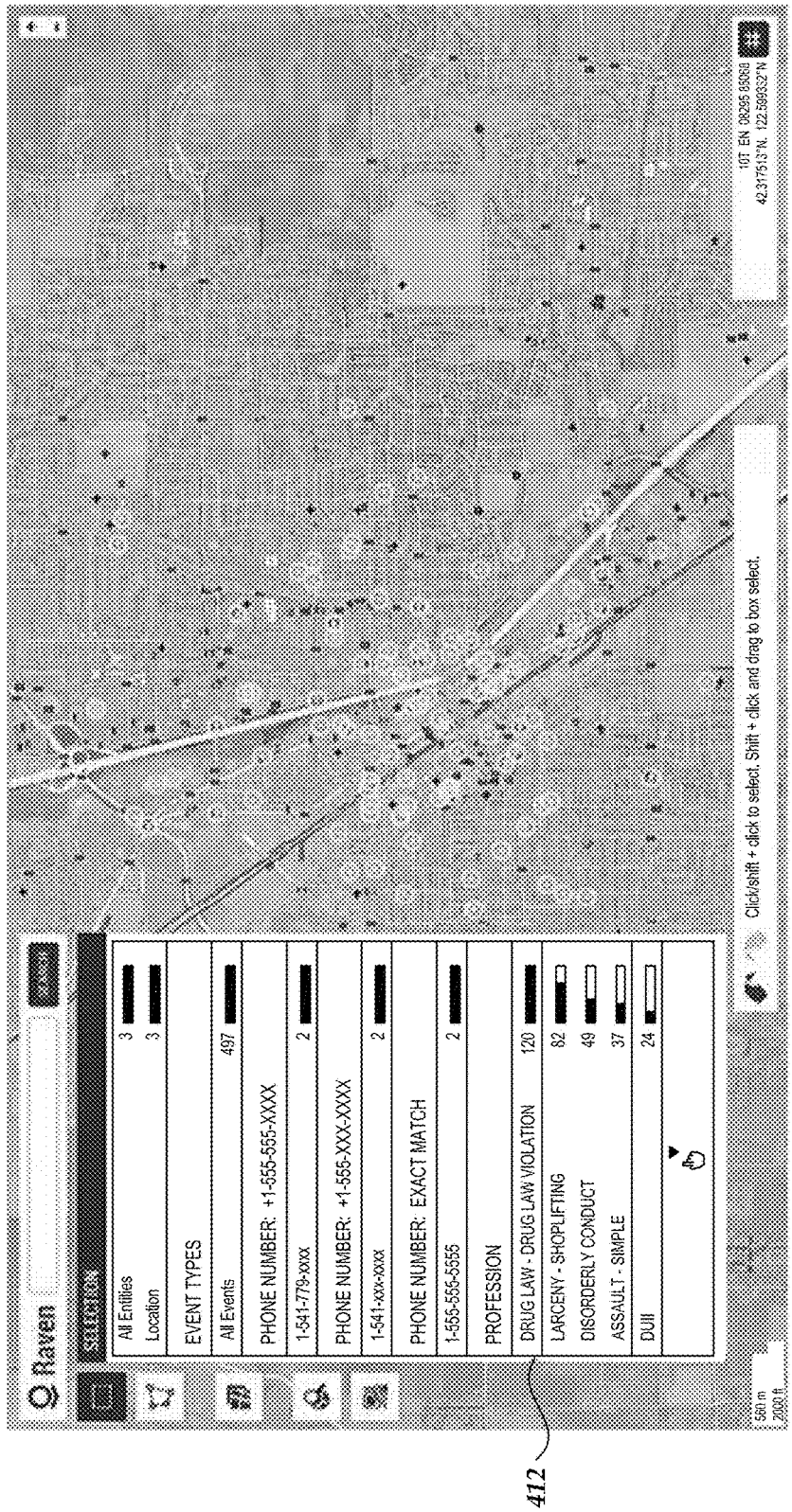

FIG. 4C shows objects added to the map interface following the geosearch in FIG. 4B. The search results are also shown in the feature histogram 410. In this example the returned objects include various entities and events. FIG. 4D shows the user has selected, in the feature histogram, all search result objects with related metadata indicating a drug law violation. Those selected objects are additionally highlighted in the map interface of FIG. 4D. In another example, geosearch may be used to determine, for example, that many crimes are concentrated in a downtown area of a city, while DUIs are more common in areas with slow roads.

Figure 5A:
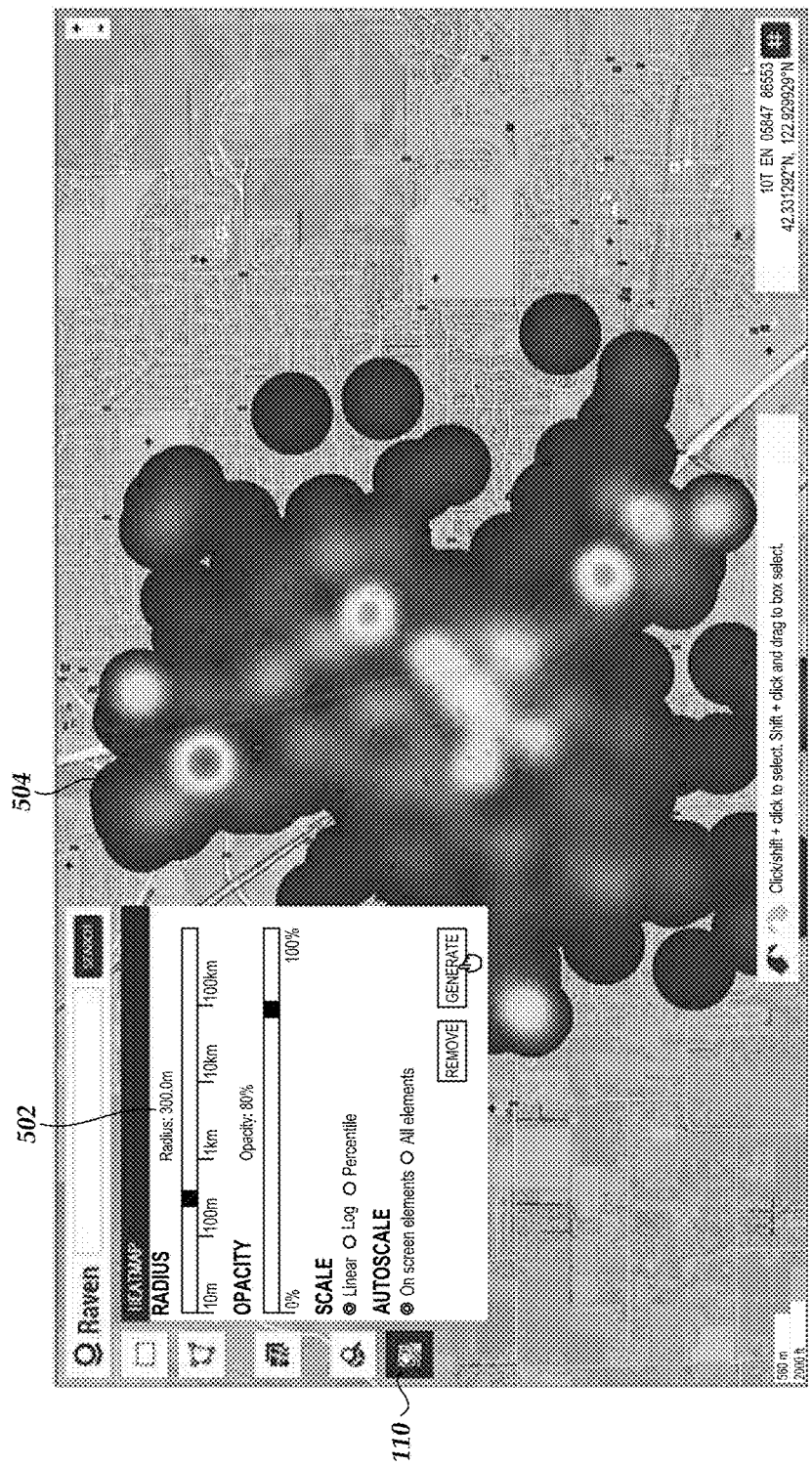
FIGS. 5A-5D illustrate sample user interfaces of the interactive data object map system in which a heatmap is displayed, according to embodiments of the present disclosure.
Figure 5B:
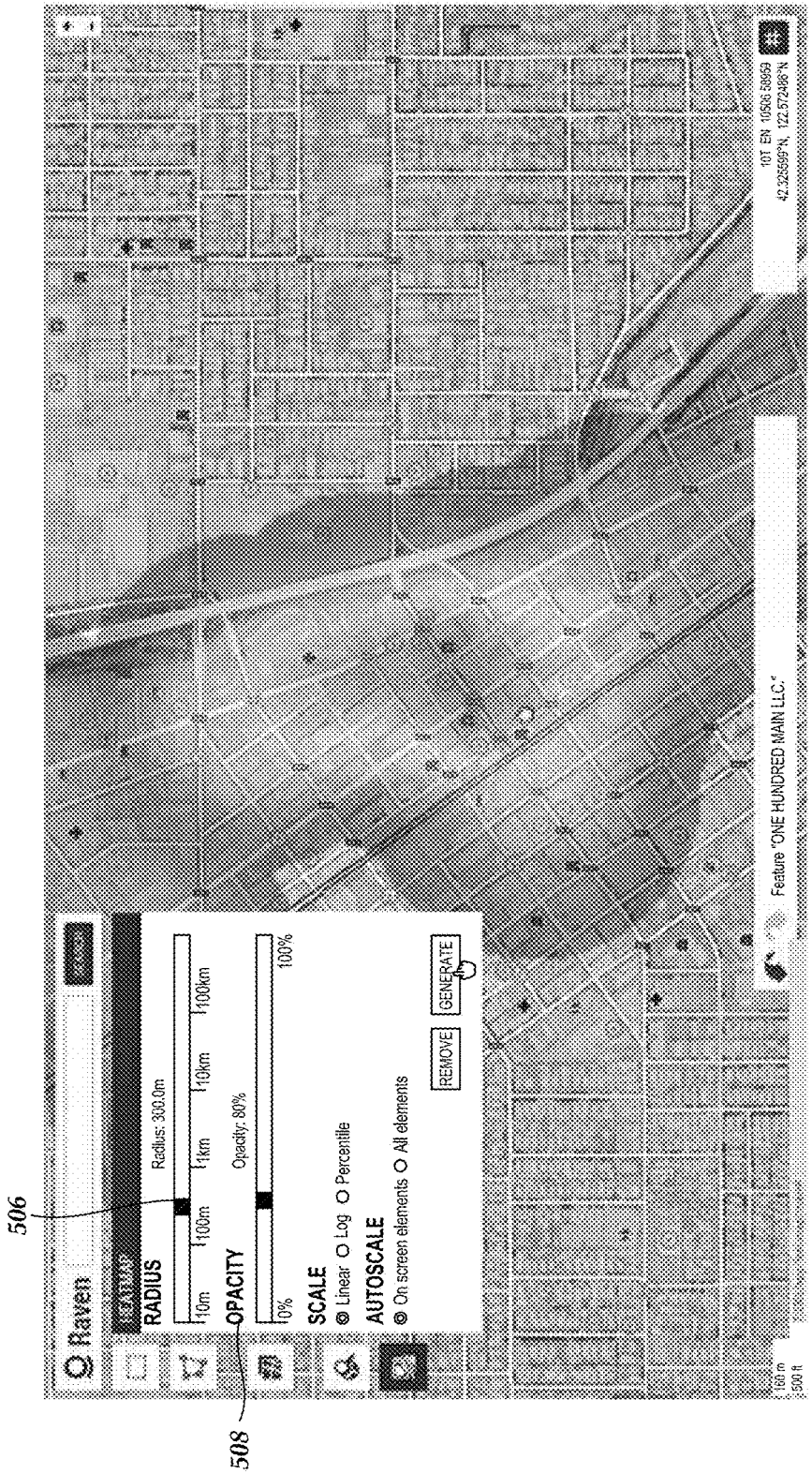

FIGS. 5A-5D illustrate sample user interfaces of the map system in which a heatmap is displayed, according to embodiments of the present disclosure. In FIG. 5A, the user has selected the heatmap button 110 so as to create a heatmap 504 based on the objects selected in FIG. 4D. A heatmap information window 502 is displayed in which the user may specify various parameters related to the generation of heatmap. For example, referring now to FIG. 5B, the user may adjust a radius (506) of the circular heatmap related to each selected object, an opacity (508) of the heatmap, a scale of the heatmap, and an auto scale setting. In FIG. 5B, the user has decreased the opacity of the generated heatmap and zoomed in on the map interface so as to more clearly view various objects and the underlying map tiles.

Figure 5C:
Figure 5D:
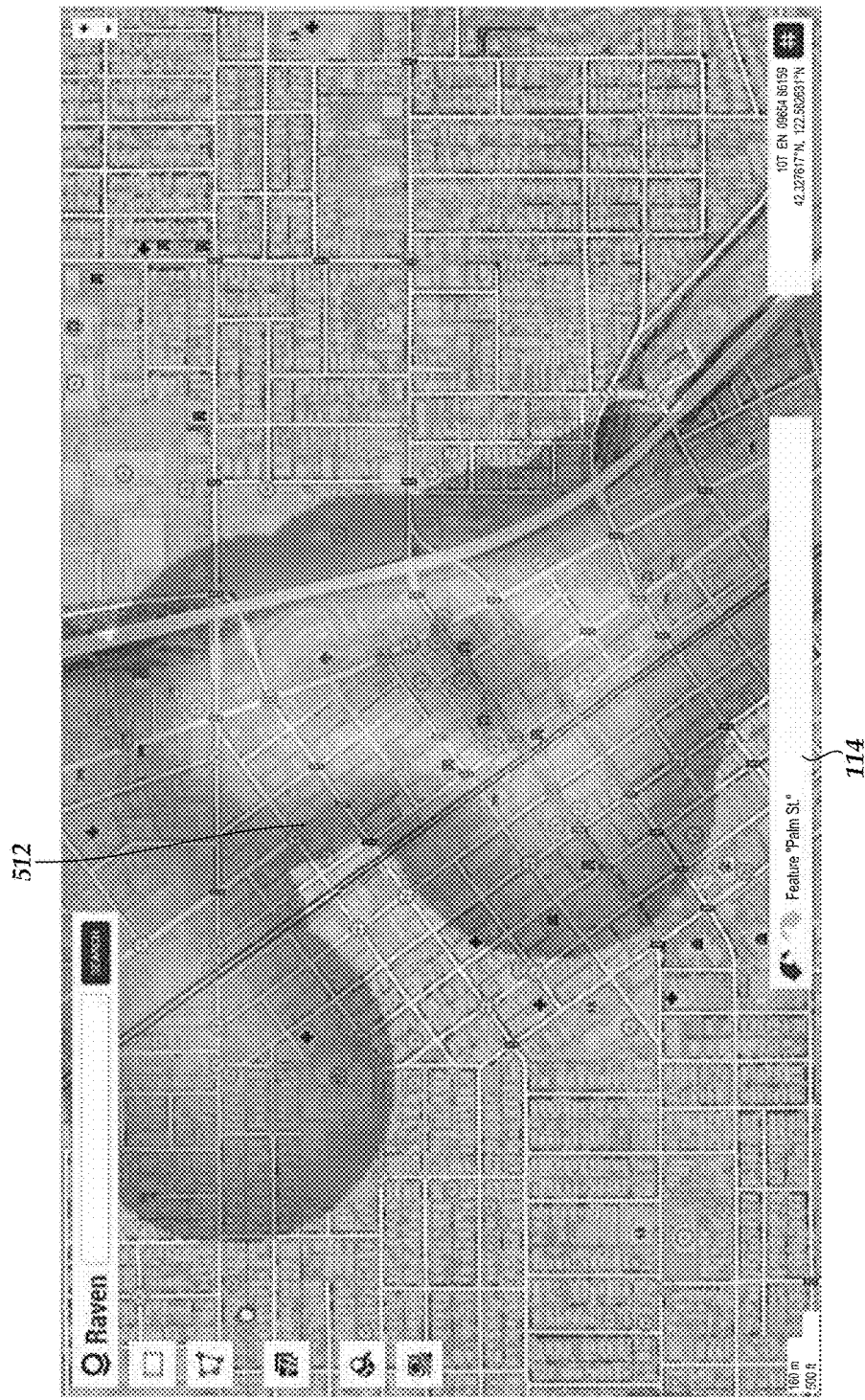

FIG. 5C shows the user selecting various objects and/or features while the heatmap is displayed using the rectangle selection tool, such as to view information regarding the features in a histogram. FIG. 5D shows the selected objects, selected in FIG. 5C, now highlighted (512).

In the map system a heatmap may be generated on any object type, and/or on multiple object types. In an embodiment, different heatmap radiuses may be set for different object types. For example, the user may generate a heatmap in which streetlights have a 20 m radius, while hospitals have a 500 m radius. In an embodiment, the heatmap may be generated based on arbitrary shapes. For example, rather than a circular-based heatmap, the heatmap may be rectangular-based or ellipse-based. In an embodiment, the heatmap may be generated based on error ellipses and/or tolerance ellipses. A heatmap based on error ellipses may be advantageous when the relevant objects have associated error regions. For example, when a location of an object is uncertain, or multiple datapoints associated with an object are available, an error ellipse may help the user determine the actual location of the object.

Figure 5E:
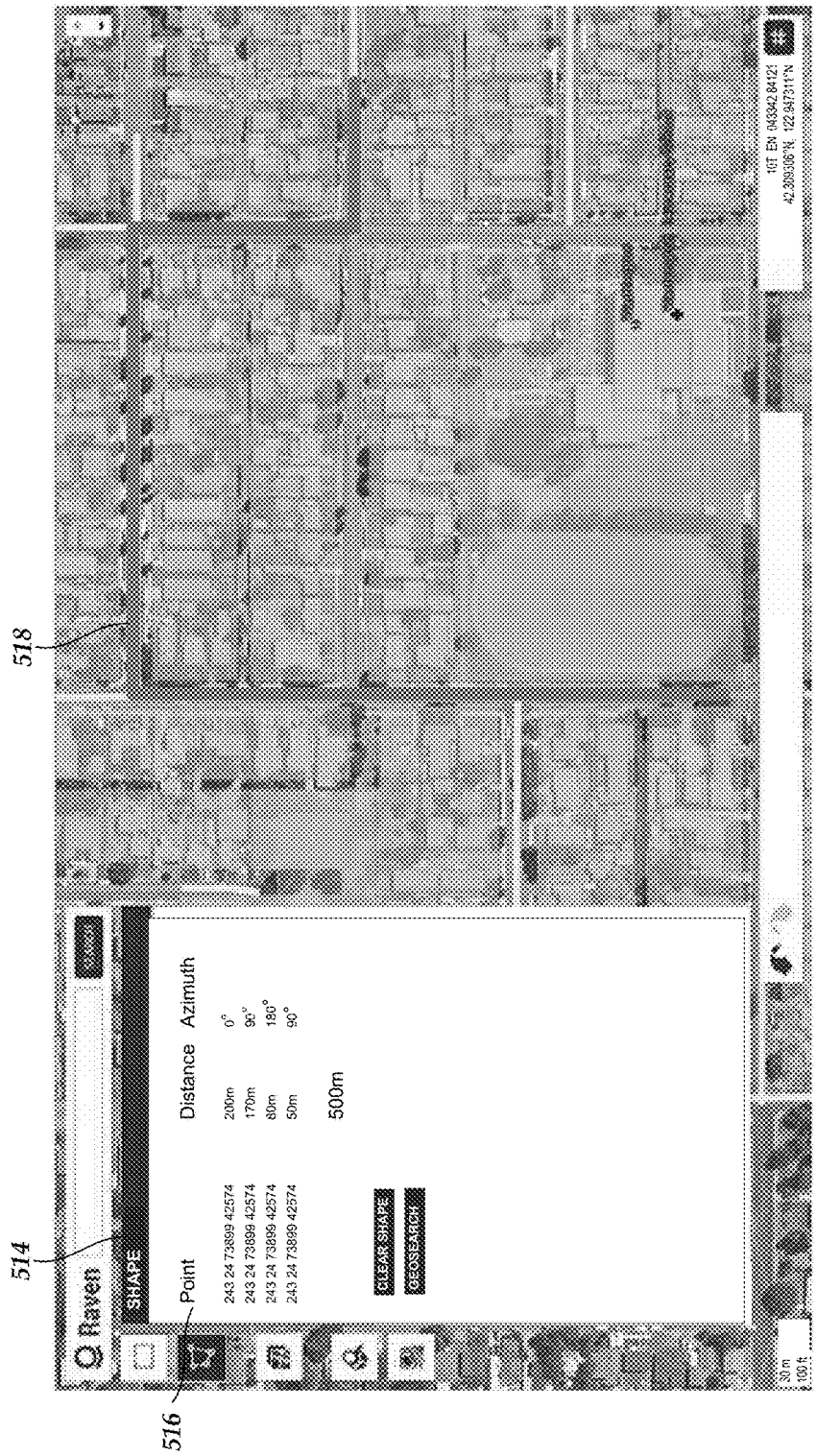
FIGS. 5E-5F illustrate sample user interfaces of the interactive data object map system in which a shape-based geosearch is displayed, according to embodiments of the present disclosure.
Figure 5F:
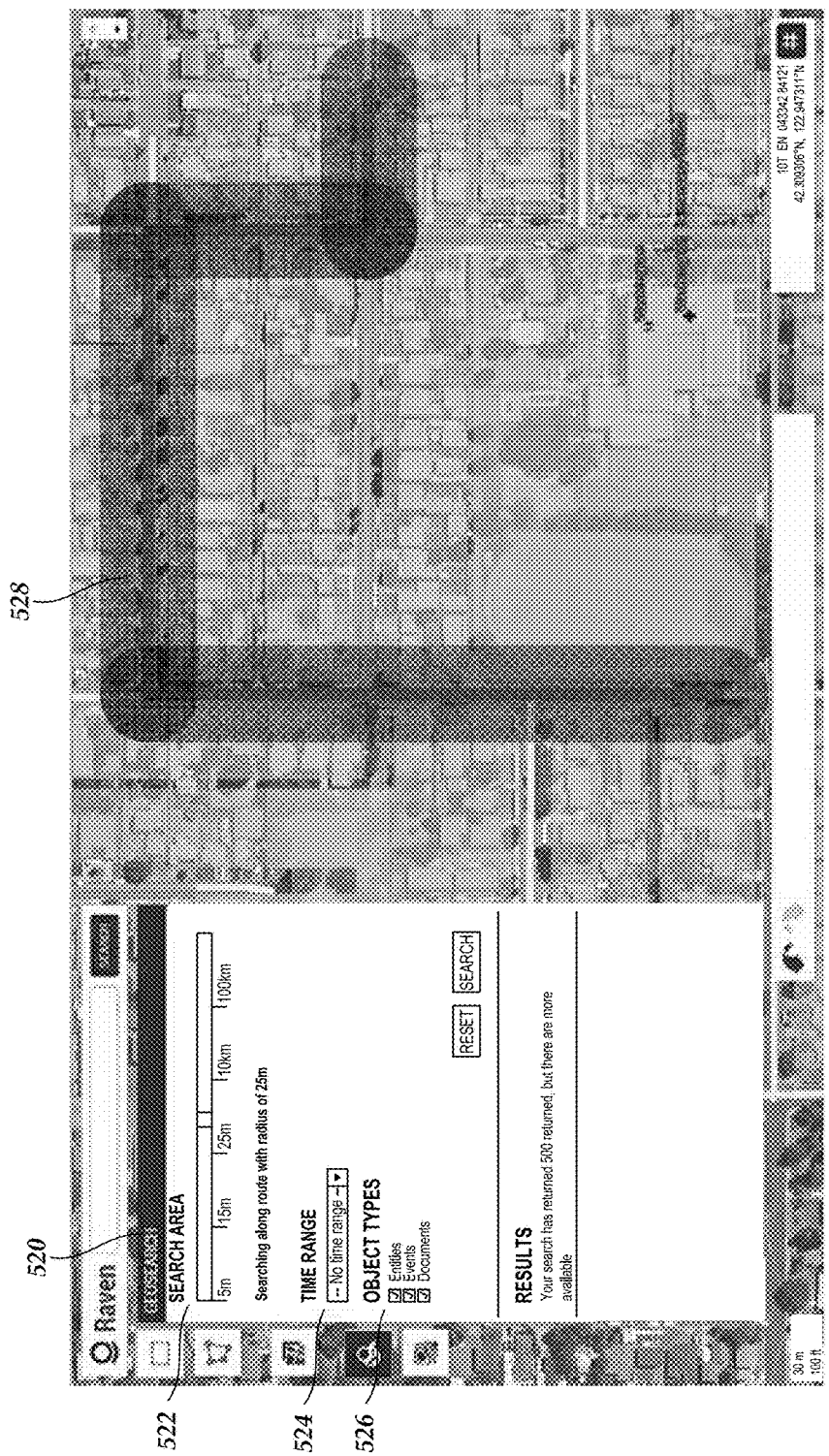

FIGS. 5E-5F illustrate sample user interfaces of the map system in which a shape-based geosearch is displayed, according to embodiments of the present disclosure. In FIG. 5E, the user has selected the shape button 104, and a shape information window 514 is shown. In the user interface of FIG. 5E the user has drawn lines 518, however any shapes may be drawn on the map interface. Information related to the drawn lines 518 is displayed in the shape information window 514. For example, at 516 the starting points, distance, and azimuth related to each line are displayed. Further, a total distance from the start to the end of the line is shown.

FIG. 5F shows a geosearch performed on the line shape drawn in FIG. 5E. Geosearch information window 520 indicates a search area 522, a time range 524, and an object type 526 as described above with reference to FIG. 4B. The search area is indicated on the map interface by the highlighted area 528 along the drawn line. The geosearch may be performed, and results may be shown, in a manner similar to that described above with reference to FIGS. 4B-4D. For example, geosearch along a path may be used to determine points of interest along that path.

Figure 5G:
FIG. 5G illustrates a sample user interface of the interactive data object map system in which a keyword object search is displayed, according to an embodiment of the present disclosure.

FIG. 5G illustrates a sample user interface of the map system in which a keyword object search is displayed, according to an embodiment of the present disclosure. The user may type words, keywords, numbers, and/or geographic coordinates, among others, into the search box 112. In FIG. 5G, the user has typed Bank (530). As the user types, the map system automatically searches for objects and/or features that match the information typed. Matching may be performed based on object data and/or metadata. Search results are displayed as shown at 532 in FIG. 5G. In the example, a list of banks (bank features) is shown. The user may then select from the list shown, at which point the map system automatically zooms to the selected feature and indicates the selected feature with an arrow 534. In various embodiments, the selected feature may be indicated by highlighting, outlining, and/or any other type of indicator. In an embodiment, the search box 112 may be linked to a gazetteer so as to enable simple word searches for particular geographic locations. For example, a search for a city name, New York, may be linked with the geographic coordinates of the city, taking the user directly to that location on the map interface.

Figure 5H:
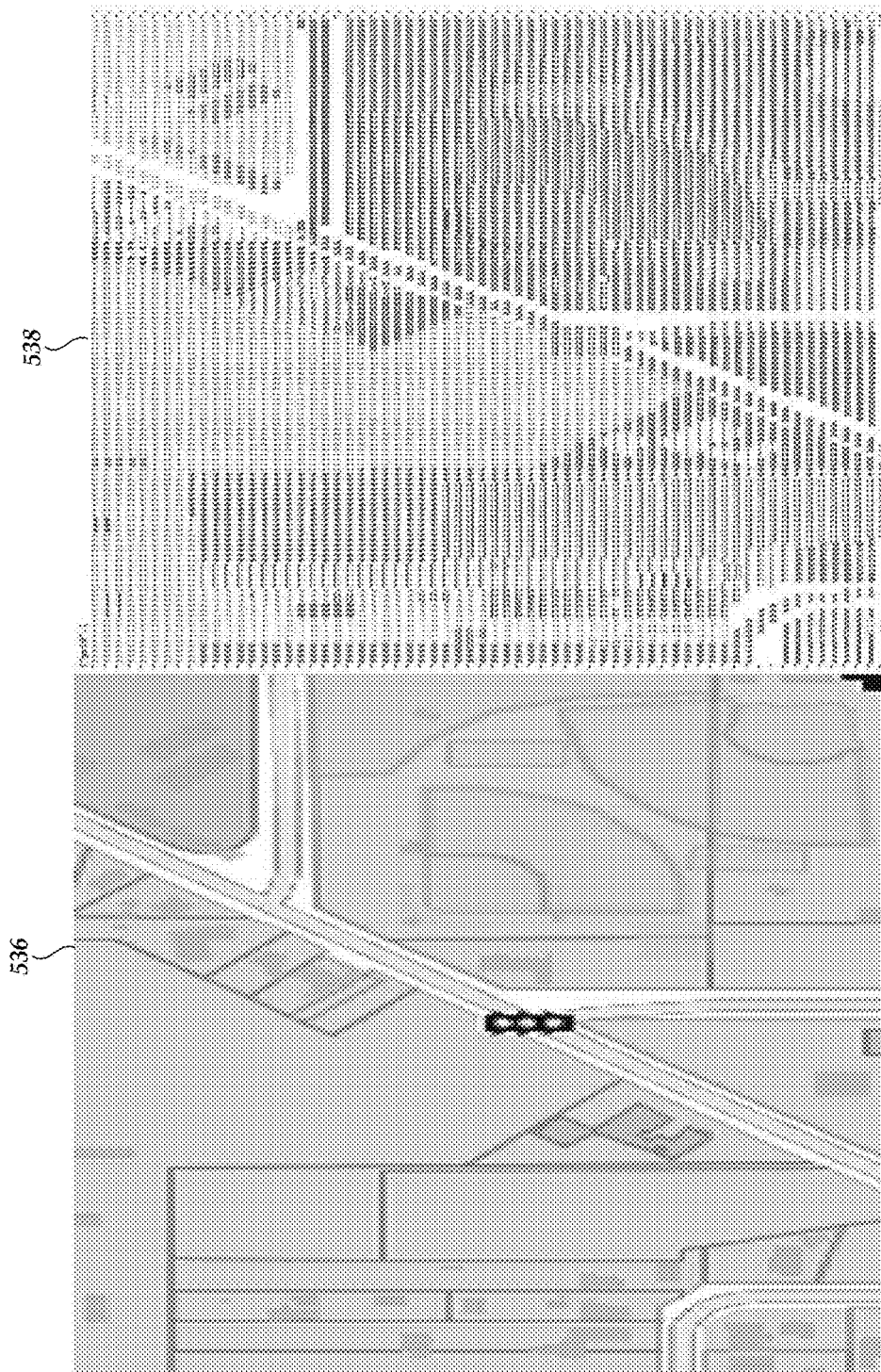
FIG. 5H illustrates an example of a UTF grid of the interactive data object map system, according to an embodiment of the present disclosure.

FIG. 5H illustrates an example of a UTF grid of the map system, according to an embodiment of the present disclosure. In an embodiment, the UTF grid enables feature outlining and/or highlighting of many objects with client-side components. In one embodiment, each map tile (or image) of the map interface includes an associated textual UTF (UCS Transformation Format) grid. In FIG. 5H, an example map tile 526 is shown next to an associated example UTF grid 538. In this example, the map tile and associated UTF grid are generated by the server-side components and sent to the client-side components. In the UTF grid, each character represents a pixel in the map tile image, and each character indicates what feature is associated with the pixel. Each character in the UTF grid may additionally be associated with a feature identifier which may be used to request metadata associated with that feature.

Contiguous regions of characters in the UTF grid indicate the bounds of a particular feature, and may be used by the client-side components to provide the feature highlighting and/or outlining. For example, when a user hovers a mouse pointer over a feature on a map tile, the map system determines the character and portion of the UTF grid associated with the pixel hovered over, draws a feature outline based on the UTF grid, and may additionally access metadata associated with the feature based on the feature identifier associated with the feature. In an embodiment, the UTF grid is sent to the client-side components in a JSON (JavaScript Object Notation) format.

Figure 6A:
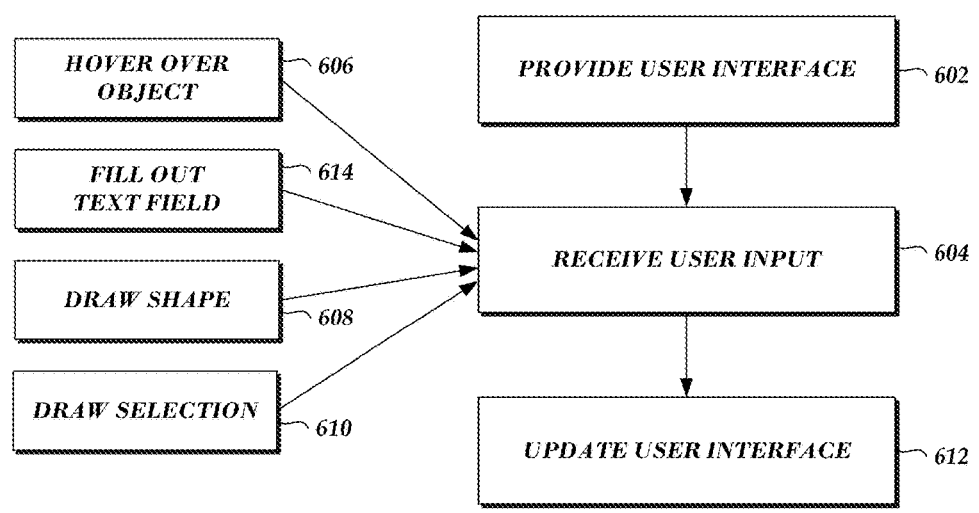
FIG. 6A shows a flow diagram depicting illustrative client-side operations of the interactive data object map system, according to an embodiment of the present disclosure.

FIG. 6A shows a flow diagram depicting illustrative client-side operations of the map system, according to an embodiment of the present disclosure. In various embodiments, fewer blocks or additional blocks may be included in the process, or various blocks may be performed in an order different from that shown in FIG. 6A. In an embodiment, one or more blocks in FIG. 6A may be performed by client-side components of the map system, for example, computer system 800 (described below in reference to FIG. 8D).

At block 602, the map system provides a user interface (for example, the user interface of FIG. 1) to the user. As described above and below, the user interface may be provided to the user through any electronic device, such as a desktop computer, a laptop computer, a mobile smartphone, and/or a tablet, among others. At block 604, an input is received from the user of the map system. For example, the user may use a mouse to roll over and/or click on an item of the user interface, or the user may touch the display of the interface (in the example of a touch screen device).

Inputs received from the user may include, for example, hovering over, rolling over, and/or touching and object in the user interface (606); filling out a text field (614); drawing a shape in the user interface (608), and/or drawing a selection box and/or shape in the user interface (610); among other actions or inputs as described above.

At block 612, any of inputs 606, 614, 608, and 610 may cause the map system to perform client-side actions to update the user interface. For example, hovering over an object (606) may result in the client-side components of the map system to access the UTF grid, determine the boundaries of the object, and draw an outline around the hovered-over object. In another example, filling out a text field (614) may include the user inputting data into the map system. In this example, the user may input geographic coordinates, metadata, and/or other types of data to the map system. These actions may result in, for example, the client-side components of the map system storing the inputted data and/or taking an action based on the inputted data. For example, the user inputting coordinates may result in the map interface being updated to display the inputted information, such as an inputted name overlaying a particular object. In yet another example, the actions/inputs of drawing a shape (608) and/or drawing a selection (610) may result in the client-side components of the map system to update the user interface with colored and/or highlighted shapes (see, for example, FIG. 3A).

In an embodiment, one or more blocks in FIG. 6A may be performed by server-side components of the map system, for example, server 830 (described below in reference to FIG. 8D).

Figure 6B:
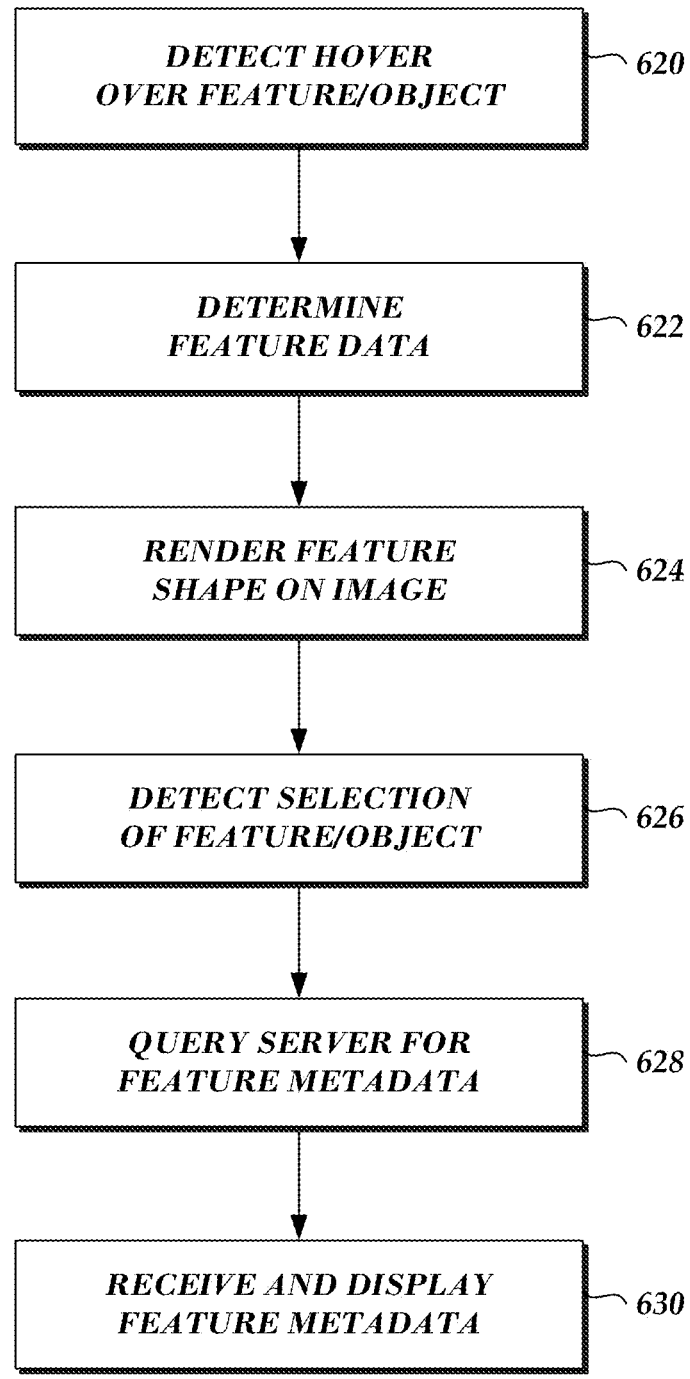
FIG. 6B shows a flow diagram depicting illustrative client-side metadata retrieval of the interactive data object map system, according to an embodiment of the present disclosure.

FIG. 6B shows a flow diagram depicting illustrative client-side metadata retrieval of the map system, according to an embodiment of the present disclosure. In various embodiments, fewer blocks or additional blocks may be included in the process, or various blocks may be performed in an order different from that shown in FIG. 6B. In an embodiment, one or more blocks in FIG. 6B may be performed by client-side components of the map system, for example, computer system 800.

At block 620, the client-side components of the map system detect that the user is hovering over and/or touching an object in the user interface. At block 622, and as described above, the client-side components may access the UTF grid to determine the feature identifier and object boundaries associated with the hovered-over object. Then, at block 624, the client-side components may render the feature shape on the image or map interface. The feature shape may be rendered as an outline and/or other highlighting.

At block 636, the client-side components detect whether the user has selected the object. Objects may be selected, for example, if the user clicks on the object and or touches the object. If the user has selected the object, then at block 628, the client-side components query the server-side components to retrieve metadata associated with the selected object. In an embodiment, querying of the server-side components may include transmitting the feature identifier associated with the selected object to the server, the server retrieving from a database the relevant metadata, and the server transmitting the retrieved metadata back to the client-side components.

At block 630, the metadata is received by the client-side components and displayed to the user. For example, the metadata associated with the selected object may be displayed to the user in the user interface in a dedicated metadata window, among other possibilities.

In an embodiment, one or more blocks in FIG. 6B may be performed by server-side components of the map system, for example, server 830.

Figure 7A:
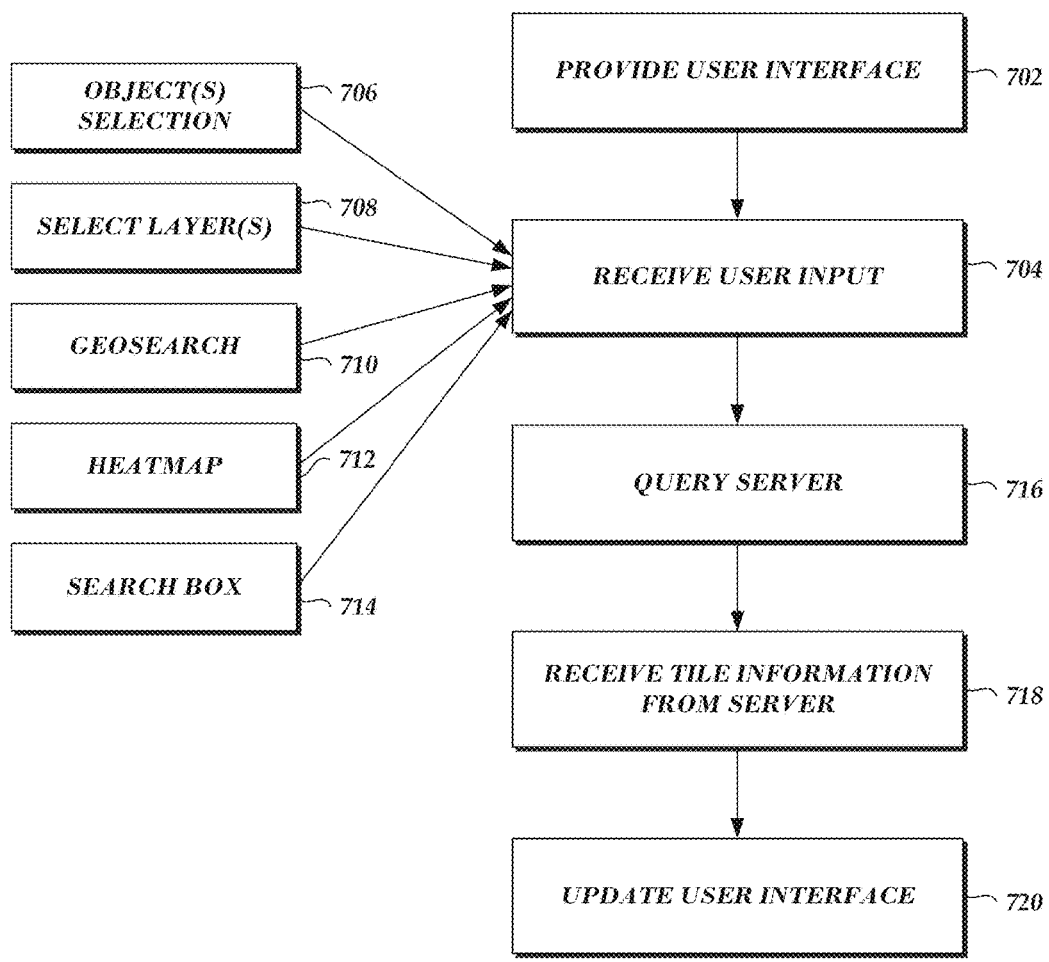
FIG. 7A shows a flow diagram depicting illustrative server-side operations of the interactive data object map system, according to an embodiment of the present disclosure.

FIG. 7A shows a flow diagram depicting illustrative server-side operations of the map system, according to an embodiment of the present disclosure. In various embodiments, fewer blocks or additional blocks may be included in the process, or various blocks may be performed in an order different from that shown in FIG. 7A. In an embodiment, one or more blocks in FIG. 7A may be performed by server-side components of the map system, for example, server 830.

Server-side operations of the map system may include composing and updating the map tiles that make up the map interface. For example, when the user changes the selection of the base layer and/or one or more of the vector layers, the map tiles are re-composed and updated in the map interface to reflect the user's selection. Selection of objects resulting in highlighting of those objects may also involve re-composition of the map tiles. Further, UTF grids may be generated by the server-side components for each map tile composed.

At block 702, the user interface is provided to the user. At block 704 an input from the user is received. Inputs received from the user that may result in server-side operations may include, for example, an object selection (706), a change in layer selection (708), a geosearch (710), generating a heatmap (712), searching from the search box (714), and/or panning or zooming the map interface, among others.

At block 716, the client-side components of the map system may query the server-side components in response to any of inputs 706, 708, 710, 712, and 714 from the user. The server-side components then update and re-compose the map tiles and UTF grids of the map interface in accordance with the user input (as described below in reference to FIG. 7B), and transmits those updated map tiles and UTF grids back to the client-side components.

At block 718, the client-side components receive the updated map tile information from the server, and at block 720 the user interface is updated with the received information.

In an embodiment, additional information and/or data, in addition to updated map tiles, may be transmitted to the client-side components from the server-side components. For example, object metadata may be transmitted in response to a user selecting an object.

In an embodiment, one or more blocks in FIG. 7A may be performed by client-side components of the map system, for example, computer system 800.

Figure 7B:
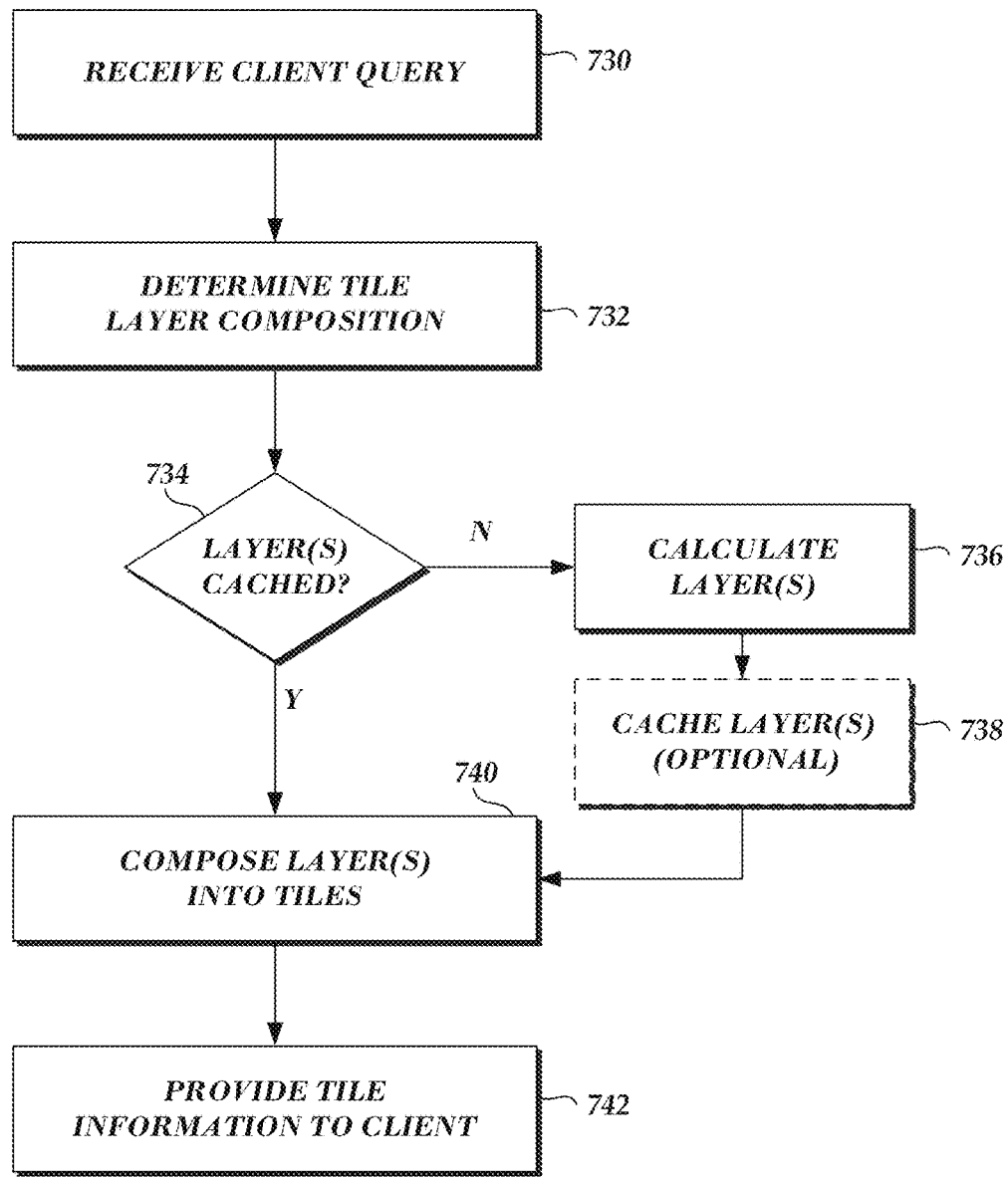
FIG. 7B shows a flow diagram depicting illustrative server-side layer composition of the interactive data object map system, according to an embodiment of the present disclosure.

FIG. 7B shows a flow diagram depicting illustrative server-side layer composition of the map system, according to an embodiment of the present disclosure. In various embodiments, fewer blocks or additional blocks may be included in the process, or various blocks may be performed in an order different from that shown in FIG. 7B. In an embodiment, one or more blocks in FIG. 7B may be performed by server-side components of the map system, for example, server 830.

At block 730, a query is received by the server-side components from the client-side components. Such a query may originate, for example, at block 716 of FIG. 7A. At block 732, the server-side components determine the map tile composition based on the query. For example, if the user has selected an object or group of objects, the map tiles containing those objects may be updated to include highlighted objects. In another example, if the user has changed the layer selection, the map tiles may be updated to include only those layers that are currently selected. In the example of FIG. 7B, the layers currently selected are determined, and the layers are composed and/or rendered into the map tiles. In another example, if the user has performed a geosearch and selected to add the search result objects to the map interface, the map tiles are updated to include those search result objects. In yet another example, when the user has generated a heatmap, the map tiles are updated to show the generated heatmap. In another example, if the user searches via the search box, the selected objects may be highlighted in the re-composed map tiles. In another example, when the user pans and/or zooms in the map interface, the map tiles are updated to reflect the new view selected by the user. In all cases, and updated UTF grid may also be generated for each composed map tile.

At block 734, the map system determines whether the layers necessary to compose the requested map tiles are cached. For example, when a layer is selected by the user, that layer may be composed by the map system and placed in a memory of the server-side components for future retrieval. Caching of composed layers may obviate the need for recomposing those layers later, which advantageously may save time and/or processing power.

If the required layers are cached, then at block 740 the layers are composed into the requested map tiles and, at block 742, transmitted to the client-side components.

When the required layers are not cached, at block 736, the server-side components calculate and/or compose the requested layer and or layers, and may then, at block 738, optionally cache the newly composed layers for future retrieval. Then, at blocks 740 and 742, the layers are composed into map tiles and provided to the client-side components.

In an embodiment, entire map tiles may be cached by the server-side components. In an embodiment, the size and/or quality of the map tiles that make up that map interface may be selected and/or dynamically selected based on at least one of: the bandwidth available for transmitting the map tiles to the client-side components, the size of the map interface, and/or the complexity of the layer composition, among other factors. In an embodiment, the map tiles comprise images, for example, in one or more of the following formats: PNG, GIF, JPEG, TIFF, BMP, and/or any other type of appropriate image format.

In an embodiment, the layer and object data composed into layers and map tiles comprises vector data. The vector data (for example, object data) may include associated metadata, as described above. In an embodiment, the vector, layer, and/or object data and associated metadata may originate from one or more databases and/or electronic data stores.

In an embodiment, one or more blocks in FIG. 7B may be performed by client-side components of the map system, for example, computer system 800.

In an embodiment, the map system may display more than 50 million selectable features to a user simultaneously. In an embodiment, the map system may support tens or hundreds of concurrent users accessing the same map and object data. In an embodiment, map and object data used by the map system may be mirrored and/or spread across multiple computers, servers, and/or server-side components.

In an embodiment, rather than updating the map tiles to reflect a selection by the user of one or more objects, the map system may show an approximation of the selection to the user based on client-side processing.

In an embodiment, a user may drag and drop files, for example, vector data and/or vector layers, onto the user interface of the map system, causing the map system to automatically render the file in the map interface.

In an embodiment, icons and/or styles associated with various objects in the map interface may be updated and/or changed by the user. For example, the styles of the various objects may be specified in or by a style data file. The style data file may be formatted according to a particular format or standard readable by the map system. In an embodiment, the style data file is formatted according to the JSON format standard. The user may thus change the look of the objects and shapes rendered in the map interface of the map system by changing the style data file. The style data file may further define the looks for object and terrain (among other items and data) at various zoom levels.

In an embodiment, objects, notes, metadata, and/or other types of data may be added to the map system by the user through the user interface. In an embodiment, user added information may be shared between multiple users of the map system. In an embodiment, a user of the map system may add annotations and shapes to the map interface that may be saved and shared with other users. In an embodiment, a user of the map system may share a selection of objects with one or more other users.

In an embodiment, the user interface of the map system may include a timeline window. The timeline window may enable the user to view objects and layers specific to particular moments in time and/or time periods. In an embodiment, the user may view tolerance ellipses overlaid on the map interface indicating the likely position of an object across a particular time period.

In an embodiment, the map system may include elevation profiling. Elevation profiling may allow a user of the system to determine the elevation along a path on the map interface, to perform a viewshed analysis (determine objects and/or terrain viewable from a particular location), to perform a reverse-viewshed analysis (for a particular location, determine objects and/or terrain that may view the location), among others.

In an embodiment, vector data, object data, metadata, and/or other types of data may be prepared before it is entered into or accessed by the map system. For example, the data may be converted from one format to another, may be crawled for common items of metadata, and/or may be prepared for application of a style file or style information, among other action. In an embodiment, a layer ontology may be automatically generated based on a group of data. In an embodiment, the map system may access common data sources available on the Internet, for example, road data available from openstreetmap.org.

In an embodiment, roads shown in the map interface are labeled with their names, and buildings are rendered in faux-3D to indicate the building heights. In an embodiment, Blue Force Tracking may be integrated into the map system as a layer with the characteristics of both a static vector layer and a dynamic selection layer. A Blue Force layer may enable the use of the map system for live operational analysis. In an embodiment, the map system may quickly render detailed chloropleths or heatmaps with minimal data transfer. For example, the system may render a chloropleth with a property value on the individual shapes of the properties themselves, rather than aggregating this information on a county or zip code level.

Advantageously, the map system displays many items of data, objects, features, and/or layers in a single map interface. A user may easily interact with things on the map and gather information by hovering over or selecting features, even though those features may not be labeled. The user may select features, may "drill down" on a particular type of feature (for example, roads), may view features through histograms, may use histograms to determine common characteristics (for example, determine the most common speed limit), and/or may determine correlations among features (for example, see that slower speed limit areas are centered around schools). Further, the map system may be useful in many different situations. For example, the system may be useful to operational planners and/or disaster relief personnel.

Additionally, the map system accomplishes at least three core ideas: providing a robust and fast back-end (server-side) renderer, keeping data on the back-end, and only transferring the data necessary to have interactivity. In one embodiment, the primary function of the server-side components is rendering map tiles. The server is capable of drawing very detailed maps with a variety of styles that can be based on vector metadata. Rendered map tiles for a vector layer are cached, and several of these layer tiles are drawn on top of one another to produce the final tile that is sent to the client-side browser. Map tile rendering is fast enough for displaying dynamic tiles for selection and highlight to the user. Server-side operations allow for dynamic selections of very large numbers of features, calculation of the histogram, determining the number of items shown and/or selected, and drawing the selection, for example. Further, the heatmap may include large numbers of points without incurring the cost of transferring those points to the client-side browser. Additionally, transferring only as much data as necessary to have interactivity enables quick server rendering of dynamic selections and vector layers. On the other hand, highlighting hovered-over features may be performed client-side nearly instantaneously, and provides useful feedback that enhances the interactivity of the map system. In an embodiment, to avoid transferring too much geometric data, the geometries of objects (in the map tiles and UTF grid) are down-sampled depending on how zoomed in the user is to the map interface. Thus, map tiles may be rendered and presented to a user of the map system in a dynamic and useable manner.

Object Centric Data Model

To provide a framework for the following discussion of specific systems and methods described above and below, an example database system 1210 using an ontology 1205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 1205. The conceptual data model is independent of any particular database used for durably storing one or more database(s) 1209 based on the ontology 1205. For example, each object of the conceptual data model may correspond to one or more rows in a relational database or an entry in Lightweight Directory Access Protocol (LDAP) database, or any combination of one or more databases.

Figure 8A:
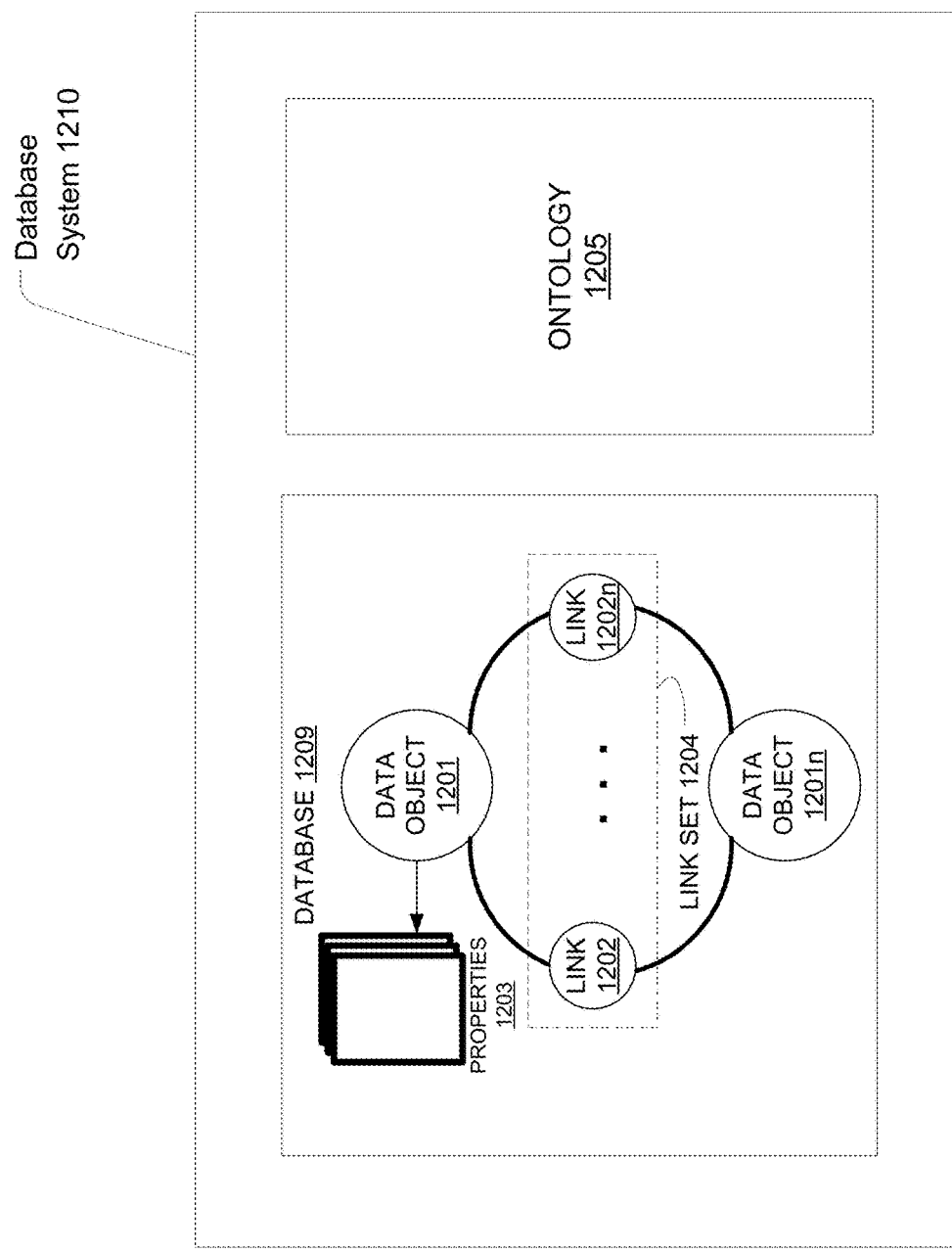
FIG. 8A illustrates one embodiment of a database system using an ontology.

FIG. 8A illustrates an object-centric conceptual data model according to an embodiment. An ontology 1205, as noted above, may include stored information providing a data model for storage of data in the database 1209. The ontology 1205 may be defined by one or more object types, which may each be associated with one or more property types. At the highest level of abstraction, data object 1201 is a container for information representing things in the world. For example, data object 1201 can represent an entity such as a person, a place, an organization, a market instrument, or other noun. Data object 1201 can represent an event that happens at a point in time or for a duration. Data object 1201 can represent a document or other unstructured data source such as an e-mail message, a news report, or a written paper or article. Each data object 1201 is associated with a unique identifier that uniquely identifies the data object within the database system.

Different types of data objects may have different property types. For example, a "Person" data object might have an "Eye Color" property type and an "Event" data object might have a "Date" property type. Each property 1203 as represented by data in the database system 1210 may have a property type defined by the ontology 1205 used by the database 1205.

Objects may be instantiated in the database 1209 in accordance with the corresponding object definition for the particular object in the ontology 1205. For example, a specific monetary payment (e.g., an object of type "event") of US$30.00 (e.g., a property of type "currency") taking place on Mar. 27, 2009 (e.g., a property of type "date") may be stored in the database 1209 as an event object with associated currency and date properties as defined within the ontology 1205.

The data objects defined in the ontology 1205 may support property multiplicity. In particular, a data object 1201 may be allowed to have more than one property 1203 of the same property type. For example, a "Person" data object might have multiple "Address" properties or multiple "Name" properties.

Each link 1202 represents a connection between two data objects 1201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 1201 can have multiple links with another data object 1201 to form a link set 1204. For example, two "Person" data objects representing a husband and a wife could be linked through a "Spouse Of" relationship, a matching "Address" property, and one or more matching "Event" properties (e.g., a wedding). Each link 1202 as represented by data in a database may have a link type defined by the database ontology used by the database.

Figure 8B:
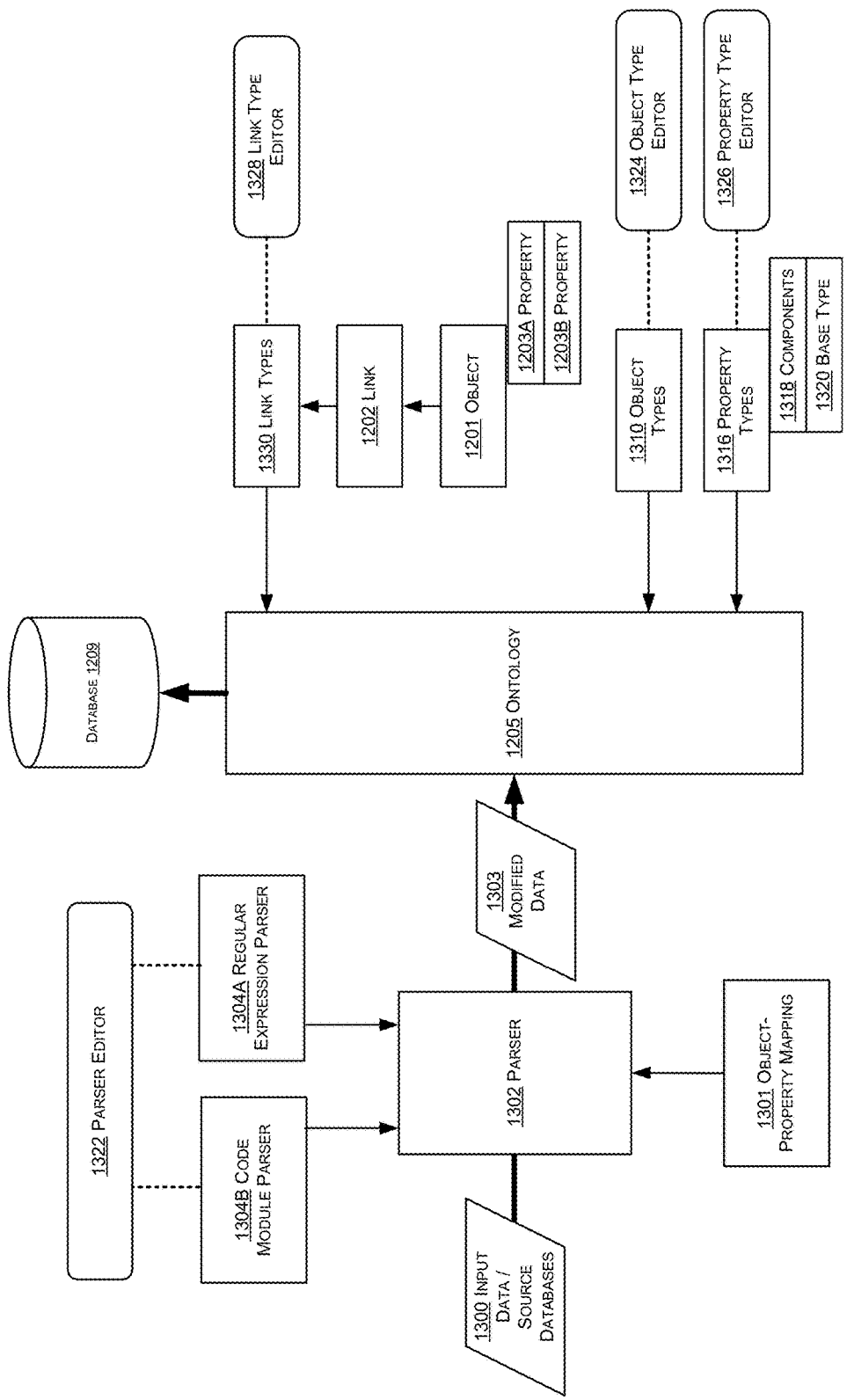
FIG. 8B illustrates one embodiment of a system for creating data in a data store using a dynamic ontology.

FIG. 8B is a block diagram illustrating exemplary components and data that may be used in identifying and storing data according to an ontology. In this example, the ontology may be configured, and data in the data model populated, by a system of parsers and ontology configuration tools. In the embodiment of FIG. 8B, input data 1300 is provided to parser 1302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1302 is able to read a variety of source input data types and determine which type of data it is reading.

In accordance with the discussion above, the example ontology 1205 comprises stored information providing the data model of data stored in database 1209, and the ontology is defined by one or more object types 1310, one or more property types 1316, and one or more link types 1330. Based on information determined by the parser 1302 or other mapping of source input information to object type, one or more data objects 1201 may be instantiated in the database 209 based on respective determined object types 1310, and each of the objects 1201 has one or more properties 1203 that are instantiated based on property types 1316. Two data objects 1201 may be connected by one or more links 1202 that may be instantiated based on link types 1330. The property types 1316 each may comprise one or more data types 1318, such as a string, number, etc. Property types 1316 may be instantiated based on a base property type 1320. For example, a base property type 1320 may be "Locations" and a property type 1316 may be "Home."

In an embodiment, a user of the system uses an object type editor 1324 to create and/or modify the object types 1310 and define attributes of the object types. In an embodiment, a user of the system uses a property type editor 1326 to create and/or modify the property types 1316 and define attributes of the property types. In an embodiment, a user of the system uses link type editor 1328 to create the link types 1330. Alternatively, other programs, processes, or programmatic controls may be used to create link types and property types and define attributes, and using editors is not required.

In an embodiment, creating a property type 1316 using the property type editor 1326 involves defining at least one parser definition using a parser editor 1322. A parser definition comprises metadata that informs parser 1302 how to parse input data 1300 to determine whether values in the input data can be assigned to the property type 1316 that is associated with the parser definition. In an embodiment, each parser definition may comprise a regular expression parser 1304A or a code module parser 1304B. In other embodiments, other kinds of parser definitions may be provided using scripts or other programmatic elements. Once defined, both a regular expression parser 1304A and a code module parser 1304B can provide input to parser 1302 to control parsing of input data 1300.

Using the data types defined in the ontology, input data 1300 may be parsed by the parser 1302 determine which object type 1310 should receive data from a record created from the input data, and which property types 1316 should be assigned to data from individual field values in the input data. Based on the object-property mapping 1301, the parser 1302 selects one of the parser definitions that is associated with a property type in the input data. The parser parses an input data field using the selected parser definition, resulting in creating new or modified data 1303. The new or modified data 1303 is added to the database 1209 according to ontology 205 by storing values of the new or modified data in a property of the specified property type. As a result, input data 1300 having varying format or syntax can be created in database 1209. The ontology 1205 may be modified at any time using object type editor 1324, property type editor 1326, and link type editor 1328, or under program control without human use of an editor. Parser editor 1322 enables creating multiple parser definitions that can successfully parse input data 1300 having varying format or syntax and determine which property types should be used to transform input data 300 into new or modified input data 1303.

The properties, objects, and links (e.g. relationships) between the objects can be visualized using a graphical user interface (GUI). For example, FIG. 8C displays a user interface showing a graph representation 1403 of relationships (including relationships and/or links 1404, 1405, 1406, 1407, 1408, 1409, 1410, 1411, 1412, and 1413) between the data objects (including data objects 1421, 1422, 1423, 1424, 1425, 1426, 1427, 1428, and 1429) that are represented as nodes in the example of FIG. 8C. In this embodiment, the data objects include person objects 1421, 1422, 1423, 1424, 1425, and 1426; a flight object 1427; a financial account 1428; and a computer object 1429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 8C:
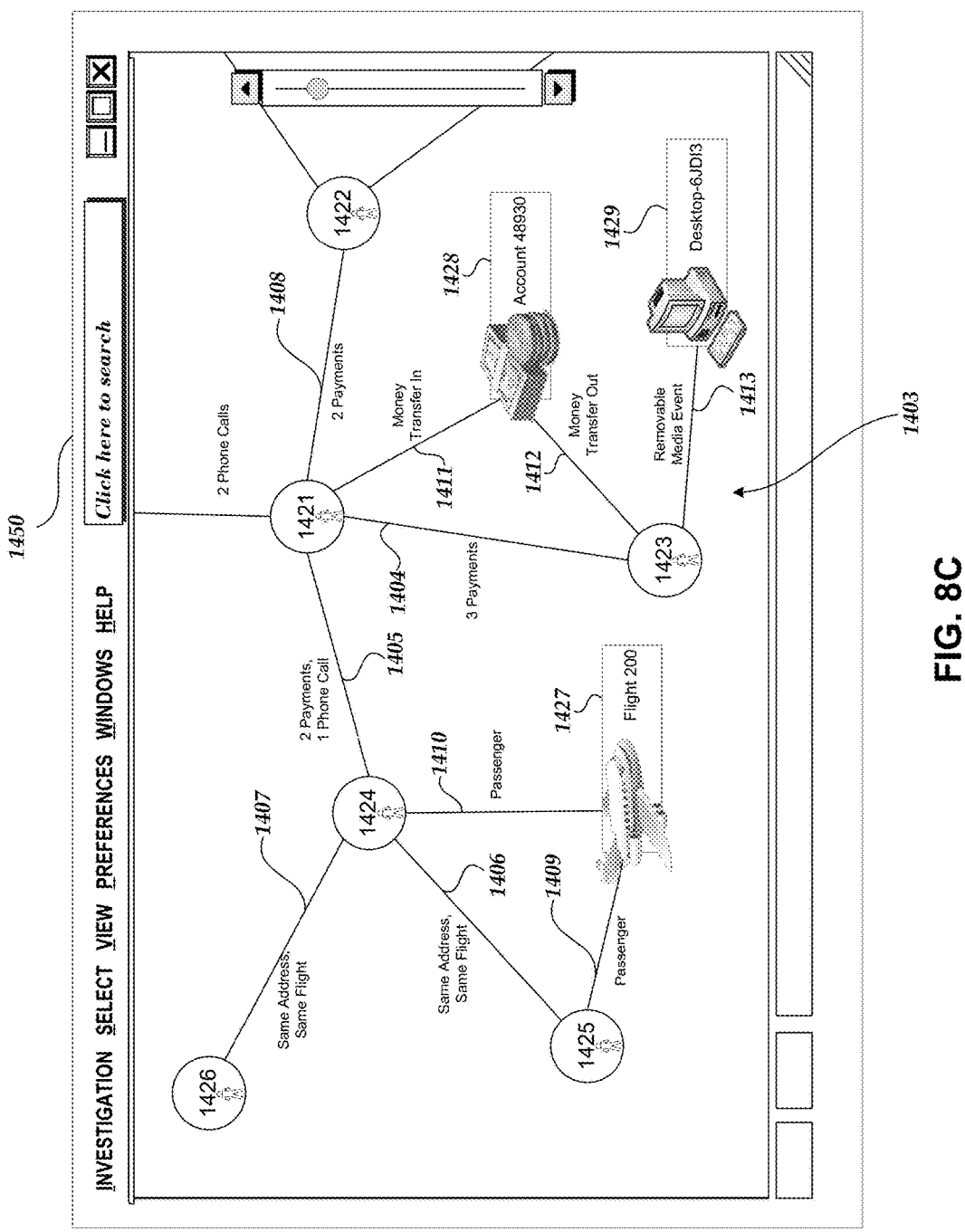
FIG. 8C illustrates a sample user interface using relationships described in a data store using a dynamic ontology.

For example, in FIG. 8C, relationship 1404 is based on a payment associated with the individuals indicated in person data objects 1421 and 1423. The link 1404 represents these shared payments (for example, the individual associated with data object 1421 may have paid the individual associated with data object 1423 on three occasions). The relationship is further indicated by the common relationship between person data objects 1421 and 1423 and financial account data object 1428. For example, link 1411 indicates that person data object 1421 transferred money into financial account data object 1428, while person data object 1423 transferred money out of financial account data object 1428. In another example, the relationships between person data objects 1424 and 1425 and flight data object 1427 are indicated by links 1406, 1409, and 1410. In this example, person data objects 1424 and 1425 have a common address and were passengers on the same flight data object 1427. In an embodiment, further details related to the relationships between the various objects may be displayed. For example, links 1411 and 1412 may, in some embodiments, indicate the timing of the respective money transfers. In another example, the time of the flight associated with the flight data object 1427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In various embodiments, data objects may further include geographical metadata and/or links. Such geographical metadata may be accessed by the interactive data object map system for displaying objects and features on the map interface (as described above).

In addition to visually showing relationships between the data objects, the user interface may allow various other manipulations. For example, the objects within database 1108 may be searched using a search interface 1450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. Additionally, as described above, objects within database 1108 may be searched, accessed, and implemented in the map interface of the interactive data object map system via, for example, a geosearch and/or radius search.

Implementation Mechanisms

According to an embodiment, the interactive data object map system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8D:
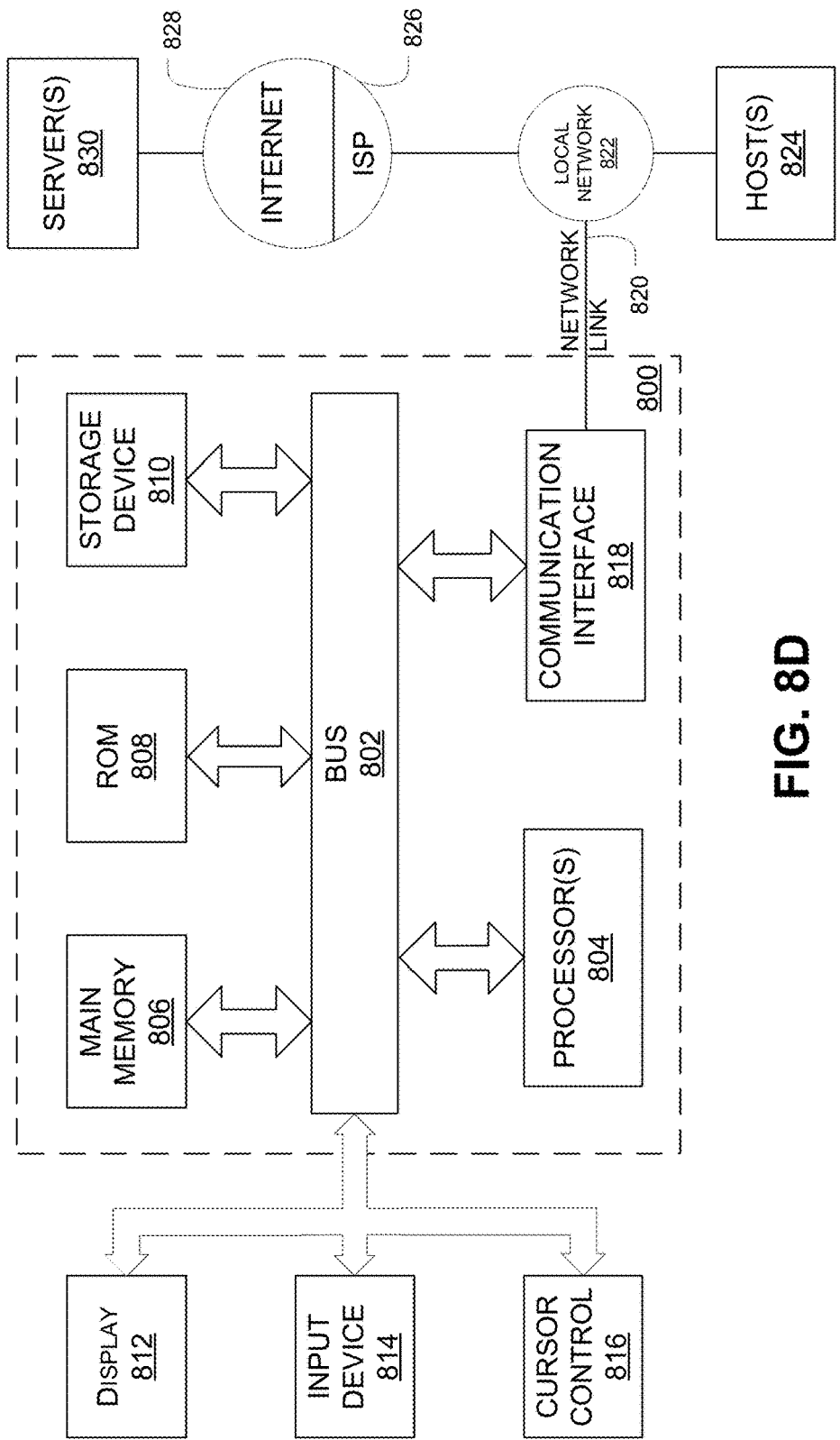
FIG. 8D illustrates a computer system with which certain methods discussed herein may be implemented.

For example, FIG. 8D is a block diagram that illustrates a computer system 800 upon which the various systems and methods discussed herein may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT), LCD display, or touch screen display, for displaying information to a computer user and/or receiving input from the user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module, and/or various other types of modules to implement a GUI, a map interface, and the various other aspects of the interactive data object map system. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more modules and/or instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions and/or modules into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. Server-side components of the interactive data object map system described above (for example, with reference to FIGS. 7A and 7B) may be implemented in the server 830. For example, the server 830 may compose map layers and tiles, and transmit those map tiles to the computer system 800.

The computer system 800, on the other hand, may implement the client-side components of the map system as described above (for example, with reference to FIGS. 6A and 6B). For example, the computer system may receive map tiles and/or other code that may be executed by processor 804 as it is received, and/or stored in storage device 810, or other non-volatile storage for later execution. The computer system 800 may further compose the map interface from the map tiles, display the map interface to the user, generate object outlines and other functionality, and/or receive input from the user.

In an embodiment, the map system may be accessible by the user through a web-based viewer, such as a web browser. In this embodiment, the map interface may be generated by the server 830 and/or the computer system 800 and transmitted to the web browser of the user. The user may then interact with the map interface through the web-browser. In an embodiment, the computer system 800 may comprise a mobile electronic device, such as a cell phone, smartphone, and/or tablet. The map system may be accessible by the user through such a mobile electronic device, among other types of electronic devices.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:

an electronic data structure configured to store a plurality of features or objects, wherein each of the features or objects is associated with metadata;

a non-transitory computer readable medium storing software modules including computer executable instructions; and one or more hardware processors in communication with the electronic data structure and the computer readable medium, and configured to execute a user interface module of the software modules in order to:

display an interactive map on an electronic display of the computer system;

include on the interactive map one or more features or objects, wherein the features or objects are selectable by a user of the computer system, and wherein the features or objects are accessed from the electronic data structure;

receive a first input, at least in part via the interactive map, from the user selecting a plurality of the included features or objects; and in response to the first input, access, from the electronic data structure, metadata associated with respective selected features or objects;

determine a plurality of metadata categories associated with at least one of the accessed metadata;

for each of the determined metadata categories:

generate one or more histograms including metadata values associated with respective selected features or objects within the metadata category, each of the histograms including a visual indicator indicating a quantity of the respective selected plurality of features or objects included on the interactive map having the respective metadata value within the metadata category; and cause display, on the electronic display, of indications of the determined metadata categories and the respective one or more histograms including the respective metadata values, wherein locations on the electronic display of the respective one or more histograms are different from respective locations on the electronic display of the respective metadata values.

2. The computer system of claim 1, wherein the features or objects comprise vector data.

3. The computer system of claim 1, wherein the features or objects comprise at least one of roads, terrain, lakes, rivers, vegetation, utilities, street lights, signs, railroads, hotels or motels, schools, hospitals, buildings or structures, regions, transportation objects, entities, events, or documents.

4. The computer system of claim 1, wherein the metadata associated with the features or objects comprise at least one of a location, a city, a county, a state, a country, an address, a district, a grade level, a phone number, a speed, a width, or other related attributes.

5. The computer system of claim 1, wherein the features or objects are selectable by a user using a mouse and/or a touch interface.

6. The computer system of claim 1, wherein each histogram of the one or more histograms is specific to a particular metadata category.

7. The computer system of claim 6, wherein each histogram of the one or more histograms comprises a list of items of metadata specific to the particular metadata category of the histogram, wherein the list of items is organized in descending order from an item having the largest number of related objects or features to an item having the smallest number of related objects or features.

8. The computer system of claim 1, wherein the one or more histograms displayed on the electronic display are displayed so as to partially overlay the displayed interactive map.

9. The computer system of claim 1, wherein the one or more hardware processors are further configured to execute the user interface module in order to:
receive a second input from the user selecting a second one or more features or objects from the one or more histograms; and
in response to the second input,
update the interactive map to display the second one or more features or objects on the display; and
highlight the second one or more features or objects on the interactive map.

10. The computer system of claim 9, wherein updating the interactive map comprises panning and/or zooming.

11. The computer system of claim 9, wherein highlighting the second one or more features comprises at least one of outlining, changing color, bolding, or changing contrast.

12. The computer system of claim 9, wherein the one or more hardware processors are further configured to execute the user interface module in order to:
receive a third input from the user selecting a drill-down group of features or objects from the one or more histograms; and
in response to the third input, drill-down on the selected drill-down group of features or objects by:
accessing metadata associated with respective features or objects of the selected drill-down group;
determining one or more drill-down metadata categories associated with at least one of the accessed metadata associated with each of the features or objects of the selected drill-down group;
for each of the determined drill-down metadata categories:
generating one or more drill-down histograms including drill-down metadata values associated with respective features or objects within the drill-down metadata category of the selected drill-down, each of the drill-down histograms including a visual indicator indicating a quantity of the respective features or objects of the selected drill-down group having the respective drill-down metadata value within the drill-down metadata category; and
causing display on the interactive map of indications of the determined drill-down metadata categories and the respective one or more drill-down histograms.

13. The computer system of claim 12, wherein the one or more hardware processors are further configured to execute the user interface module in order to enable the user to further drill down into the one or more drill-down histograms.

14. The computer system of claim 1, wherein the one or more hardware processors are further configured to execute the user interface module in order to:
receive a feature or object hover over input from the user; and
in response to receiving the hover over input, highlight, on the electronic display, metadata associated with the particular hovered over feature or object to the user.

15. The computer system of claim 1, wherein one or more hardware processors are further configured to execute the user interface module in order to:
receive a feature or object selection input from the user; and
in response to receiving the selection input, display, on the electronic display, metadata associated with the particular selected feature or object to the user.

16. A method comprising:
displaying, on an electronic display of a computer system including one or more hardware processors configured to execute computer executable instructions, an interactive map;
accessing, by the computer system, an electronic data structure configured to store a plurality of features or objects, wherein each of the features or objects is associated with metadata;
including on the interactive map one or more features or objects accessed from the electronic data structure, the features or objects selectable by a user of the computer system; and
in response to a first input, received via the interactive map and from the user, selecting a plurality of the included features or objects:
accessing, from the electronic data structure, metadata associated with respective selected features or objects;
determining a plurality of metadata categories associated with the accessed metadata;
for each determined metadata category:
determining, based on the metadata associated with respective selected features or objects, a set of selected features or objects associated with the determined metadata category; and
generating, based on the determined set of selected features or objects associated with the determined metadata category, a metadata category histogram including one or more visual indicators indicating quantities of features or objects from the set having similar metadata values within the metadata category; and
causing display, on the electronic display, of indications of the determined metadata categories and the respective plurality of metadata category histograms including the respective metadata values, wherein locations on the electronic display of the respective one or more histograms are different from respective locations on the electronic display of the respective metadata values.

17. The method of claim 16 further comprising:
in response to a second input from the user selecting a second one or more features or objects via the plurality of metadata category histograms:
updating the interactive map to display the second one or more features or objects on the electronic display; and
highlighting the second one or more features or objects on the interactive map.

18. The method of claim 16, wherein the metadata associated with the features or objects comprise at least one of a location, a city, a county, a state, a country, an address, a district, a grade level, a phone number, a speed, a width, or other related attributes.

19. The method of claim 16, wherein each of the plurality of metadata category histograms comprises a list of items of metadata specific to the particular metadata category of the metadata category histogram, the list of items organized in descending order from an item having the largest number of related objects or features to an item having the smallest number of related objects or features.

20. The method of claim 16 further comprising:
in response to a second input from the user selecting a drill-down group of features or objects via the plurality of metadata category histograms:
displaying, on the electronic display, a plurality of drill-down metadata category histograms associated with the selected drill-down group of features or objects.

* * * * *